United States Patent
Jones et al.

(10) Patent No.: US 8,356,977 B2
(45) Date of Patent: Jan. 22, 2013

(54) ROTARY WING AIRCRAFT ROTARY LEAD LAG DAMPER

(75) Inventors: Peter J. Jones, Erie, PA (US); Zachary Fuhrer, Erie, PA (US)

(73) Assignee: Lord Corporation, Cary, NC (US)

(*) Notice: Subject to any disclaimer, the term of this patent is extended or adjusted under 35 U.S.C. 154(b) by 444 days.

(21) Appl. No.: 11/754,673

(22) Filed: May 29, 2007

(65) Prior Publication Data

US 2008/0069695 A1 Mar. 20, 2008

Related U.S. Application Data

(60) Provisional application No. 60/808,927, filed on May 26, 2006.

(51) Int. Cl.
*B64C 27/51* (2006.01)
*F16F 9/14* (2006.01)

(52) U.S. Cl. ............... 416/107; 416/106; 416/134 A; 416/140; 416/500; 188/290; 188/293; 188/296

(58) Field of Classification Search .............. 416/106, 416/107, 134 A, 140, 141, 500; 188/290, 188/293, 296; 16/51, 52, 54, 55, 57
See application file for complete search history.

(56) References Cited

U.S. PATENT DOCUMENTS

| | | |
|---|---|---|
| 2,155,427 A | 4/1939 | Larsen |
| 2,696,271 A | 12/1954 | Jovanovich |
| 3,758,230 A | 9/1973 | Potter |
| 4,105,365 A | 8/1978 | Ferris et al. |
| 4,768,630 A | 9/1988 | Aubry et al. |
| 5,141,398 A | 8/1992 | Bietenhader et al. |
| 5,266,005 A | 11/1993 | Aubry |
| 5,407,325 A | 4/1995 | Aubry |
| 5,540,549 A | 7/1996 | McGuire |
| 6,676,074 B2 | 1/2004 | Zoppitelli et al. |
| 6,758,466 B2 * | 7/2004 | Russell .................. 267/219 |
| 6,899,208 B2 | 5/2005 | VanValkenburgh et al. |

(Continued)

FOREIGN PATENT DOCUMENTS

| | | |
|---|---|---|
| EP | 0478444 A | 4/1992 |
| EP | 1457704 A | 9/2004 |
| EP | 1566563 A1 | 8/2005 |

OTHER PUBLICATIONS

Brackbill et al., "Thermomechanical Modeling of Elastomeric Materials", Smart Mater. Struct., 5 (1996), pp. 529-539.

(Continued)

*Primary Examiner* — Christopher Verdier
(74) *Attorney, Agent, or Firm* — Richard G. Miller

(57) ABSTRACT

The rotary damper for controlling helicopter motions includes an outer canister with an inner paddle wheel receiving cavity which receives an inner paddle wheel with upper and lower elastomeric tubular intermediate members between the inner paddle wheel and the outer canister. The canister and inner paddle wheel form neighboring variable volume chambers in liquid communication through liquid damping conduits. A clockwise rotation of the inner paddle wheel about the center of rotation axis relative to the outer canister pumps damper liquid from a second variable volume chamber through a first liquid conduit towards a first variable volume chamber, and a counterclockwise rotation of the paddle wheel relative to the outer canister pumps the damper liquid from the first variable volume chamber through the first liquid conduit towards the second variable volume chamber with the elastomeric tubular intermediate members providing for the relative rotation and containing the damper liquid in the damper.

32 Claims, 41 Drawing Sheets

U.S. PATENT DOCUMENTS

| | | |
|---|---|---|
| 6,926,500 B2 | 8/2005 | Ferullo |
| 6,955,249 B2 | 10/2005 | Biasiotto et al. |
| 7,137,624 B2 | 11/2006 | Russell et al. |
| 7,270,321 B2 | 9/2007 | Russell |
| 2009/0159382 A1 | 6/2009 | Chemouni et al. |

OTHER PUBLICATIONS

McGuire, "Fluidlastic Dampers and Isolators for Vibration Control in Helicopters", LORD Corporation, LL-6502, 2001.

* cited by examiner

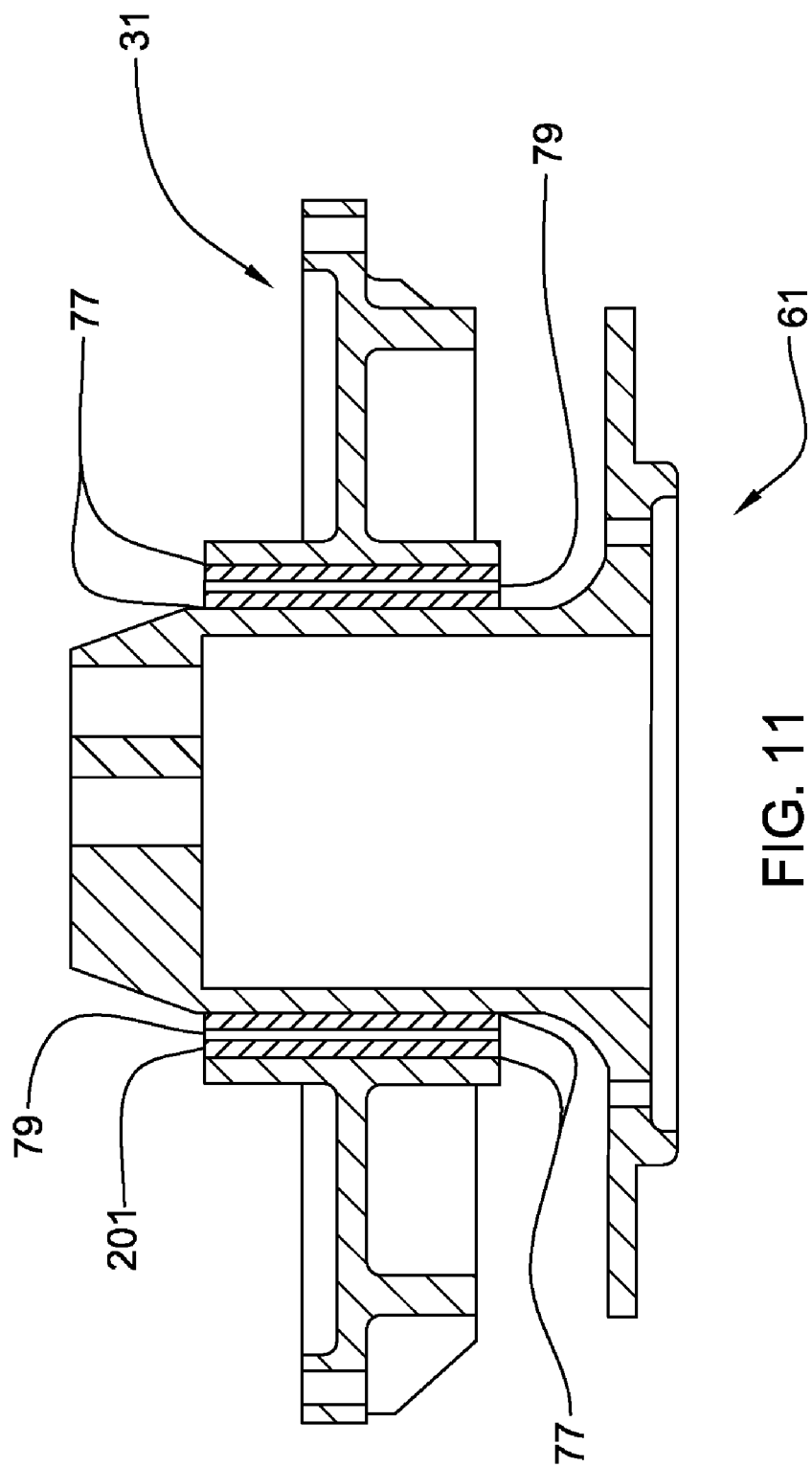

ROTARY WING AIRCRAFT ROTARY LEAD LAG DAMPER

CROSS REFERENCE

This application claims the benefit of, and incorporates by reference, U.S. Provisional Patent Application No. 60/808,927 filed on May 26, 2006 with the United States Patent and Trademark Office.

FIELD OF THE INVENTION

The present invention relates to rotary dampers and methods of making rotary dampers. More particularly the invention relates to helicopter lead lag dampers and methods for making rotary dampers and controlling rotary wing aircraft motions.

BACKGROUND OF THE INVENTION

There is a need for an effective and economical means for making rotary wing rotary dampers for helicopter applications and use. There is a need for economically feasible rotary wing aircraft dampers. There is a need for a robust system and method of making vehicle rotary dampers and controlling machine motions.

SUMMARY

In an embodiment the invention includes a rotary wing aircraft rotary lead lag damper. The rotary wing aircraft rotary lead lag damper includes a nonelastomeric outer member and an nonelastomeric inner paddle wheel member which are movable relative to each other. The rotary wing aircraft rotary lead lag damper nonelastomeric outer member and nonelastomeric inner paddle wheel member are preferably bonded together with at least one elastomer intermediate member which provides for said relative motion between said outer member and said inner member. The inner paddle wheel member preferably extends out through the elastomer while a damper liquid is contained within the outer member, between the inner and outer member. The relative motion preferably pumps the damper liquid through a plurality of long damper conduits proximate the outside perimeter of the nonelastomeric outer member.

In an embodiment the invention includes a rotary wing aircraft rotary lead lag damper. The rotary wing aircraft rotary lead lag damper preferably includes a nonelastomeric outer canister, the nonelastomeric outer canister having an outer canister housing and an inner paddle wheel member receiving cavity for receiving an inner paddle wheel member, the inner paddle wheel member receiving cavity centered about a longitudinally extending center bore axis. The rotary wing aircraft rotary lead lag damper inner paddle wheel member receiving cavity preferably includes N radially extending dividers including at least a first radially extending divider and at least a second radially extending divider, the N radially extending dividers extending in a direction from the outer canister housing inward towards the center bore axis. The outer canister housing preferably includes at least N longitudinally extending liquid conduits including at least a first longitudinally extending liquid conduit. The rotary wing aircraft rotary lead lag damper preferably includes a nonelastomeric inner paddle wheel member, the nonelastomeric inner paddle wheel member having a center of rotation axis for alignment with the center bore axis. The nonelastomeric inner paddle wheel member includes N radially extending paddles including at least a first radially extending paddle and at least a second radially extending paddle. The rotary wing aircraft rotary lead lag damper preferably includes a damper liquid. The rotary wing aircraft rotary lead lag damper preferably includes an upper elastomeric tubular intermediate member and a lower elastomeric tubular intermediate member. The nonelastomeric inner paddle wheel member is received in the nonelastomeric outer canister inner paddle wheel member receiving cavity with the upper elastomeric tubular intermediate member and the lower elastomeric tubular intermediate member between the nonelastomeric inner paddle wheel member and the nonelastomeric outer canister, with the first radially extending divider received between the first radially extending paddle and the second radially extending paddle, the first radially extending divider and the first radially extending paddle forming a first radially extending divider first variable volume chamber, the first radially extending divider and the second radially extending paddle forming a first radially extending divider second variable volume chamber, the first radially extending divider first variable volume chamber and the first radially extending divider second variable volume chamber in liquid communication through the first longitudinally extending liquid conduit wherein a clockwise rotation of the inner paddle wheel member about the center of rotation axis relative to the nonelastomeric outer canister pumps the damper liquid from the first radially extending divider second variable volume chamber through the first longitudinally extending liquid conduit towards the first radially extending divider first variable volume chamber, and a counterclockwise rotation of the inner paddle wheel member about the center of rotation axis relative to the nonelastomeric outer canister pumps the damper liquid from the first radially extending divider first variable volume chamber through the first longitudinally extending liquid conduit towards the second radially extending divider second variable volume chamber.

In an embodiment the invention includes a method of making a rotary wing aircraft lead lag damper. The method includes the steps of providing a nonelastomeric outer canister, the nonelastomeric outer canister having an outer perimeter and an inner paddle wheel member receiving cavity for receiving an inner paddle wheel member, the inner paddle wheel member receiving cavity centered about a longitudinally extending center bore axis, the inner paddle wheel member receiving cavity including N (whole integer number) radially extending dividers including at least a first radially extending divider and at least a second radially extending divider. The outer canister includes at least N extending liquid conduits including at least a first extending liquid conduit. The method includes providing a nonelastomeric inner paddle wheel member, the nonelastomeric inner paddle wheel member having a center of rotation axis for alignment with the center bore axis, the nonelastomeric inner paddle wheel member including N radially extending paddles including at least a first radially extending paddle and at least a second radially extending paddle. The method includes providing a damper liquid. The method includes providing at least a first elastomeric tubular intermediate member. The method includes receiving the nonelastomeric inner paddle wheel member in the nonelastomeric outer canister inner paddle wheel member receiving cavity with the elastomeric tubular intermediate member between the nonelastomeric inner paddle wheel member and the nonelastomeric outer canister, with the first radially extending divider received between the first radially extending paddle and the second radially extending paddle, the first radially extending divider and the first radially extending paddle forming a first radially extending divider first variable volume chamber, the first radially extending divider and the second radially extending paddle forming a first radially extending divider second variable volume chamber, the first radially extending divider first variable volume chamber and the first radially extending divider second variable volume chamber in fluid communication through the first longitudinally extending liquid conduit. The method includes containing the damper liquid inside the outer canister wherein a clockwise rotation of the inner paddle wheel member relative to the nonelastomeric outer canister pumps the damper liquid from the first radially extending divider second variable volume chamber through the first longitudinally extending liquid conduit towards the first radially extending divider first variable volume chamber, and a counterclockwise rotation of the inner paddle wheel member relative to the nonelastomeric outer canister pumps the damper liquid from the first radially extending divider first variable volume chamber through the first longitudinally extending liquid conduit towards the second radially extending divider second variable volume chamber.

In an embodiment the invention includes a method of controlling an aircraft motion. The method includes providing an aircraft with a first member and a second member, the first member moving relative to the second member. The method includes providing a nonelastomeric outer member, the nonelastomeric outer member having an outer member fixation member, an outer perimeter and an inner paddle wheel member receiving cavity for receiving an inner paddle wheel member, the inner paddle wheel member receiving cavity centered about a longitudinally extending center bore axis, the inner paddle wheel member receiving cavity including radially extending dividers including at least a first radially extending divider and at least a second radially extending divider. The method includes providing a plurality of longitudinally extending liquid conduits including at least a first longitudinally extending liquid conduit. The method includes providing a nonelastomeric inner paddle wheel member, the nonelastomeric inner paddle wheel member having an inner member fixation member and a center of rotation axis for alignment with the center bore axis, the nonelastomeric inner paddle wheel member including a plurality of radially extending paddles including at least a first radially extending paddle and at least a second radially extending paddle. The method includes providing a damper liquid. The method includes providing at least a first elastomeric tubular intermediate member. The method includes receiving the nonelastomeric inner paddle wheel member in the nonelastomeric outer canister inner paddle wheel member receiving cavity with the elastomeric tubular intermediate member between the nonelastomeric inner paddle wheel member and the nonelastomeric outer canister, with the first radially extending divider received between the first radially extending paddle and the second radially extending paddle. The first radially extending divider and the first radially extending paddle forming a first radially extending divider first variable volume chamber, the first radially extending divider and the second radially extending paddle forming a first radially extending divider second variable volume chamber, the first radially extending divider first variable volume chamber and the first radially extending divider second variable volume chamber in fluid communication through the first longitudinally extending liquid conduit. The method includes containing the damper liquid inside the outer member. The method includes fixing the outer member fixation member to the first aircraft member and fixing the inner member fixation member to the second aircraft member wherein a clockwise rotation of the inner paddle wheel member relative to the nonelastomeric outer canister pumps the damper liquid from the first radially extending divider second variable volume chamber through the first longitudinally extending liquid conduit towards the first radially extending divider first variable volume chamber, and a counterclockwise rotation of the inner paddle wheel member relative to the nonelastomeric outer canister pumps the damper liquid from the first radially extending divider first variable volume chamber through the first longitudinally extending liquid conduit towards the second radially extending divider second variable volume chamber.

In an embodiment the invention includes a rotary damper. The rotary damper includes a nonelastomeric outer canister, the nonelastomeric outer canister having outer canister housing and an inner paddle wheel member receiving cavity for receiving an inner paddle wheel member, the inner paddle wheel member receiving cavity centered about a longitudinally extending center bore axis. The inner paddle wheel member receiving cavity including at least a first radially extending divider and at least a second radially extending divider. The outer canister housing includes a plurality of liquid conduits, including at least a first longitudinally extending liquid conduit. The damper includes a nonelastomeric inner paddle wheel member, the nonelastomeric inner paddle wheel member having a center of rotation axis for alignment with the center bore axis, the nonelastomeric inner paddle wheel member including at least a first radially extending paddle and at least a second radially extending paddle. The damper includes a damper liquid. The damper includes at least a first elastomeric tubular intermediate member, the nonelastomeric inner paddle wheel member received in the nonelastomeric outer canister inner paddle wheel member receiving cavity with the at least first elastomeric tubular intermediate member between the nonelastomeric inner paddle wheel member and the nonelastomeric outer canister, with the first radially extending divider received between the first radially extending paddle and the second radially extending paddle, the first radially extending divider and the first radially extending paddle forming a first radially extending divider first variable volume chamber, the first radially extending divider and the second radially extending paddle forming a first radially extending divider second variable volume chamber, the first radially extending divider first variable volume chamber and the first radially extending divider second variable volume chamber in liquid communication through the first longitudinally extending liquid conduit wherein a clockwise rotation of the inner paddle wheel member about the center of rotation axis relative to the nonelastomeric outer canister pumps the damper liquid from the first radially extending divider second variable volume chamber through the first longitudinally extending liquid conduit towards the first radially extending divider first variable volume chamber, and a counterclockwise rotation of the inner paddle wheel member about the center of rotation axis relative to the nonelastomeric outer canister pumps the damper liquid from the first radially extending divider first variable volume chamber through the first longitudinally extending liquid conduit towards the second radially extending divider second variable volume chamber.

In an embodiment the invention includes a method of making a rotary damper. The method includes providing a nonelastomeric outer canister, the nonelastomeric outer canister having an inner paddle wheel member receiving cavity for receiving an inner paddle wheel member, the inner paddle wheel member receiving cavity centered about a longitudinally extending center bore axis, the inner paddle wheel member receiving cavity including N radially extending dividers including at least a first radially extending divider and at least a second radially extending divider. The outer canister includes at least N longitudinally extending liquid conduits including at least a first longitudinally extending liquid conduit. The method includes providing a nonelastomeric inner paddle wheel member, the nonelastomeric inner paddle wheel member having a center of rotation axis, the nonelastomeric inner paddle wheel member including N radially extending paddles including at least a first radially extending paddle and at least a second radially extending paddle. The method includes providing a damper liquid. The method includes providing at least a first elastomeric tubular intermediate member. The method includes receiving the nonelastomeric inner paddle wheel member in the nonelastomeric outer canister inner paddle wheel member receiving cavity with the elastomeric tubular intermediate member between the nonelastomeric inner paddle wheel member and the nonelastomeric outer canister, with the first radially extending divider received between the first radially extending paddle and the second radially extending paddle, the first radially extending divider and the first radially extending paddle forming a first radially extending divider first variable volume chamber, the first radially extending divider and the second radially extending paddle forming a first radially extending divider second variable volume chamber, the first radially extending divider first variable volume chamber and the first radially extending divider second variable volume chamber in fluid communication through the first longitudinally extending liquid conduit. The method includes disposing and containing the damper liquid inside the outer canister wherein a clockwise rotation of the inner paddle wheel member relative to the nonelastomeric outer canister pumps the damper liquid from the first radially extending divider second variable volume chamber through the first longitudinally extending liquid conduit towards the first radially extending divider first variable volume chamber, and a counterclockwise rotation of the inner paddle wheel member relative to the nonelastomeric outer canister pumps the damper liquid from the first radially extending divider first variable volume chamber through the first longitudinally extending liquid conduit towards the second radially extending divider second variable volume chamber.

In an embodiment the invention includes a rotary wing aircraft lead lag damper. The lead lag damper includes a nonelastomeric outer member and a nonelastomeric inner paddle wheel member, the nonelastomeric outer member and the nonelastomeric inner paddle wheel member bonded together with at least one elastomer intermediate member. The nonelastomeric outer member and the nonelastomeric inner paddle wheel member are relatively rotationally movable through the at least one elastomer intermediate member. The nonelastomeric outer member has an outside perimeter and includes a plurality of outer housing liquid damper conduits proximate the outside perimeter. The inner paddle wheel member extends out through said at least one elastomer intermediate member, with a damper liquid contained within the outer member, with the damper liquid disposed between said inner paddle wheel member and the outer member and in the outer housing liquid damper conduits, wherein the relative rotation movement between the nonelastomeric outer member and the nonelastomeric inner paddle wheel member pumps the damper liquid through the plurality of damper conduits proximate the outside perimeter of the nonelastomeric outer member.

In an embodiment the invention includes a rotary wing aircraft having an aircraft first member and an aircraft second member, the first member moving relative to the second member. The rotary wing aircraft includes a damper nonelastomeric outer member, the nonelastomeric outer member having an outer housing and an inner paddle wheel member receiving cavity for receiving an inner paddle wheel member, the inner paddle wheel member receiving cavity centered about a longitudinally extending center bore axis. The outer member includes an outer member fixation member assembly. The inner paddle wheel member receiving cavity includes a plurality of radially extending dividers including at least a first radially extending divider and at least a second radially extending divider, the radially extending dividers extending in a inward direction towards the center bore axis. The housing includes a plurality of longitudinally extending liquid conduits including at least a first longitudinally extending liquid conduit. The rotary wing aircraft includes a damper nonelastomeric inner paddle wheel member, the nonelastomeric inner paddle wheel member having a center of rotation axis for alignment with the center bore axis, the nonelastomeric inner paddle wheel member including a plurality of radially extending paddles including at least a first radially extending paddle and at least a second radially extending paddle, the inner member including an inner member fixation member assembly. The rotary wing aircraft includes a damper liquid. The rotary wing aircraft includes at least a first elastomeric tubular intermediate member, with the nonelastomeric inner paddle wheel member received in the nonelastomeric outer canister inner paddle wheel member receiving cavity with the first elastomeric tubular intermediate member between the nonelastomeric inner paddle wheel member and the nonelastomeric outer canister, with the first radially extending divider received between the first radially extending paddle and the second radially extending paddle, the first radially extending divider and the first radially extending paddle forming a first radially extending divider first variable volume chamber, the first radially extending divider and the second radially extending paddle forming a first radially extending divider second variable volume chamber, the first radially extending divider first variable volume chamber and the first radially extending divider second variable volume chamber in liquid communication through the first longitudinally extending liquid conduit. The outer member fixation member assembly is fixed to the aircraft first member and the inner member fixation member assembly is fixed to the aircraft second member, wherein the aircraft first member moving relative to the aircraft second member pumps in a first moving direction the damper liquid from the first radially extending divider second variable volume chamber through the first longitudinally extending liquid conduit towards the first radially extending divider first variable volume chamber, and pumps in a second moving direction the damper liquid from the first radially extending divider first variable volume chamber through the first longitudinally extending liquid conduit towards the second radially extending divider second variable volume chamber.

In an embodiment the invention includes a rotary damper. The rotary damper includes a nonelastomeric outer canister, the nonelastomeric outer canister having an outer canister housing and an inner paddle wheel member receiving cavity for receiving an inner paddle wheel member, the inner paddle wheel member receiving cavity including N radially extending dividers including at least a first radially extending divider and at least a second radially extending divider, the N radially extending dividers extending in a direction from the outer canister housing inward. The damper includes a nonelastomeric inner paddle wheel member including N radially extending paddles including at least a first radially extending paddle and at least a second radially extending paddle, a damper liquid, and upper and lower elastomeric tubular intermediate members, the nonelastomeric inner paddle wheel member received in the nonelastomeric outer canister inner paddle wheel member receiving cavity with the upper elastomeric tubular intermediate member and the lower elastomeric tubular intermediate member between the nonelastomeric inner paddle wheel member and the nonelastomeric outer canister, with the radially extending dividers received between the radially extending paddles and forming a plurality of variable volume chambers in liquid communication through a plurality of liquid damping conduits, wherein a clockwise rotation of the inner paddle wheel member about the center of rotation axis relative to the nonelastomeric outer canister pumps the damper liquid from at least a second variable volume chamber through at least a first liquid conduit towards at least a first variable volume chamber, and a counterclockwise rotation of the inner paddle wheel member about the center of rotation axis relative to the nonelastomeric outer canister pumps the damper liquid from the at least first variable volume chamber through the at least first liquid conduit towards the at least second variable volume chamber with the elastomeric tubular intermediate member providing for the relative rotation and containing the damper liquid in the damper.

In an embodiment the invention includes a method of making a rotary damper. The method includes providing a nonelastomeric outer canister, the nonelastomeric outer canister having an outer perimeter and an inner paddle wheel member receiving cavity for receiving an inner paddle wheel member, the inner paddle wheel member receiving cavity centered about a longitudinally extending center bore axis, the inner paddle wheel member receiving cavity including radially extending dividers including at least a first radially extending divider and at least a second radially extending divider. The method includes providing a nonelastomeric inner paddle wheel member, the nonelastomeric inner paddle wheel member having a center of rotation axis for alignment with the center bore axis, the nonelastomeric inner paddle wheel member including radially extending paddles including at least a first radially extending paddle and at least a second radially extending paddle. The method includes providing a damper liquid. The method includes providing at least an upper elastomeric intermediate member and a lower elastomeric intermediate member. The method includes receiving the nonelastomeric inner paddle wheel member in the nonelastomeric outer canister inner paddle wheel member receiving cavity with the elastomeric intermediate members between the nonelastomeric inner paddle wheel member and the nonelastomeric outer canister, with the first radially extending divider received between the first radially extending paddle and the second radially extending paddle, the first radially extending divider and the first radially extending paddle forming a first radially extending divider first variable volume chamber, the first radially extending divider and the second radially extending paddle forming a first radially extending divider second variable volume chamber, the first radially extending divider first variable volume chamber and the first radially extending divider second variable volume chamber in fluid communication through at least a first liquid conduit. The method includes containing the damper liquid inside the outer canister wherein a clockwise rotation of the inner paddle wheel member relative to the nonelastomeric outer canister pumps the damper liquid from the first radially extending divider second variable volume chamber through the liquid conduit towards the first radially extending divider first variable volume chamber, and a counterclockwise rotation of the inner paddle wheel member relative to the nonelastomeric outer canister pumps the damper liquid from the first radially extending divider first variable volume chamber through the liquid conduit towards the second radially extending divider second variable volume chamber.

In an embodiment the invention includes a method of controlling a machine motion, the method includes, providing a machine with a first member and a second member, the first member moving relative to the second member. The method includes providing a nonelastomeric outer member, the nonelastomeric outer member having an outer member fixation member, an outer perimeter and an inner paddle wheel member receiving cavity for receiving an inner paddle wheel member, the inner paddle wheel member receiving cavity centered about a longitudinally extending center bore axis, the inner paddle wheel member receiving cavity including N radially extending dividers including at least a first radially extending divider and at least a second radially extending divider. The method includes providing a nonelastomeric inner paddle wheel member, the nonelastomeric inner paddle wheel member having an inner member fixation member and a center of rotation axis for alignment with the center bore axis, the nonelastomeric inner paddle wheel member including N radially extending paddles including at least a first radially extending paddle and at least a second radially extending paddle. The method includes providing a damper liquid. The method includes providing at least a first elastomeric intermediate bearing member. The method includes receiving the nonelastomeric inner paddle wheel member in the nonelastomeric outer canister inner paddle wheel member receiving cavity with the elastomeric intermediate member between the nonelastomeric inner paddle wheel member and the nonelastomeric outer canister, with the radially extending dividers received between the radially extending paddles and forming a plurality of variable volume chambers in damping fluid communication through a plurality of damping fluid conduits, and containing the damper liquid inside the outer member. The method includes fixing the outer member fixation member to the first member and fixing the inner member fixation member to the second member wherein a clockwise rotation of the inner paddle wheel member relative to the nonelastomeric outer canister pumps the damper liquid from at least a second variable volume chamber through at least a first liquid conduit towards at least a first variable volume chamber, and a counterclockwise rotation of the inner paddle wheel member relative to the nonelastomeric outer canister pumps the damper liquid from the first variable volume chamber through the at least first liquid conduit towards the at least second variable volume chamber.

In an embodiment the invention includes a method of controlling a machine motion. The method includes providing a machine with a first member and a second member, the first machine member moving relative to the second machine member. The method includes providing a nonelastomeric outer member, the nonelastomeric outer member having an outer member fixation member. The method includes providing a nonelastomeric inner member, the nonelastomeric inner member having an inner member fixation member. The method includes providing a liquid. The method includes receiving the nonelastomeric inner member in the nonelastomeric outer member and forming at least a first variable volume chamber and at least a second variable volume chamber in fluid communication through at least a first fluid conduit with a fluid flow path. The method includes containing the liquid inside the outer member. The method includes fixing the outer member fixation member to the first machine member and fixing the inner member fixation member to the second machine member wherein the machine motion in a first direction pumps the liquid from the at least a second variable volume chamber through the at least first liquid conduit towards the at least a first variable volume chamber along the fluid flow path, the machine motion in a second opposing direction pumps the liquid from the at least first variable volume chamber through the at least first liquid conduit towards the at least second variable volume chamber along the fluid path. The method includes providing at least a first two way liquid pressure relief valve between the first and second variable volume chambers with the two way pressure relief valve opening a pressure relief conduit to a dynamic liquid pressure differential between the first and second variable volume chambers with a pressure relief flow path, the two way pressure relief valve opening the pressure relief conduit with an orthogonal valve stopper movement, the orthogonal valve stopper movement orthogonal to the pressure relief flow path.

In an embodiment the invention includes a rotary damper. The rotary damper includes a nonelastomeric outer canister, the nonelastomeric outer canister having an outer canister housing and an inner paddle wheel member receiving cavity for receiving an inner paddle wheel member, the inner paddle wheel member receiving cavity centered about a longitudinally extending center bore axis, the inner paddle wheel member receiving cavity including radially extending dividers including at least a first radially extending divider and at least a second radially extending divider, the radially extending dividers extending in a direction from the outer canister housing inward towards the center bore axis. The damper includes a nonelastomeric inner paddle wheel member, the nonelastomeric inner paddle wheel member having a center of rotation axis for alignment with the center bore axis, the nonelastomeric inner paddle wheel member including radially extending paddles including at least a first radially extending paddle and at least a second radially extending paddle. The damper includes a means for resisting a rotation of the inner paddle wheel member about the center of rotation axis relative to the nonelastomeric outer canister.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 11 shows an elastomeric intermediate member bonded between a nonelastomeric inner paddle wheel member and a nonelastomeric outer canister member with one nonelastomeric shim in between.

FIG. 12A-B shows an elastomeric intermediate member bonded between a nonelastomeric inner paddle wheel member and a nonelastomeric outer canister member with two nonelastomeric shims in between.

FIG. 13A-B shows an elastomeric intermediate member bonded between a nonelastomeric inner paddle wheel member and a nonelastomeric outer canister member with two nonelastomeric shims in between.

FIG. 14A-B shows an elastomeric intermediate member bonded between a nonelastomeric inner paddle wheel member and a nonelastomeric outer canister member without nonelastomeric shims in between.

DETAILED DESCRIPTION OF THE PREFERRED EMBODIMENTS

Figure 1:
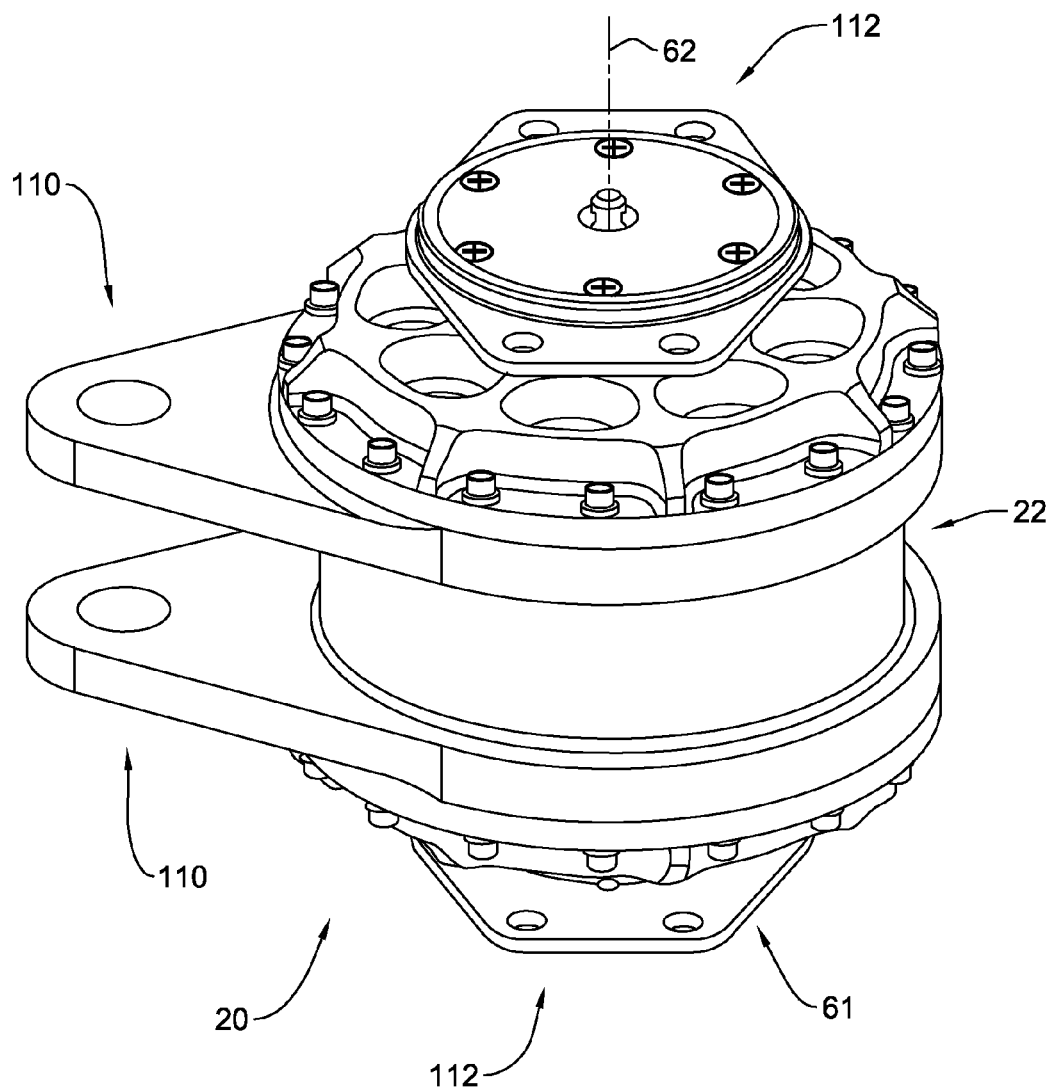
FIG. 1 shows a view of a rotary damper.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings. In embodiments the invention includes rotary wing aircraft rotary lead lag dampers 20. The rotary wing aircraft rotary lead lag dampers 20 include nonelastomeric outer canister member 22. The nonelastomeric outer canister 22 has an outer canister housing 24 and an inner paddle wheel member receiving cavity 26 for receiving an inner paddle wheel member 60. The inner paddle wheel member receiving cavity 26 is centered about a longitudinally extending center bore axis 28. The nonelastomeric outer canister has an upper canister lid 30 and a lower canister lid 32. The inner paddle wheel member receiving cavity 26 includes N (N being a whole integer number) radially extending dividers 34 including at least a first radially extending divider 36 and at least a second radially extending divider 38. The N radially extending dividers 34 extending in an inward direction from the outer canister wall housing 24 inward towards the center bore axis 28. In preferred embodiments the outer canister wall housing 24 includes at least N longitudinally extending liquid conduits 48 including at least a first longitudinally extending liquid conduit 50. The damper includes, a nonelastomeric inner paddle wheel member 60, the nonelastomeric inner paddle wheel member 60 having a center of rotation axis 62 for alignment with the center bore axis 28, the nonelastomeric inner paddle wheel member including N radially extending paddles 64 including at least a first radially extending paddle 66 and at least a second radially extending paddle 68. In preferred embodiments the radially extending paddles 64 include the liquid conduits 48. The damper includes a damper liquid 76. The damper includes an upper elastomeric tubular intermediate bearing member 78, and a lower elastomeric tubular intermediate bearing member 80, the nonelastomeric inner paddle wheel member 60 received in the nonelastomeric outer canister inner paddle wheel member receiving cavity 26 with the upper elastomeric tubular intermediate member 78 and the lower elastomeric tubular intermediate member 80 between the nonelastomeric inner paddle wheel member 60 and the nonelastomeric outer canister 22. Preferably the first radially extending divider 36 is received between the first radially extending paddle 66 and the second radially extending paddle 68, the first radially extending divider 36 and the first radially extending paddle 66 forming a first radially extending divider first variable volume chamber 82. The first radially extending divider 36 and the second radially extending paddle 68 form a first radially extending divider second variable volume chamber 84, the first radially extending divider first variable volume chamber 82 and the first radially extending divider second variable volume chamber 84 in liquid communication through the liquid conduit 48 wherein a clockwise rotation 86 of the inner paddle wheel member 60 about the center of rotation axis 62 relative to the nonelastomeric outer canister 22 pumps the damper liquid 76 from the first radially extending divider second variable volume chamber 84 through the liquid conduit 48, preferably a longitudinally extending conduit, towards the first radially extending divider first variable volume chamber 82, and a counterclockwise rotation 88 of the inner paddle wheel member 60 about the center of rotation axis 62 relative to the nonelastomeric outer canister pumps the damper liquid 76 from the first radially extending divider first variable volume chamber 82 through the liquid conduit towards the second radially extending divider second variable volume chamber 84.

In embodiments the rotary wing aircraft rotary lead lag damper 20 includes a second radially extending divider first variable volume chamber 90 and a second radially extending divider second variable volume chamber 92, the second radially extending divider first variable volume chamber 90 and the second radially extending divider second variable volume chamber 92 adjacent the second radially extending divider 38, with the damper liquid pumped through the second liquid conduit 52. The rotary wing aircraft rotary lead lag damper preferably includes a third radially extending divider first variable volume chamber 94 and a third radially extending divider second variable volume chamber 96, the third radially extending divider first variable volume chamber 94 and the third radially extending divider second variable volume chamber 96 adjacent the third radially extending divider 40, with the damper liquid pumped through third liquid conduit 54. The rotary wing aircraft rotary lead lag damper preferably includes a fourth radially extending divider first variable volume chamber 98 and a fourth radially extending divider second variable volume chamber 100, the fourth radially extending divider first variable volume chamber 98 and the fourth radially extending divider second variable volume chamber 100 adjacent the fourth radially extending divider 42 with the liquid pumped through third liquid conduit 56. The rotary wing aircraft rotary lead lag damper preferably including a fifth radially extending divider first variable volume chamber 102 and a fifth radially extending divider second variable volume chamber 104, the fifth radially extending divider first variable volume chamber 102 and the fifth radially extending divider second variable volume chamber 104 adjacent the fifth radially extending divider 44 with the liquid pumped through third liquid conduit 58.

The nonelastomeric outer canister outer canister housing having an outside diameter (OD) perimeter surface. In preferred embodiments the liquid conduits 48 are proximate the housing outside diameter perimeter surface. Preferably the at least N longitudinally extending liquid conduits are proximate the outside diameter perimeter surface. In an alternative preferred embodiment the liquid conduits 48 are nonlongitudinally extending latitudinal liquid damping conduits 48 proximate the housing outside diameter perimeter surface, such as conduits 48 in FIG. (L), with latitudinal liquid damping conduits 48 extending latitudinally through radially extending dividers 34, preferably normal to longitudinally extending axis 28. Preferably the nonelastomeric outer canister outer canister housing is comprised of a metal, preferably a metal having a thermal conductivity of at least 50 (W/m K), preferably at least 100 (W/m K), preferably at least 130 (W/m K), preferably at least 195 (W/m K), preferably at least 290 (W/m K). In a preferred embodiment the nonelastomeric outer canister outer canister housing comprised of aluminum. Preferably the at least N longitudinally extending liquid conduits include an upper entrance/exit port and a lower entrance/exit port wherein the flow of liquid from a first variable volume chamber to a second variable volume chamber is a nonline of sight flow path.

Preferably the upper elastomeric tubular intermediate bearing member 78 has an inner bonding elastomeric surface 77 and outer bonding elastomeric surface 77, wherein the inner bonding elastomeric surface is bonded to an outer nonelastomeric surface 77 of the nonelastomeric inner paddle wheel member 60 and the outer bonding elastomeric surface 77 is bonded to an inner nonelastomeric surface 77 of the nonelastomeric outer canister 22, most preferably mold bonded in a elastomeric mold 200 that receives the nonelastomeric inner and outer members that the elastomer 200 is bonded to. Preferably the elastomer is comprised of a natural rubber. Preferably the elastomer is bonded to the nonelastomeric metal surfaces of the nonelastomeric inner and outer members with a rubber to metal adhesive. Preferably the upper and lower elastomeric tubular intermediate bearing members include at least one nonelastomeric shim member 79 between the inner and outer member bonding surfaces 77, preferably at least one cylindrical tubular shell shim 79, preferably with the cylindrical shim members 79 centered about the axis of rotation 62 and the center bore axis 28. Preferably a canister lid nonelastomeric outer member rigid lid member 31 and a paddle wheel nonelastomeric member extension rigid member 61 are received in the elastomeric mold 200 with the at least one shim member 79 in between, having concentric cylindrical bonding shell surfaces centered about the axis of rotation and the center bore axis. Preferably the rotary wing aircraft rotary lead lag damper 20 includes a variable volume fluid expansion compensation chamber gas compliance member 120, the variable volume fluid expansion compensation chamber 120 providing a variable volume expansion chamber in liquid communication with the radially extending divider variable volume chambers, preferably a gas charged gas sprung fluid piston 119 with a gas spring 118 charged through a gas charging inlet 122. The damper 20 preferably has an upper compliance compensation chamber 120 in the upper half member of the inner paddle wheel 60, and a lower compliance compensation chamber 120 in the lower half member of the inner paddle wheel 60. Preferably the damper includes an upper and lower gas charging inlet 122, with upper and lower expansion compensation chambers 120 in liquid communication with the variable volume pumping chambers through a liquid compensation conduit 124, preferably a dynamically isolating liquid compensation conduit 124 having a relatively small liquid communication orifice into a variable volume chamber wherein the liquid in the compliance compensation chambers 120 is dynamically isolated from the pressure differentials generated in the variable volume chambers by the relative rotation between the outer canister 22 and the inner paddle wheel member 60. Preferably the upper and lower gas sprung pistons 119 apply a gas charged spring pressure to the liquid 76 in the compensation chambers 120 which can flow through central middle liquid conduit 123 and through dynamically isolating liquid compensation conduits 124 into fluid communication with the variable volume damper pumping chambers. Preferably the gas springs 118, pistons 119, chambers 120, and central liquid conduit 123 are contained within the inner paddle wheel member 60 and move relative to the outer housing 24 with intermediate bearing elastomers 78,80 providing for the relative rotation movement and containment of the liquid 76 within the damper. Preferably the liquid compensation chambers are housed within the inner paddle wheel member 60 and disposed proximate the intermediate elastomeric bearings 78,80, preferably with the liquid 76 proximate and adjacent the elastomeric members 78,80 dynamically isolated from the pressure differentials generated in the variable volume chambers by the relative rotation between the outer canister 22 and the inner paddle wheel member 60 with dynamically isolating relatively small liquid communication conduits. Preferably inner paddle wheel member includes a machine fixation member 112, for attachment to a first relative moving rotary wing machine member, preferably with the inner paddle wheel member fixation members 112 extending outward along the longitudinal center bore axis 28 and through the inside of the elastomer tubular bearing members 78,80. Preferably the outer nonelastomeric canister 22 includes a machine fixation member 110 for attachment to a second relative moving rotary wing machine member, preferably with the outer nonelastomeric canister fixation member 110 rotating through a rotation oscillation angle relative to the inner paddle wheel fixation member 112 to damp the lead lag motion of the rotary wing by pumping the damper liquid 76 through the liquid conduits 48. Preferably the damper liquid 76 is comprised of silicon, preferably a silicone damper liquid.

Figure 15:
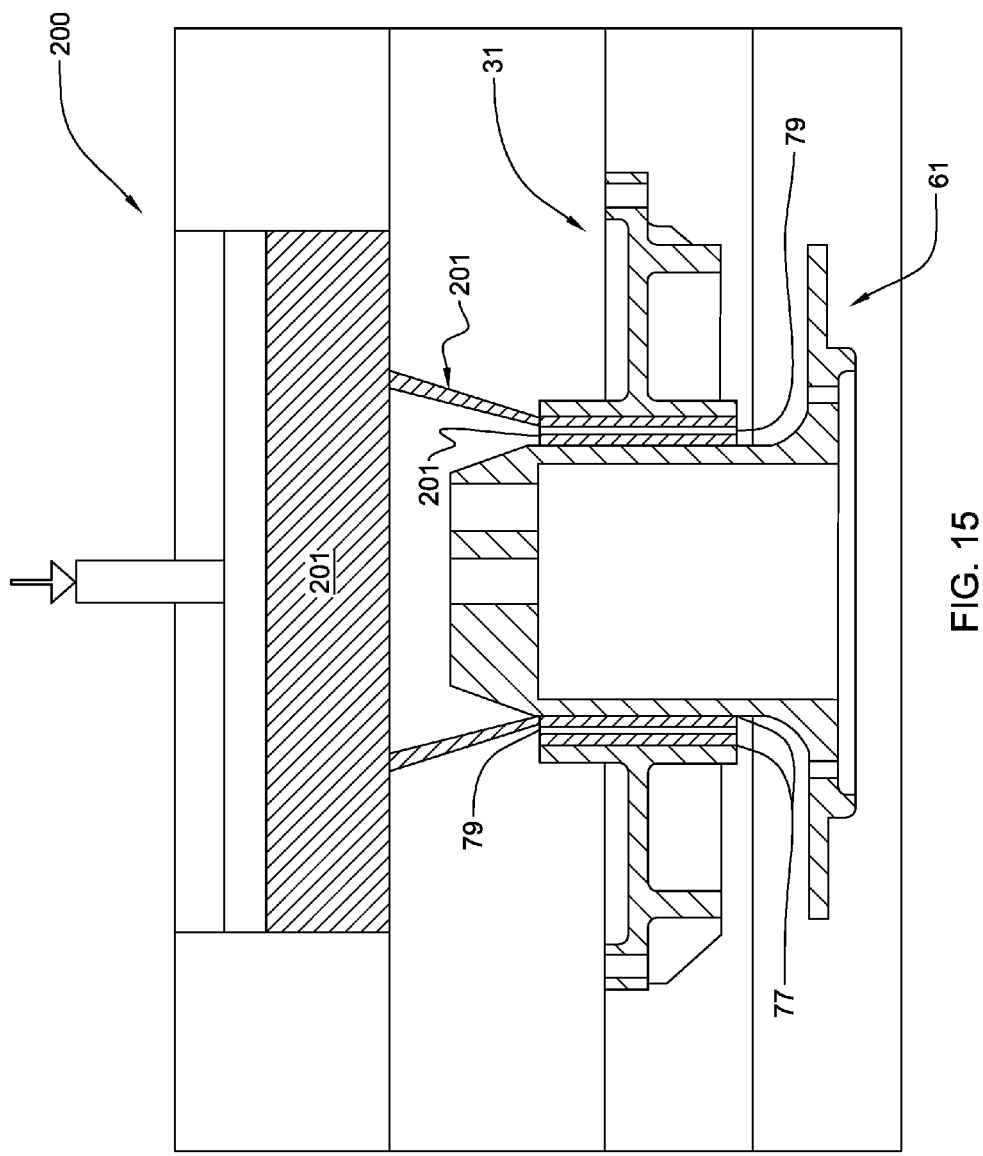
FIG. 15 shows a method of making a rotary damper elastomeric intermediate member.
Figure 16A:
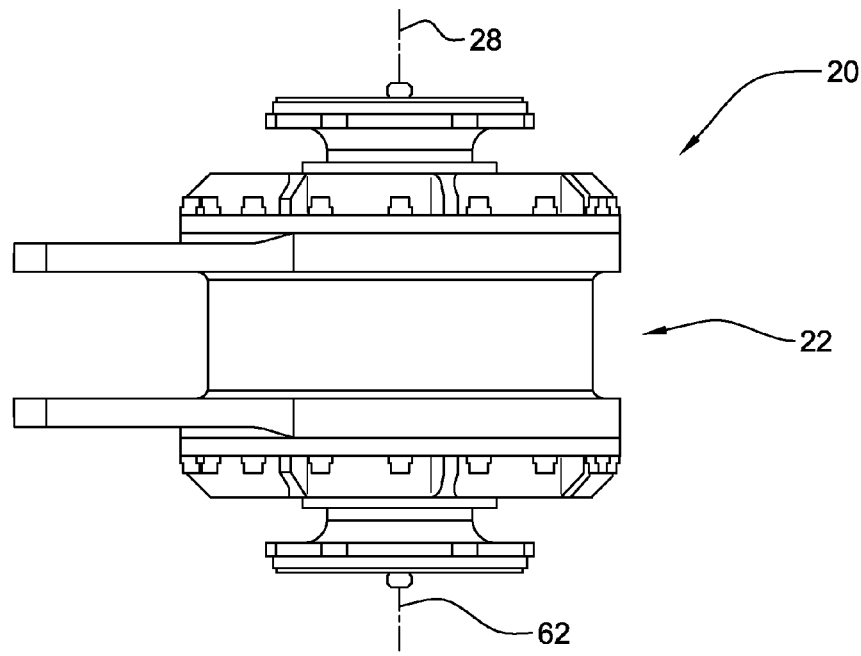
FIG. 16A-B shows a side and a cross section view of a damper.
Figure 16B:
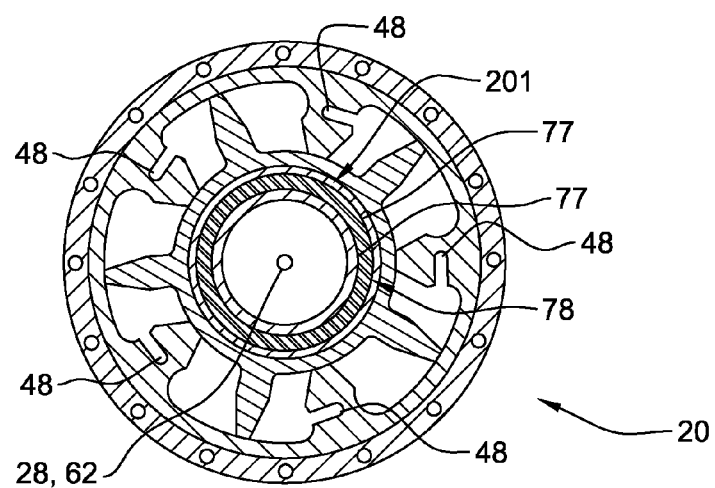
Figure 17:
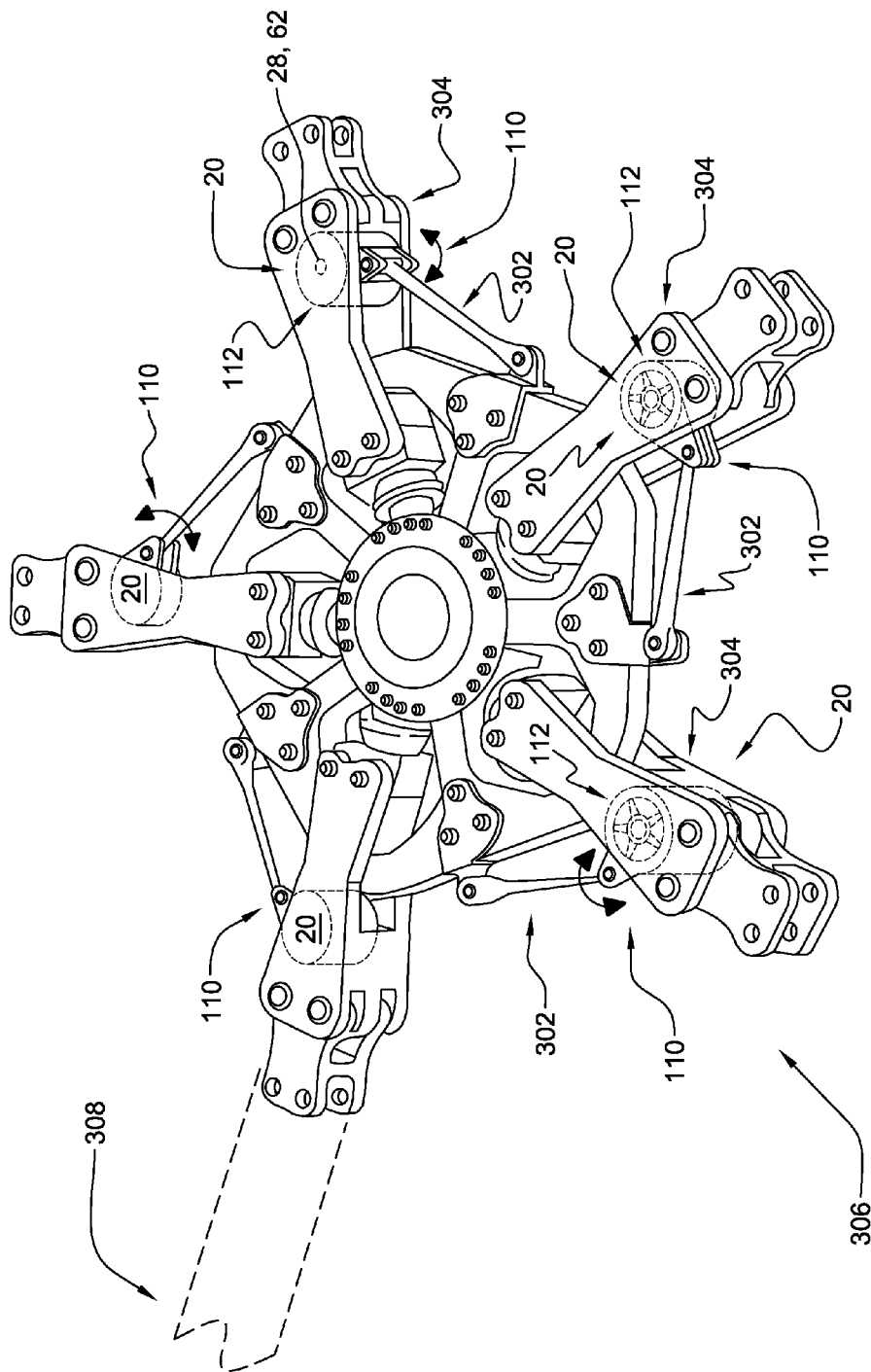
FIG. 17 shows a rotary damper controlling motion in an aircraft rotary wing system.
Figure 18:
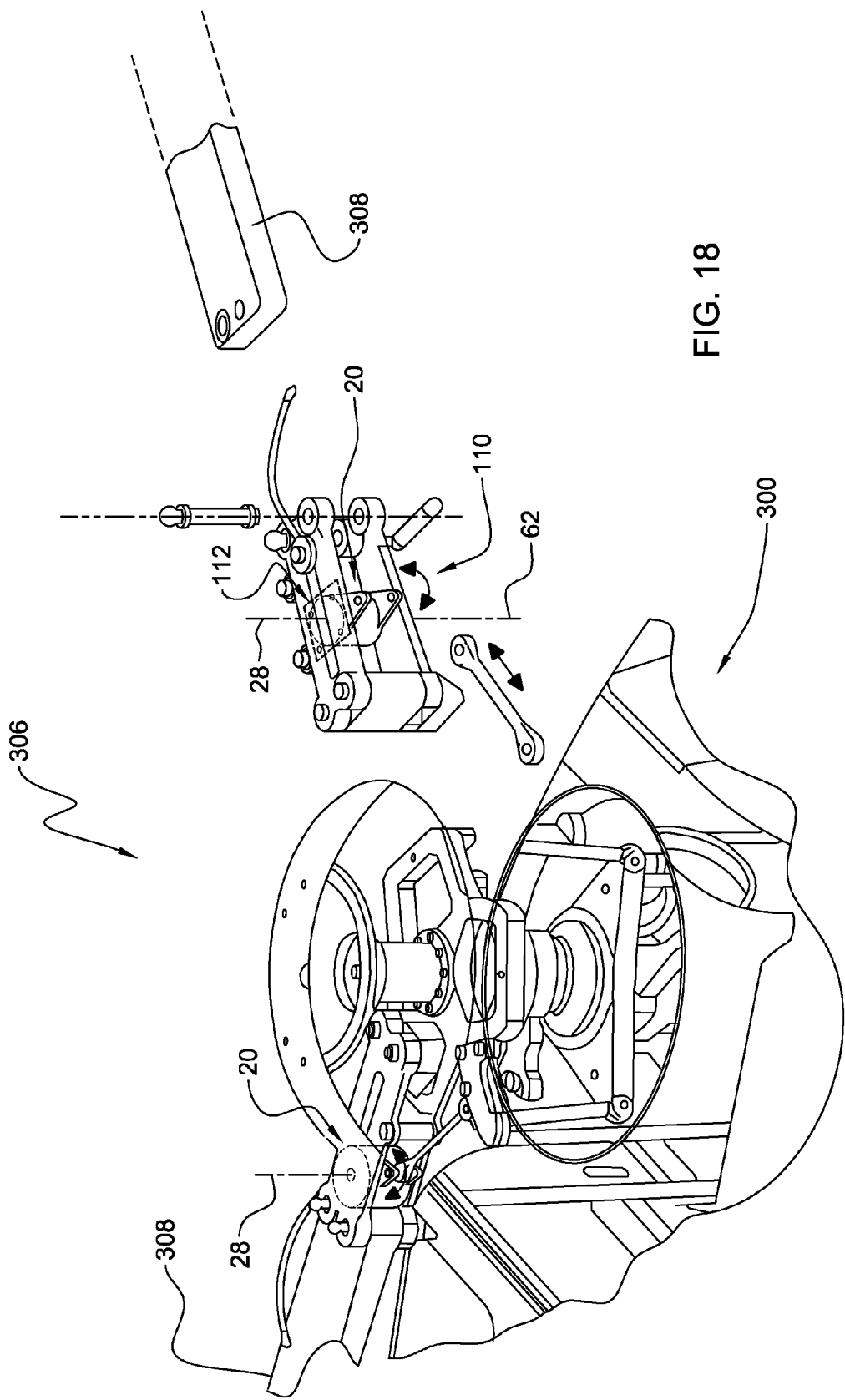
FIG. 18 shows a rotary damper for controlling motion in a helicopter.
Figure 19:
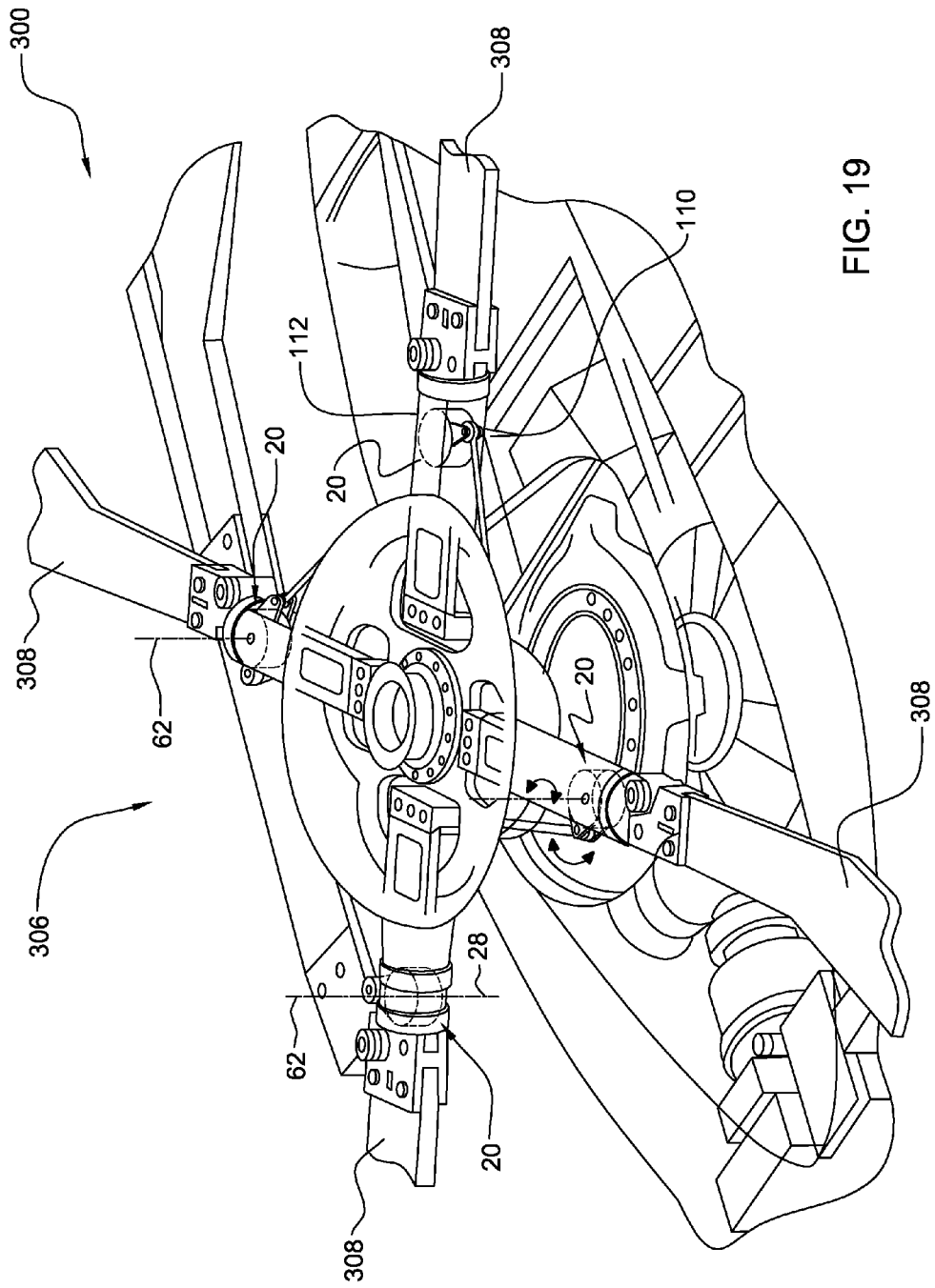
FIG. 19 shows rotary dampers controlling motion in an aircraft rotary wing machine.
Figure 20A:
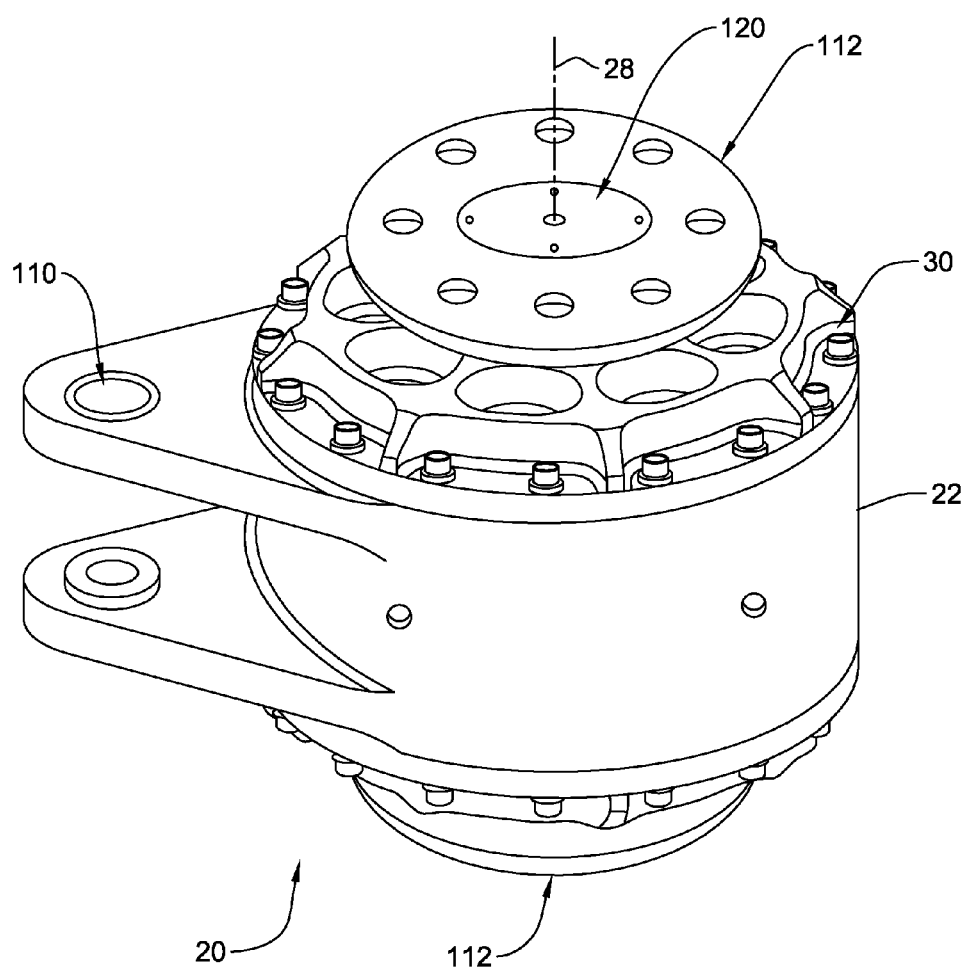
FIG. 20A shows a view of a rotary damper.
Figure 20B:
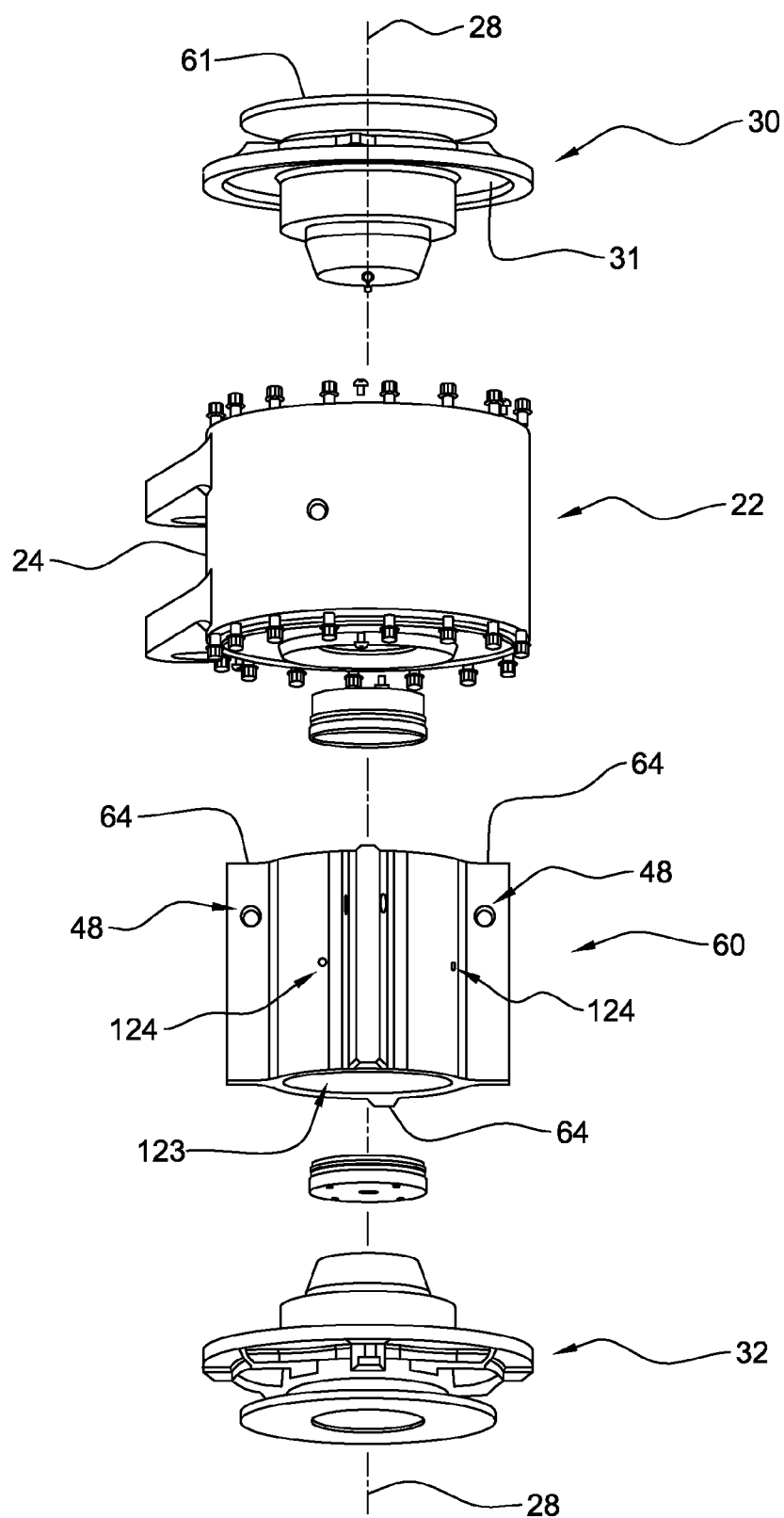
FIG. 20B shows an exploded view of the rotary damper.
Figure 20C:
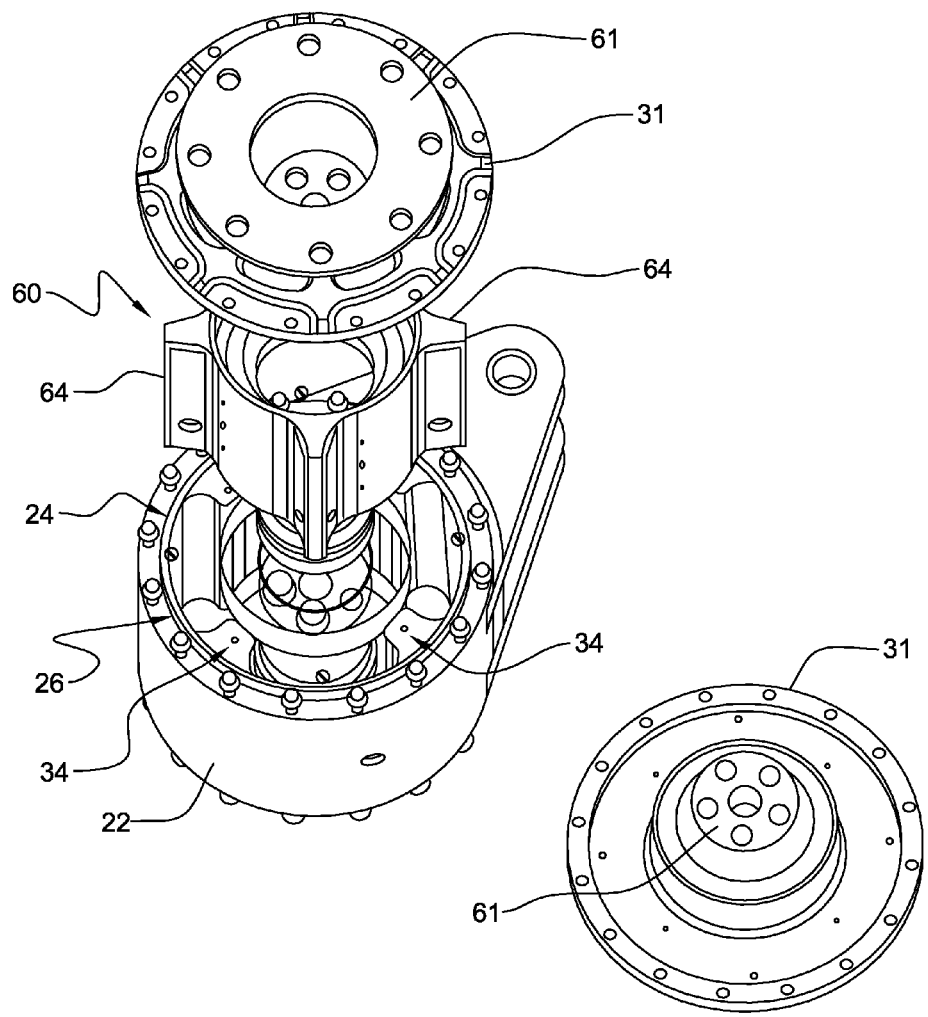
FIG. 20C shows an exploded view of the rotary damper.
Figure 20D:
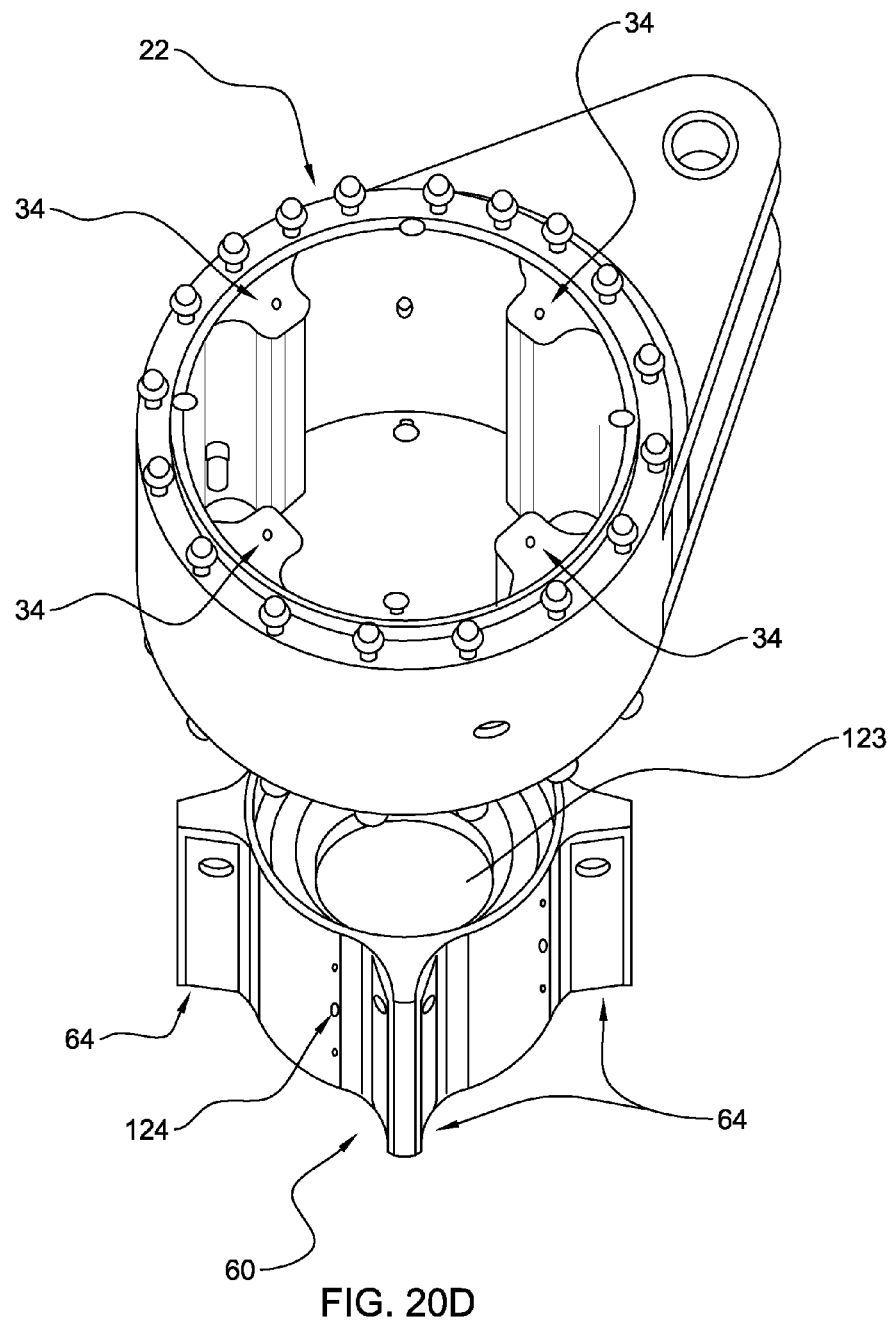
FIG. 20D shows an exploded view of the rotary damper.
Figure 20E:
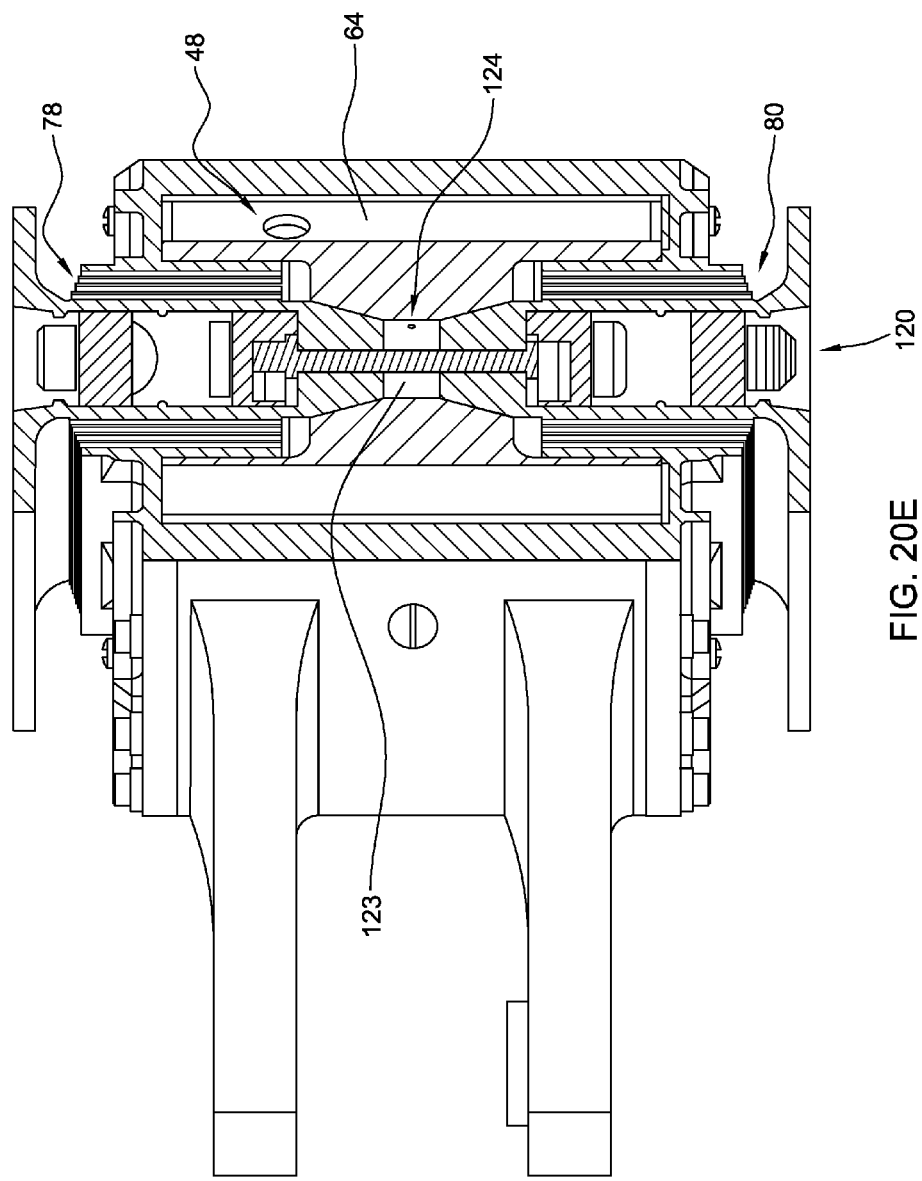
FIG. 20E shows a cross sectional view of the rotary damper.
Figure 20F:
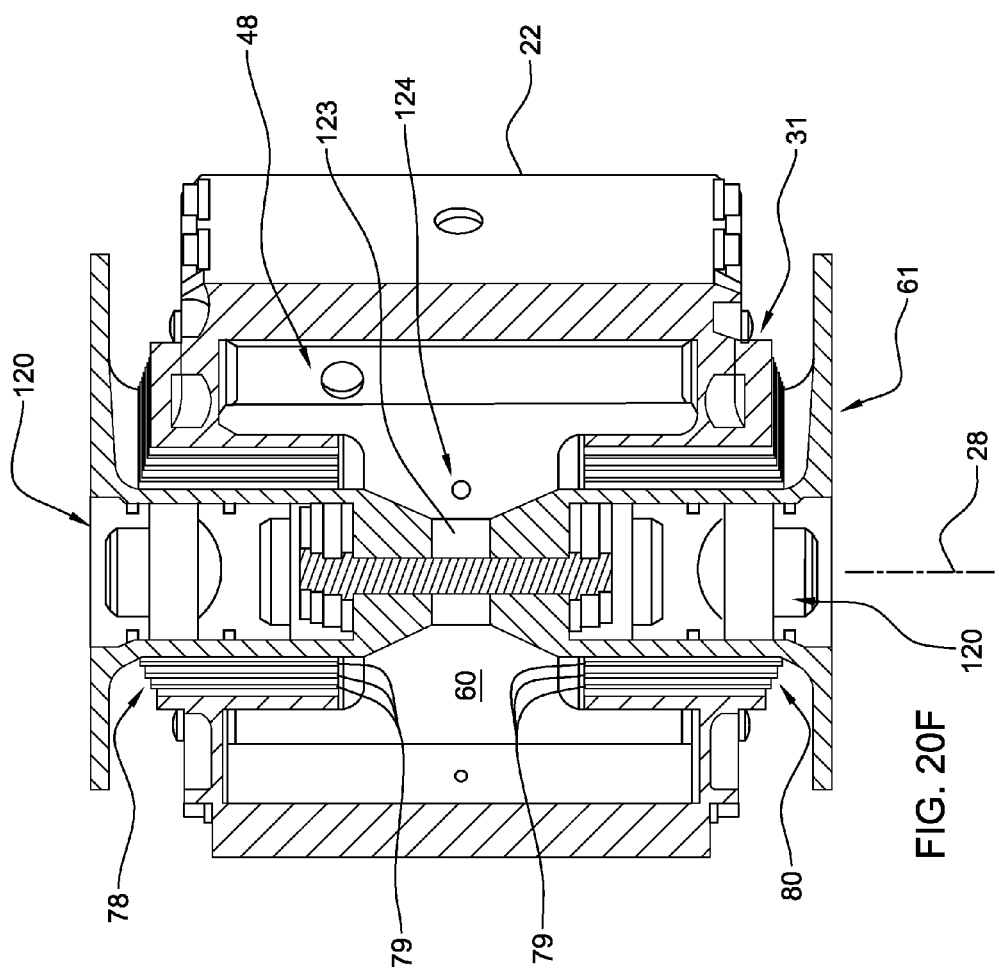
FIG. 20F shows a cross sectional view of the rotary damper.
Figure 20G:
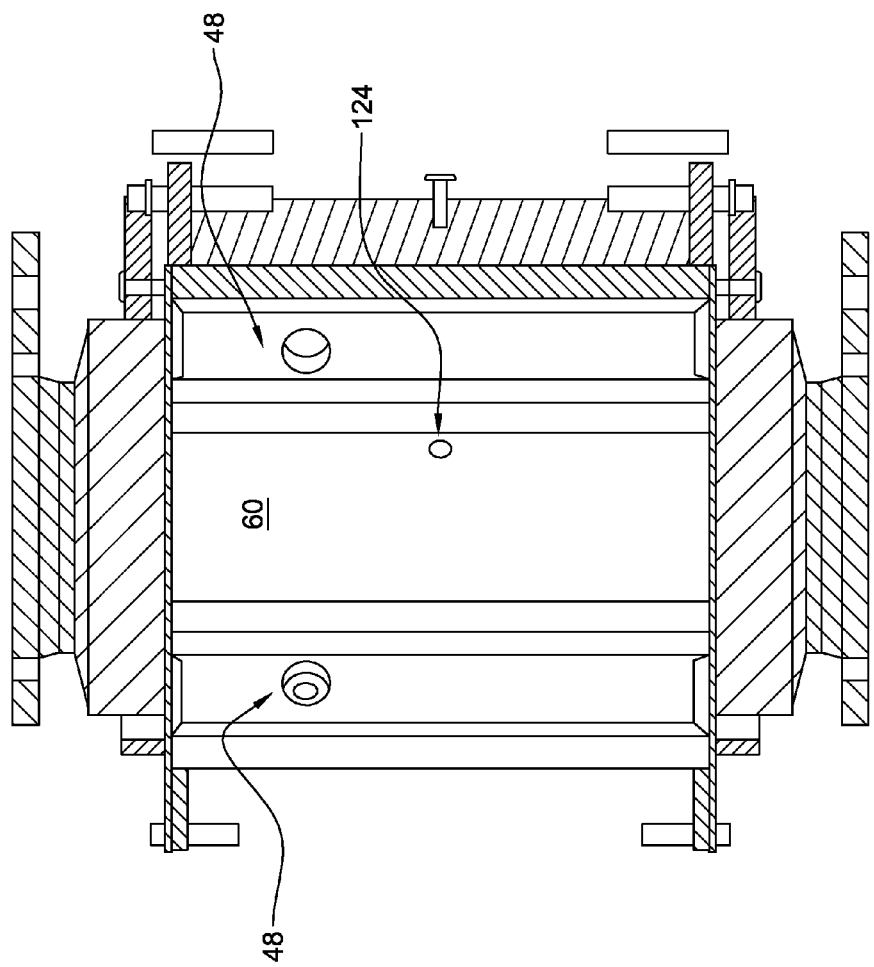
FIG. 20G shows a view of the rotary damper with the damper partially ghosted to highlight the nonelastomeric inner paddle wheel member.
Figure 21A:
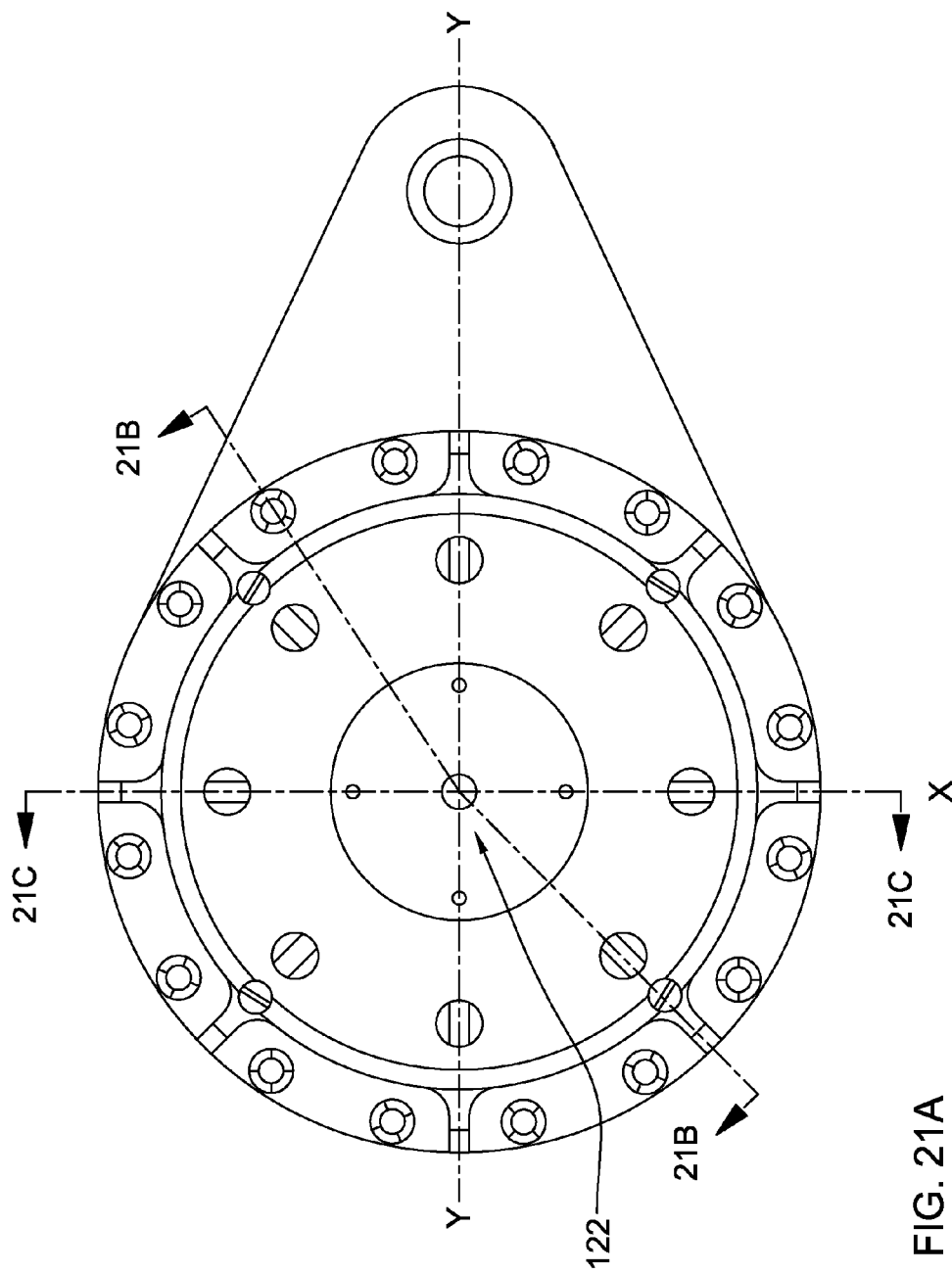
FIG. 21A shows a view of a rotary damper.
Figure 21B:
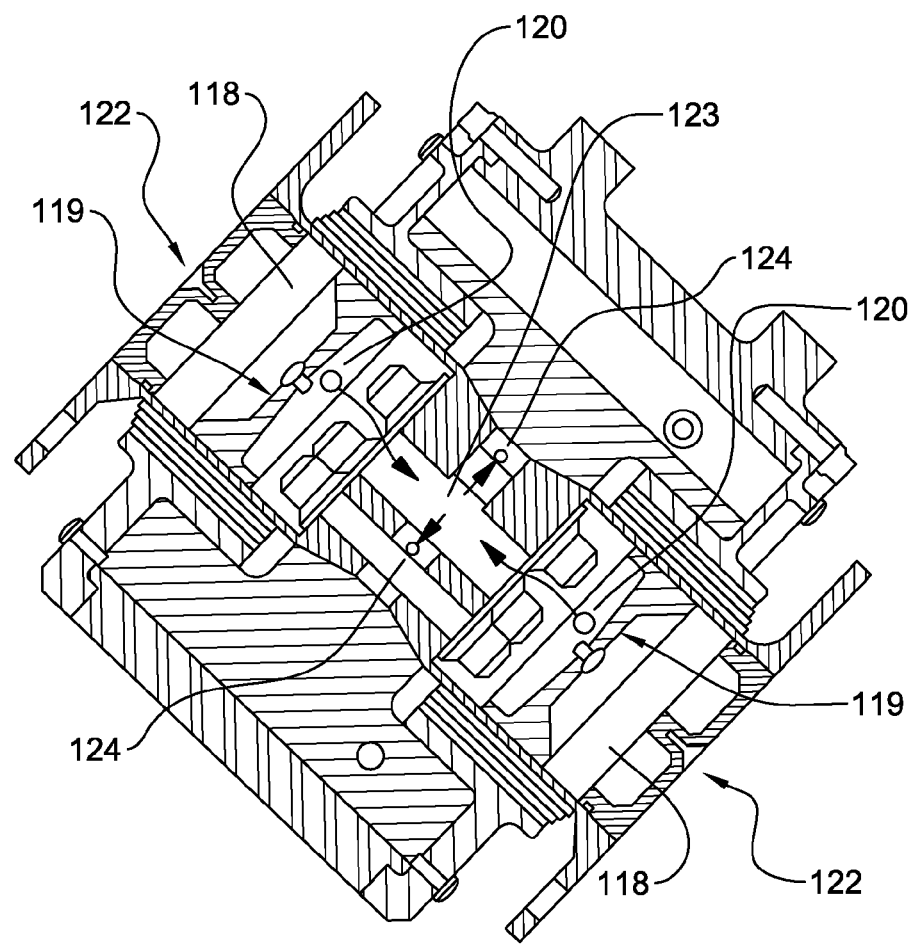
FIG. 21B shows a cross section of the rotary damper with damper liquid flow from the expansion compensation chambers.
Figure 21C:
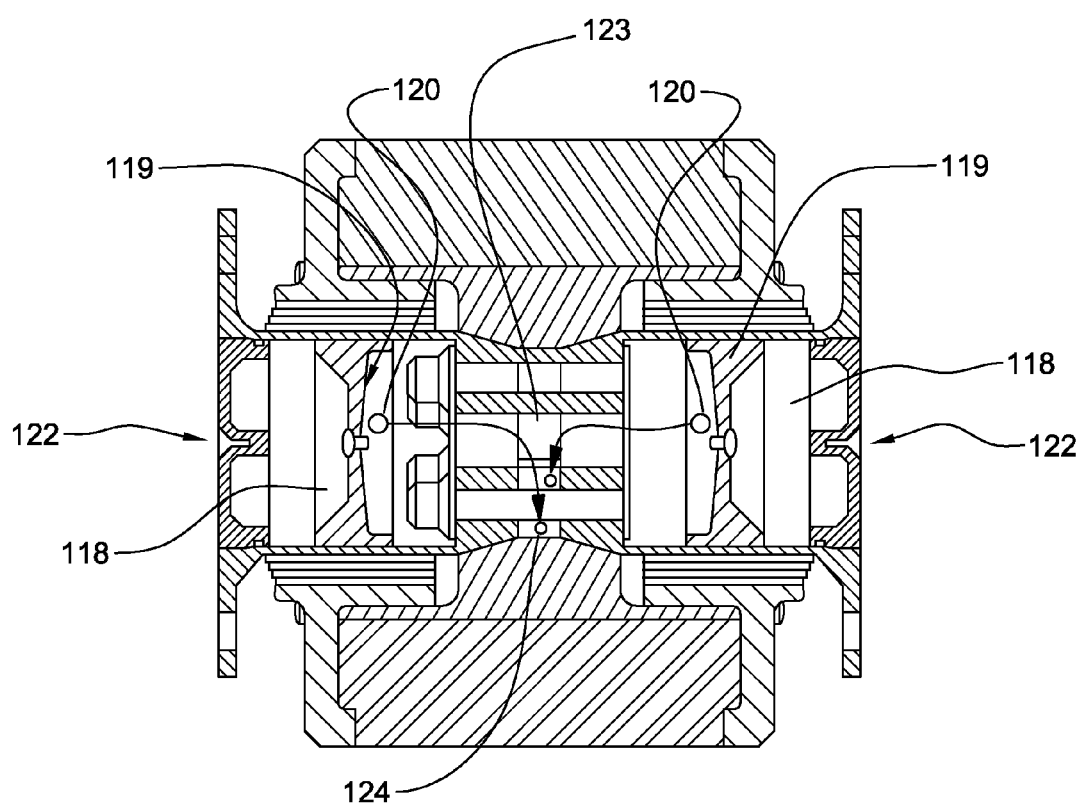
FIG. 21C shows a cross section of the rotary damper with damper liquid flow from the expansion compensation chambers.

In an embodiment the invention includes a method of making a rotary wing aircraft lead lag damper 20. The method includes the steps of providing the nonelastomeric outer canister 22, the nonelastomeric outer canister 22 having an outer perimeter and an inner paddle wheel member receiving cavity 26 for receiving the inner paddle wheel member 60, the inner paddle wheel member receiving cavity 26 centered about a longitudinally extending center bore axis 28. Preferably the inner paddle wheel member receiving cavity 26 includes N (whole integer number) radially extending dividers 34, preferably including at least a first radially extending divider 36 and at least a second radially extending divider 38, the N radially extending dividers 34 extending in an inward direction from the outer canister perimeter inward towards the center bore axis 28. In a preferred embodiment the outer canister includes at least N longitudinally extending liquid conduits 48 proximate the outer perimeter, and preferably including at least a first longitudinally extending liquid conduit 50. The method includes providing the nonelastomeric inner paddle wheel member 60, the nonelastomeric inner paddle wheel member 60 having a center of rotation axis 62 for alignment with the center bore axis 28, with the nonelastomeric inner paddle wheel member including N radially extending paddles 64. The inner paddle wheel member 60 preferably includes at least a first radially extending paddle 66 and at least a second radially extending paddle 68. The method includes providing the damper liquid 76. The method includes providing at least a first upper elastomeric tubular intermediate bearing member 78 and preferably a second lower elastomeric tubular intermediate bearing member 80. The method includes receiving the nonelastomeric inner paddle wheel member 60 in the nonelastomeric outer canister inner paddle wheel member receiving cavity 26 with the elastomeric tubular intermediate members 78,80 between the nonelastomeric inner paddle wheel member 60 and the nonelastomeric outer canister 22. Preferably the first radially extending divider 36 is received between the first radially extending paddle 66 and the second radially extending paddle 68, the first radially extending divider 36 and the first radially extending paddle 66 forming a first radially extending divider first variable volume chamber 82, the first radially extending divider 36 and the second radially extending paddle 68 forming a first radially extending divider second variable volume chamber 84, the first radially extending divider first variable volume chamber 82 and the first radially extending divider second variable volume chamber 84 in fluid communication through the first longitudinally extending liquid conduit 50. The method includes disposing and containing the damper liquid inside the outer canister 22 with the elastomeric tubular intermediate members 78,80 and the nonelastomeric inner paddle wheel member 60 extending out through the elastomeric intermediate members wherein a clockwise rotation 86 of the inner paddle wheel member 60 about the center of rotation axis 62 relative to the nonelastomeric outer canister 22 pumps the damper liquid 76 from a second variable volume chamber through a first liquid conduit 48 towards a first variable volume chamber, and a counterclockwise rotation 88 of the inner paddle wheel member 60 about the center of rotation axis 62 relative to the nonelastomeric outer canister pumps the damper liquid 76 from the first variable volume chamber through the liquid conduit 48 towards the second variable volume chamber. Preferably containing the liquid includes providing the nonelastomeric outer canister upper canister lid 30 and the lower canister lid 32 and capping the canister with the lids, preferably with the lid rigid member 31 bonded to the tubular elastomers which are preferably bonded to rigid surfaces of the inner wheel rigid extension members 61. The method preferably includes forming the second radially extending divider first variable volume chamber 90, the second radially extending divider second variable volume chamber 92, the second radially extending divider first variable volume chamber 90 and the second radially extending divider second variable volume chamber 92 adjacent the second radially extending divider 38 with the liquid pumped through a second liquid conduit 48. The method preferably includes forming the third radially extending divider first variable volume chamber 94, and the third radially extending divider second variable volume chamber 96, the third radially extending divider first variable volume chamber 94 and the third radially extending divider second variable volume chamber 96 adjacent the third radially extending divider 40, with the liquid pumped through third liquid conduit 54. The method preferably includes forming the fourth radially extending divider first variable volume chamber 98, and the fourth radially extending divider second variable volume chamber 100, the fourth radially extending divider first variable volume chamber 98 and the fourth radially extending divider second variable volume chamber 100 adjacent the fourth radially extending divider 42, with the liquid pumped through third liquid conduit 56. The method preferably includes forming the fifth radially extending divider first variable volume chamber 102, and the fifth radially extending divider second variable volume chamber 104, the fifth radially extending divider first variable volume chamber 102 and the fifth radially extending divider second variable volume chamber 104 adjacent the fifth radially extending divider 44 with the liquid pumped through fifth liquid conduit 58. Preferably the method includes providing the nonelastomeric outer canister outer perimeter with the outside (diameter OD) perimeter surface, with the at least N liquid conduits 48 proximate the outside (OD) perimeter surface, preferably with the nonelastomeric outer canister outer canister housing comprised of metal, preferably aluminum. Preferably the at least N liquid conduits 48 are longitudinally extending liquid conduits, which preferably are provided with the upper entrance/exit ports and a lower entrance/exit ports wherein the flow of liquid from a first variable volume chamber to a second variable volume chamber is a nonline of sight liquid flow path course with both horizontal and vertical paths having connecting turns for the liquid flow path. In an alternative preferred embodiment the at least N liquid conduits 48 are latitudinally extending liquid damping conduits. Preferably the latitudinal liquid damping conduits 48 extend through the paddle wheel member 60, preferably with line of site flow paths through the radially extending paddles 64. In an alternative embodiment the latitudinal liquid damping conduits 48 extend through the canister 22. Preferably the elastomeric tubular intermediate bearing member 78 has the inner bonding elastomeric surface and the outer bonding elastomeric surface, and the method includes bonding the inner bonding elastomeric surface to the outer nonelastomeric surface of the nonelastomeric inner paddle wheel member 60 and bonding the outer bonding elastomeric surface to the inner nonelastomeric surface of the nonelastomeric outer canister 22, preferably mold bonded in a elastomeric mold 200 that receives the nonelastomeric inner and outer members that the elastomer 201 is bonded to, such as shown in FIG. 15. Preferably the elastomer is comprised of a natural rubber, preferably bonded to the nonelastomeric metal surfaces with a RTM (Rubber To Metal) adhesive. Preferably the elastomeric tubular intermediate bearing member includes at least one nonelastomeric shim member 79 between the inner and outer bonding surfaces, preferably at least one cylindrical shell shim 79, preferably with the cylindrical shim members centered about the axis of rotation and the center bore axis. Preferably the canister lid nonelastomeric member and the paddle wheel nonelastomeric member are received in the elastomeric mold 200 with the at least one shim member in between, with the multiple concentric cylindrical bonding shell surfaces centered about the axis of rotation and the center bore axis. Preferably the variable volume fluid expansion compensation chamber is provided in liquid communication with the radially extending divider variable volume chambers, preferably with a gas charged gas sprung fluid piston, preferably with an upper compliance compensation chamber in the upper half member of the inner paddle wheel, and a lower compliance compensation chamber in the lower half member of the inner paddle wheel. Preferably the gas charged gas sprung fluid pistons are charged through gas charging inlets, with the expansion compensation chambers in liquid communication with the variable volume pumping chambers through a liquid compensation conduit, preferably a dynamically isolating liquid compensation conduit 124. Preferably the inner paddle wheel member includes the fixation member 112 for attachment to first relative moving rotary wing machine member, preferably with the inner paddle wheel member fixation members 112 extending along the longitudinal center bore axis and through the inside of the elastomer tubular bearing member. Preferably the outer nonelastomeric canister 22 includes fixation member 110 for attachment to a second relative moving rotary wing machine member, preferably with the outer nonelastomeric canister fixation member 110 rotating through a rotation oscillation angle relative to the inner paddle wheel fixation member 112 to damp the lead lag motion of the rotary wing machine by pumping the damper liquid through the liquid conduits 48.

In an embodiment the invention includes a method of controlling an aircraft machine motion. The method includes providing an aircraft machine 300 with a rotary wing system 306 with rotary wings 308 and a first member 302 and a second member 304, the first member 302 moving relative to the second member 304. The method includes providing the nonelastomeric outer member 22, the nonelastomeric outer member 22 having the outer member fixation member 110 and an outer perimeter OD. The nonelastomeric outer member 22 includes the inner paddle wheel member receiving cavity 26 for receiving the inner paddle wheel member 60, the inner paddle wheel member receiving cavity 26 centered about the longitudinally extending center bore axis 28, the inner paddle wheel member receiving cavity 26 including N radially extending dividers 34. The nonelastomeric outer member 22 preferably includes the at least first radially extending divider 36 and the at least second radially extending divider 38. The N radially extending dividers 34 extending in an inward direction from the outer canister perimeter inward towards the center bore axis 28. The method includes providing at least N liquid conduits 48. In preferred embodiments the liquid conduits are proximate the outer perimeter nonelastomeric outer member 22. In a preferred embodiment the liquid conduits are longitudinally extending liquid conduits 48, proximate the outer perimeter, preferably including at least a first longitudinally extending liquid conduit 50. The method includes providing the nonelastomeric inner paddle wheel member 60, the nonelastomeric inner paddle wheel member 60 having an inner member fixation member and a center of rotation axis 62 for alignment with the center bore axis 28, the nonelastomeric inner paddle wheel member including N radially extending paddles 64 including at least a first radially extending paddle 66 and at least a second radially extending paddle 68. The method includes providing damper liquid 76. The method includes providing at least a first upper elastomeric tubular intermediate bearing member 78 and a lower elastomeric tubular intermediate bearing member 80. The method includes receiving the nonelastomeric inner paddle wheel member 60 in the nonelastomeric outer canister inner paddle wheel member receiving cavity 26 with the elastomeric tubular intermediate member 78 and the lower elastomeric tubular intermediate member 80 between the nonelastomeric inner paddle wheel member 60 and the nonelastomeric outer canister 22. Preferably the first radially extending divider 36 is received between the first radially extending paddle 66 and the second radially extending paddle 68, the first radially extending divider 36 and the first radially extending paddle 66 forming a first radially extending divider first variable volume chamber 82, the first radially extending divider 36 and the second radially extending paddle 68 forming a first radially extending divider second variable volume chamber 84, the first radially extending divider first variable volume chamber 82 and the first radially extending divider second variable volume chamber 84 in fluid communication through the liquid conduit 48. The method includes disposing and containing the damper liquid inside the outer member. The method includes fixing the outer member fixation member to the first aircraft machine member and fixing the inner member fixation member to the second aircraft machine member wherein a clockwise rotation of the inner paddle wheel member 60 about the center of rotation axis 62 relative to the nonelastomeric outer canister 22 pumps the damper liquid 76 from the first radially extending divider second variable volume chamber 84 through the first longitudinally extending liquid conduit 50 towards the first radially extending divider first variable volume chamber 82, and a counterclockwise rotation of the inner paddle wheel member 60 about the center of rotation axis relative to the nonelastomeric outer canister pumps the damper liquid 76 from the first radially extending divider first variable volume chamber 82 through the first longitudinally extending liquid conduit 50 towards the second radially extending divider second variable volume chamber 84. Preferably containing the liquid includes providing the nonelastomeric outer canister upper canister lid 30 and lower canister lid 32 and capping the canister with the lids, preferably with the lid bonded to the tubular elastomers which are preferably bonded to rigid surfaces of the inner wheel extension members. Preferably the method includes forming the second radially extending divider first variable volume chamber 90, and the second radially extending divider second variable volume chamber 92, the second radially extending divider first variable volume chamber 90 and the second radially extending divider second variable volume chamber 92 adjacent the second radially extending divider 38 with the liquid pumped through the second liquid conduit 52. The method preferably includes forming the third radially extending divider first variable volume chamber 94, and the third radially extending divider second variable volume chamber 96, the third radially extending divider first variable volume chamber 94 and the third radially extending divider second variable volume chamber 96 adjacent the third radially extending divider 40, with the liquid pumped through third liquid conduit 54. The method preferably includes forming the fourth radially extending divider first variable volume chamber 98, and the fourth radially extending divider second variable volume chamber 100, the fourth radially extending divider first variable volume chamber 98 and the fourth radially extending divider second variable volume chamber 100 adjacent the fourth radially extending divider 42, with the liquid pumped through third liquid conduit 56. The method preferably includes forming the fifth radially extending divider first variable volume chamber 102, and the fifth radially extending divider second variable volume chamber 104, the fifth radially extending divider first variable volume chamber 102 and the fifth radially extending divider second variable volume chamber 104 adjacent the fifth radially extending divider 44 with the liquid pumped through fifth liquid conduit 58. Preferably the method includes providing the nonelastomeric outer canister outer perimeter with the outside (diameter OD) perimeter surface, with the at least N liquid conduits proximate the outside (OD) perimeter surface, preferably with the nonelastomeric outer canister outer canister housing comprised of metal, preferably aluminum. Preferably the at least N longitudinally extending liquid conduits are provided with the upper entrance/exit ports and a lower entrance/exit ports wherein the flow of liquid from a first variable volume chamber to a second variable volume chamber is a nonline of sight course with horizontal and vertical paths with connecting turns for the flow path. Preferably the elastomeric tubular intermediate bearing member 78 has the inner bonding elastomeric surface and the outer bonding elastomeric surface, and the method includes bonding the inner bonding elastomeric surface to the outer nonelastomeric surface of the nonelastomeric inner paddle wheel member 60 and bonding the outer bonding elastomeric surface to the inner nonelastomeric surface of the nonelastomeric outer canister 22, preferably mold bonded in a elastomeric mold 200 that receives the nonelastomeric inner and outer members that the elastomer 201 is bonded to. Preferably the elastomer is comprised of a natural rubber, preferably bonded to the nonelastomeric metal surfaces with a RTM adhesive. Preferably the elastomeric tubular intermediate bearing member includes at least one nonelastomeric shim member 79 between the inner and outer bonding surfaces, preferably at least one cylindrical shell shim 79, preferably with the cylindrical shim members centered about the axis of rotation and the center bore axis. Preferably the canister lid nonelastomeric member and the paddle wheel nonelastomeric member are received in the elastomeric mold 200 with the at least one shim member in between, having the multiple concentric cylindrical bonding shell surfaces centered about the axis of rotation and the center bore axis. Preferably the variable volume fluid expansion compensation chamber is provided in liquid communication with the radially extending divider variable volume chambers, preferably a gas charged gas sprung fluid piston, preferably with an upper compliance compensation chamber in the upper half member of the inner paddle wheel, and a lower compliance compensation chamber in the lower half member of the inner paddle wheel, preferably with a gas charging inlet, and with the expansion compensation chamber in liquid communication with the variable volume pumping chambers through a liquid compensation conduit, preferably a dynamically isolating liquid compensation conduit.

Preferably the inner paddle wheel member includes the fixation member 112 for attachment to first relative moving rotary wing member, preferably the inner paddle wheel member fixation members 112 extend along the longitudinal center bore axis and through the inside of the elastomer tubular bearing member. Preferably the outer nonelastomeric canister 22 includes fixation member 110 for attachment to a second relative moving rotary wing member, preferably the outer nonelastomeric canister fixation member rotating through a rotation oscillation angle relative to the inner paddle wheel fixation member to damp lead lag motion of the rotary wing by pumping the damper liquid through the longitudinally extending liquid conduits 48.

In an embodiment the invention includes the rotary damper 20. The rotary damper includes the nonelastomeric outer canister 22, the nonelastomeric outer canister 22 having the outer canister housing 24 and the inner paddle wheel member receiving cavity 26 for receiving the inner paddle wheel member 60, the inner paddle wheel member receiving cavity 26 centered about a longitudinally extending center bore axis 28. Preferably the nonelastomeric outer canister includes upper canister lid 30 and lower canister lid 32. Preferably the nonelastomeric outer canister includes the inner paddle wheel member receiving cavity 26 including N (whole integer number) radially extending dividers 34 including at least a first radially extending divider 36 and at least a second radially extending divider 38, the N radially extending dividers 34 extending in a inward direction from the outer canister wall housing 24 inward towards the center bore axis 28. The damper includes at least N liquid damping conduits 48. Preferably the outer canister wall housing 24 includes at least N longitudinally extending liquid conduits 48 including at least a first longitudinally extending liquid conduit 50. The damper includes the nonelastomeric inner paddle wheel member 60, the nonelastomeric inner paddle wheel member 60 having a center of rotation axis 62 for alignment with the center bore axis 28, the nonelastomeric inner paddle wheel member including N radially extending paddles 64 including at least a first radially extending paddle 66 and at least a second radially extending paddle 68. The damper includes damper liquid 76. The damper includes at least a first elastomeric intermediate bearing member for providing relative rotation of the nonelastomeric inner paddle wheel member and the nonelastomeric outer canister member while containing the damper liquid within the damper, preferably the elastomeric intermediate bearing members are the upper elastomeric tubular intermediate bearing member 78 and the lower elastomeric tubular intermediate bearing member 80. The nonelastomeric inner paddle wheel member 60 is received in the nonelastomeric outer canister inner paddle wheel member receiving cavity 26 with the at least first elastomeric tubular intermediate member 78 and the lower elastomeric tubular intermediate member 80 between the nonelastomeric inner paddle wheel member 60 and the nonelastomeric outer canister 22, with the first radially extending divider 36 received between the first radially extending paddle 66 and the second radially extending paddle 68, the first radially extending divider 36 and the first radially extending paddle 66 forming a first radially extending divider first variable volume chamber 82, the first radially extending divider 36 and the second radially extending paddle 68 forming a first radially extending divider second variable volume chamber 84, the first radially extending divider first variable volume chamber 82 and the first radially extending divider second variable volume chamber 84 in liquid communication through the liquid damping conduit wherein a clockwise rotation 86 of the inner paddle wheel member 60 about the center of rotation axis 62 relative to the nonelastomeric outer canister 22 pumps the damper liquid 76 from the first radially extending divider second variable volume chamber 84 through the liquid damping conduit towards the first radially extending divider first variable volume chamber 82, and a counterclockwise rotation 88 of the inner paddle wheel member 60 about the center of rotation axis 62 relative to the nonelastomeric outer canister pumps the damper liquid 76 from the first radially extending divider first variable volume chamber 82 through the liquid conduit towards the second radially extending divider second variable volume chamber 84.

In an embodiment the invention includes a method of making the rotary damper 20. The method includes the steps of: providing the nonelastomeric outer canister 22, the nonelastomeric outer canister 22 having an inner paddle wheel member receiving cavity 26 for receiving an inner paddle wheel member 60, the inner paddle wheel member receiving cavity 26 centered about a longitudinally extending center bore axis 28, the inner paddle wheel member receiving cavity 26 including N (whole integer number) radially extending dividers 34, preferably including at least a first radially extending divider 36 and at least a second radially extending divider 38. Preferably the N radially extending dividers 34 extend in an inward direction from the outer canister perimeter inward towards the center bore axis 28. Liquid damping conduits 48 are disposed within the damper in fluid communication with the cavity 26, preferably with the outer canister including at least N longitudinally extending liquid conduits 48, preferably proximate the outer perimeter, and including at least a first longitudinally extending liquid conduit 50. The method includes providing a nonelastomeric inner paddle wheel member 60, the nonelastomeric inner paddle wheel member 60 having a center of rotation axis 62 for alignment with the center bore axis 28, the nonelastomeric inner paddle wheel member including N radially extending paddles 64 including at least a first radially extending paddle 66 and at least a second radially extending paddle 68. The method includes providing damper liquid 76. The method includes providing at least a first upper elastomeric tubular intermediate bearing member 78 and a lower elastomeric tubular intermediate bearing member 80. The method includes receiving the nonelastomeric inner paddle wheel member 60 in the nonelastomeric outer canister inner paddle wheel member receiving cavity 26 with the elastomeric tubular intermediate member 78 and the lower elastomeric tubular intermediate member 80 between the nonelastomeric inner paddle wheel member 60 and the nonelastomeric outer canister 22, with the first radially extending divider 36 received between the first radially extending paddle 66 and the second radially extending paddle 68, the first radially extending divider 36 and the first radially extending paddle 66 forming a first radially extending divider first variable volume chamber 82, the first radially extending divider 36 and the second radially extending paddle 68 forming a first radially extending divider second variable volume chamber 84, the first radially extending divider first variable volume chamber 82 and the first radially extending divider second variable volume chamber 84 in fluid communication through the liquid conduit 48. The method includes containing the damper liquid inside the outer canister wherein a clockwise rotation 86 of the inner paddle wheel member 60 about the center of rotation axis 62 relative to the nonelastomeric outer canister 22 pumps the damper liquid 76 from the first radially extending divider second variable volume chamber 84 through the liquid conduit 48 towards the first radially extending divider first variable volume chamber 82, and a counterclockwise rotation 88 of the inner paddle wheel member 60 about the center of rotation axis 62 relative to the nonelastomeric outer canister pumps the damper liquid 76 from the first radially extending divider first variable volume chamber 82 through the first longitudinally extending liquid conduit 50 towards the second radially extending divider second variable volume chamber 84. Preferably containing the liquid includes providing the nonelastomeric outer canister upper canister lid 30 and a lower canister lid 32 and capping the canister with the lids, preferably with the lid bonded to the tubular elastomers which are preferably bonded to rigid surfaces of the inner wheel extension members.

In an embodiment the invention includes a rotary wing aircraft lead lag damper 20. The lead lag damper 20 includes a nonelastomeric outer member 22 and a nonelastomeric inner paddle wheel member 60. The nonelastomeric outer member 22 and the nonelastomeric inner paddle wheel member 60 are bonded together with at least one elastomer intermediate member 78,80, with the nonelastomeric outer member and the nonelastomeric inner paddle wheel member relatively rotationally movable through the at least one elastomer intermediate members 78,80. The nonelastomeric outer member 22 has an outside perimeter and preferably includes a plurality of outer housing liquid damper conduits 48 proximate the outside perimeter, the inner paddle wheel member extends out through the at least one elastomer intermediate members 78,80, with damper liquid 76 contained within the outer member. The damper liquid 76 is disposed between the inner paddle wheel member and the outer member and in the outer housing liquid damper conduits 48, wherein the relative rotation movement between the nonelastomeric outer member 22 and the nonelastomeric inner paddle wheel member 60 pumps the damper liquid 76 through said plurality of damper conduits 48 proximate the outside perimeter of the nonelastomeric outer member.

In an embodiment the invention includes a rotary wing aircraft, the rotary wing aircraft having an aircraft first member and an aircraft second member, the first member moving relative to the second member. The rotary wing aircraft includes the nonelastomeric outer member 22, the nonelastomeric outer member 22 having an outer housing 24 and an inner paddle wheel member receiving cavity 26 for receiving an inner paddle wheel member 60, the inner paddle wheel member receiving cavity 26 centered about a longitudinally extending center bore axis 28, the outer member including an outer member fixation member assembly 110. The nonelastomeric outer member preferably having an upper canister lid 30 and a lower canister lid 32. The inner paddle wheel member receiving cavity 26 includes a plurality of radially extending dividers 34 including at least a first radially extending divider 36 and at least a second radially extending divider 38, the radially extending dividers 34 extending in a inward direction from the outer canister wall housing 24 inward towards the center bore axis 28. The housing 24 includes a plurality of longitudinally extending liquid conduits 48 including at least a first longitudinally extending liquid conduit 50. The damper includes a nonelastomeric inner paddle wheel member 60, the nonelastomeric inner paddle wheel member 60 having a center of rotation axis 62 for alignment with the center bore axis 28, the nonelastomeric inner paddle wheel member including a plurality of N radially extending paddles 64 including at least a first radially extending paddle 66 and at least a second radially extending paddle 68, the inner member including an inner member fixation member assembly 112. The damper includes the damper liquid 76. The damper includes at least a first elastomeric tubular intermediate bearing member 78, and preferably a lower elastomeric tubular intermediate bearing member 80, the nonelastomeric inner paddle wheel member 60 received in the nonelastomeric outer canister inner paddle wheel member receiving cavity 26 with the at least first elastomeric tubular intermediate member 78 and the lower elastomeric tubular intermediate member 80 between the nonelastomeric inner paddle wheel member 60 and the nonelastomeric outer canister 22, with the first radially extending divider 36 received between the first radially extending paddle 66 and the second radially extending paddle 68, the first radially extending divider 36 and the first radially extending paddle 66 forming a first radially extending divider first variable volume chamber 82. The first radially extending divider 36 and the second radially extending paddle 68 form a first radially extending divider second variable volume chamber 84, the first radially extending divider first variable volume chamber 82 and the first radially extending divider second variable volume chamber 84 in liquid communication through the first longitudinally extending liquid conduit 50. The outer member fixation member assembly 110 is fixed to the aircraft first member and the inner member fixation member assembly 112 is fixed to the aircraft second member, wherein the aircraft first member moving relative to the aircraft second member pumps in a first moving direction the damper liquid 76 from the first radially extending divider second variable volume chamber 84 through the first longitudinally extending liquid conduit 50 towards the first radially extending divider first variable volume chamber 82, and pumps in a second moving direction the damper liquid 76 from the first radially extending divider first variable volume chamber 82 through the first longitudinally extending liquid conduit 50 towards the second radially extending divider second variable volume chamber 84.

In an embodiment the invention includes a rotary damper. The rotary damper 20 includes nonelastomeric outer canister 22 with the outer canister housing 24 and the inner paddle wheel member receiving cavity 26 for receiving inner paddle wheel member 60. The inner paddle wheel member receiving cavity is centered about longitudinally extending center bore axis 28, with the inner paddle wheel member receiving cavity including N radially extending dividers 34, preferably including at least a first radially extending divider and at least a second radially extending divider. The N radially extending dividers 34 extend in a direction from the outer canister housing inward towards the center bore axis 28. The damper includes nonelastomeric inner paddle wheel member 60 having center of rotation axis 62 for alignment with the center bore axis 28. The nonelastomeric inner paddle wheel member includes N radially extending paddles 64 including at least a first radially extending paddle and at least a second radially extending paddle. The damper contains damper liquid 76. The damper includes upper elastomeric tubular intermediate member 78 and lower elastomeric tubular intermediate member 80, with the nonelastomeric inner paddle wheel member 60 received in the nonelastomeric outer canister inner paddle wheel member receiving cavity with the upper elastomeric tubular intermediate member 78 and the lower elastomeric tubular intermediate member 80 between the nonelastomeric inner paddle wheel member and the nonelastomeric outer canister. The radially extending dividers 34 are received between the radially extending paddles 64 to form a plurality of variable volume chambers in liquid communication through a plurality of damping liquid conduits 48. A clockwise rotation of the inner paddle wheel member about the center of rotation axis relative to the nonelastomeric outer canister pumps the damper liquid from at least a second variable volume chamber through at least a first liquid conduit towards at least a first variable volume chamber, and a counterclockwise rotation of the inner paddle wheel member about the center of rotation axis relative to the nonelastomeric outer canister pumps the damper liquid from the at least first variable volume chamber through the at least first liquid conduit towards the at least second variable volume chamber. In embodiments the at least a first liquid conduit 48 is a longitudinally extending liquid damping conduit. As shown in FIGS. 3,4,6,7,8,9 liquid conduit 48 is a longitudinally extending liquid damping conduit 48 which preferably extends longitudinally down through the outer canister housing.

In embodiments the at least a first liquid conduit 48 is a nonlongitudinally extending latitudinal liquid damping conduit, preferably with a line of site flow path for the damping liquid flow. In embodiments the latitudinal liquid damping conduit extends latitudinally across dividers 34 or paddles 64, preferably normal to longitudinally extending axis 28, such as shown in FIGS. 20, 22. In a preferred embodiment the liquid flow path line of site fluid damping orifices 48 extend through the paddles 64, preferably in alignment with a pressure relief liquid flow path.

Figure 22A:
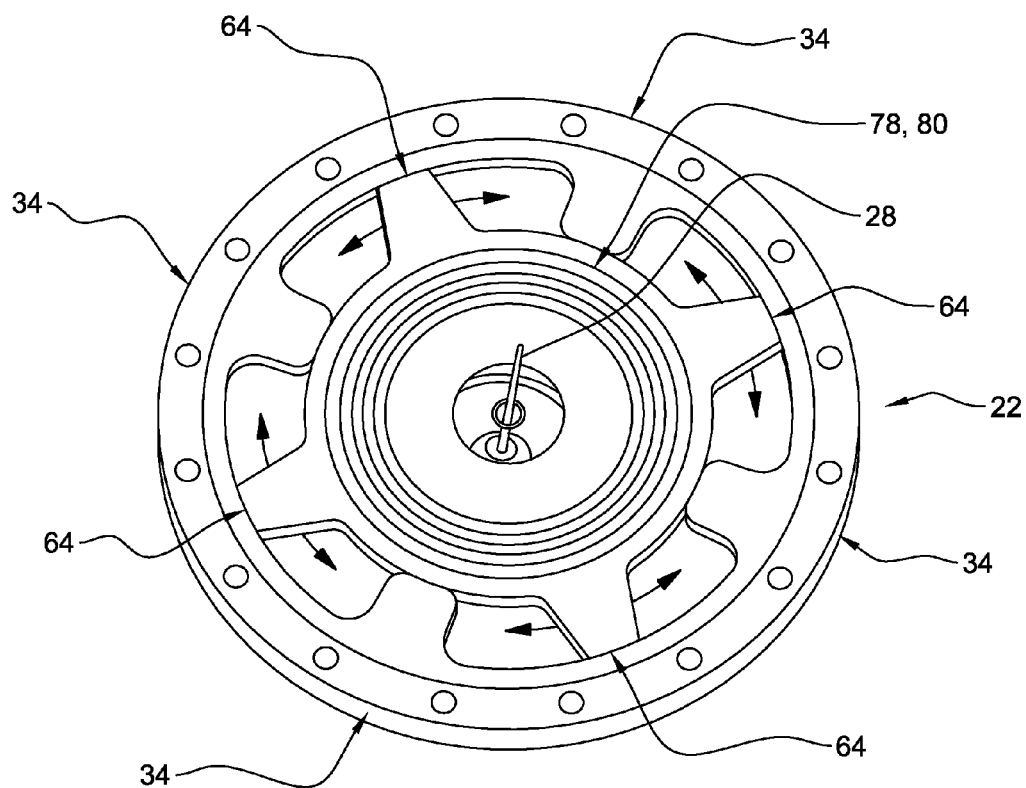
FIG. 22A shows a cross section view of a rotary damper.
Figure 22B:
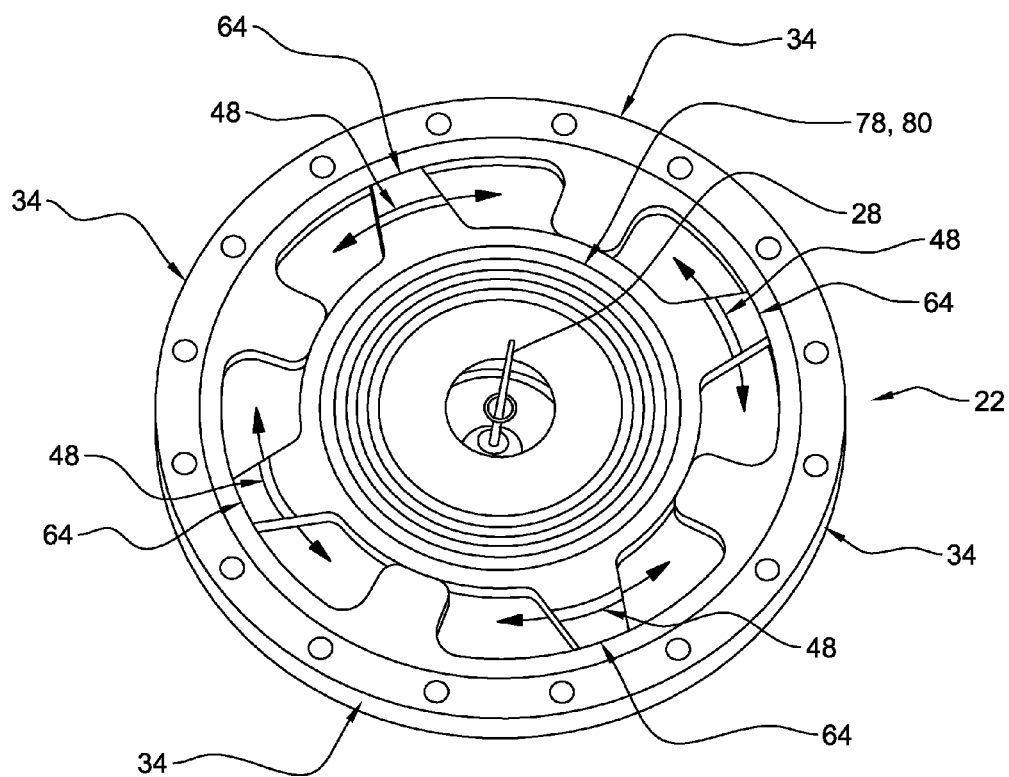
FIG. 22B shows a cross section view with damper liquid conduits in the rotary damper nonelastomeric inner paddle wheel member.
Figure 22C:
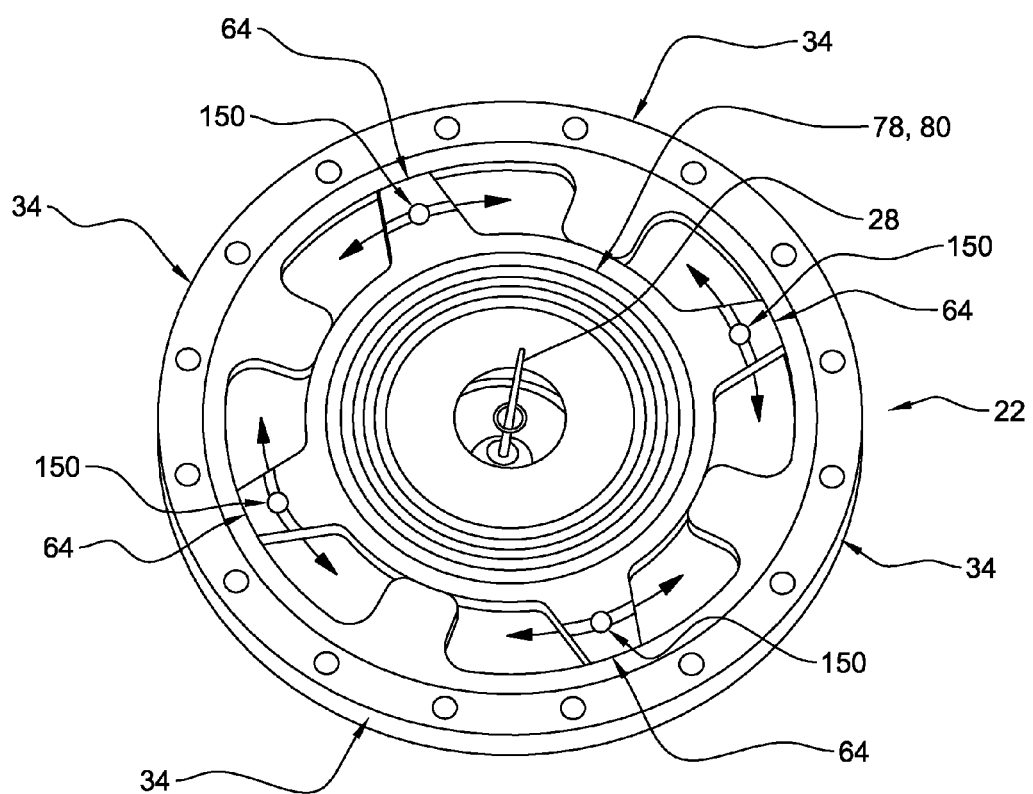
FIG. 22C shows a cross section view with two way liquid pressure relief valves in the rotary damper nonelastomeric inner paddle wheel member.
Figure 22D:
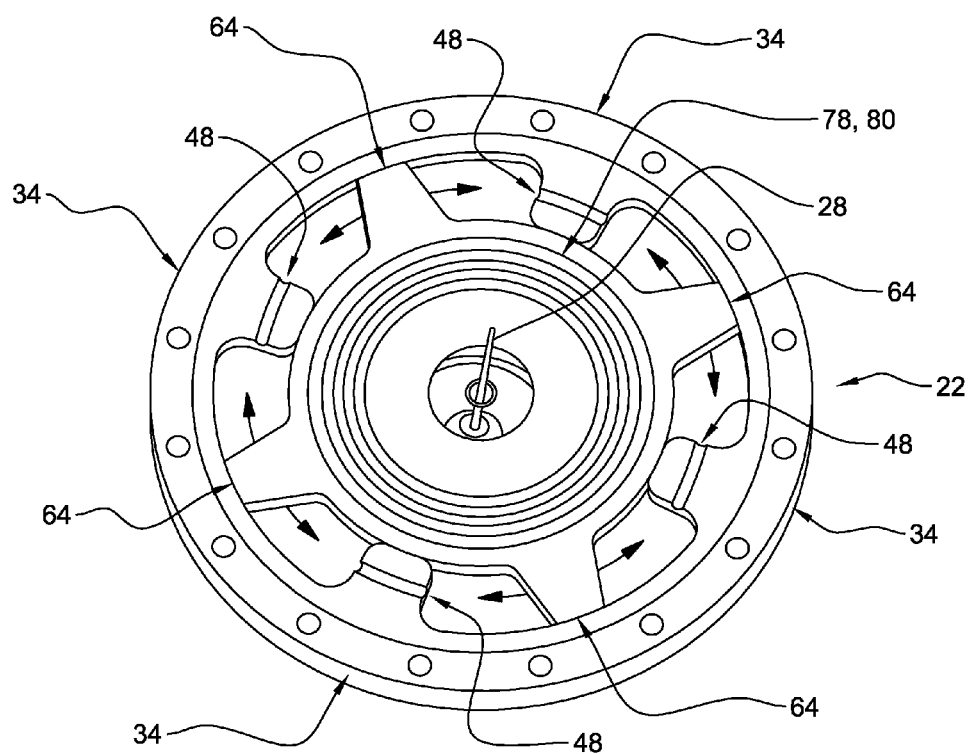
FIG. 22D shows a cross section view with damper liquid conduits in the rotary damper nonelastomeric outer canister member.
Figure 22E:
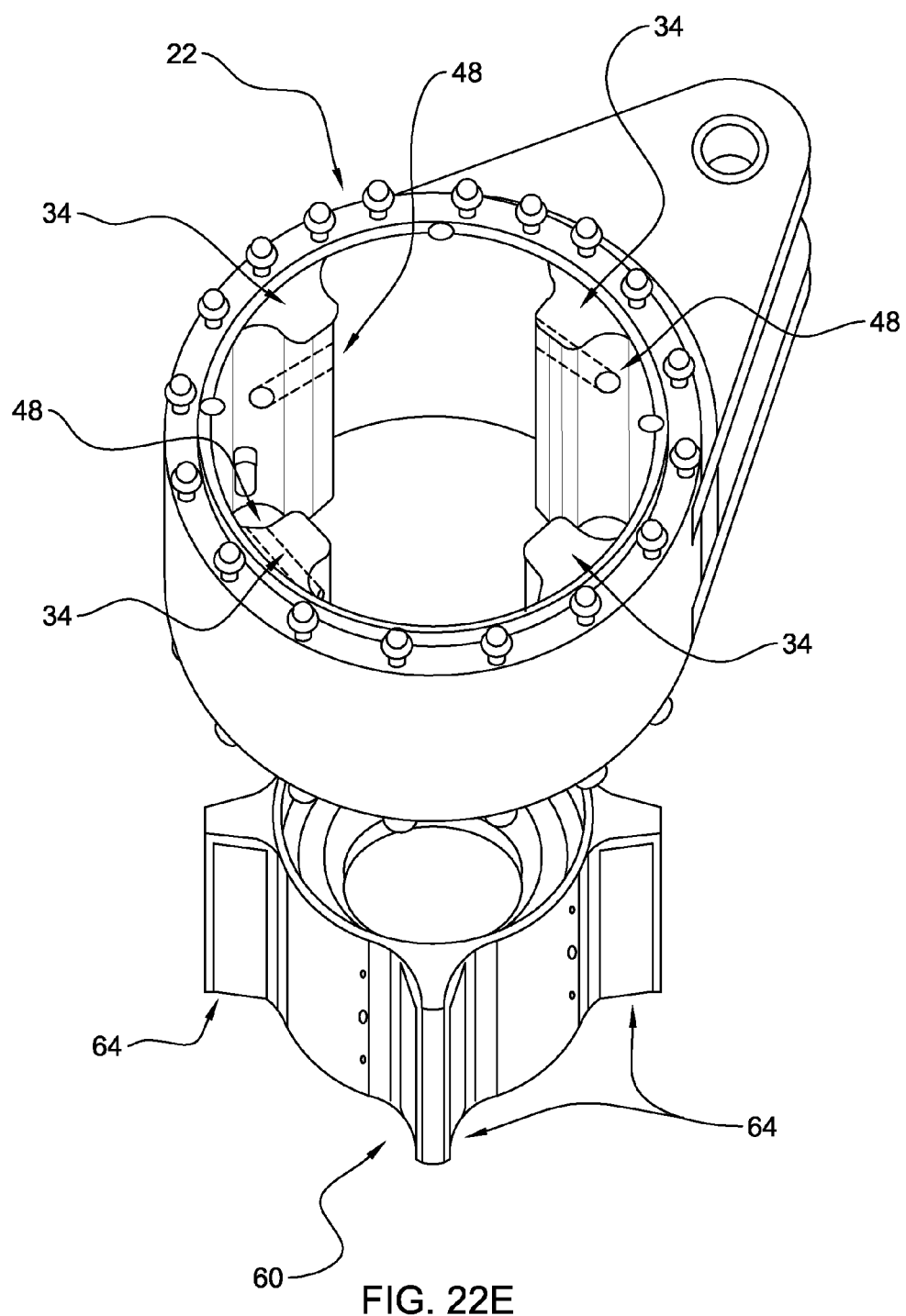
FIG. 22E shows an exploded view with damper liquid conduits in the outer canister member.
Figure 22F:
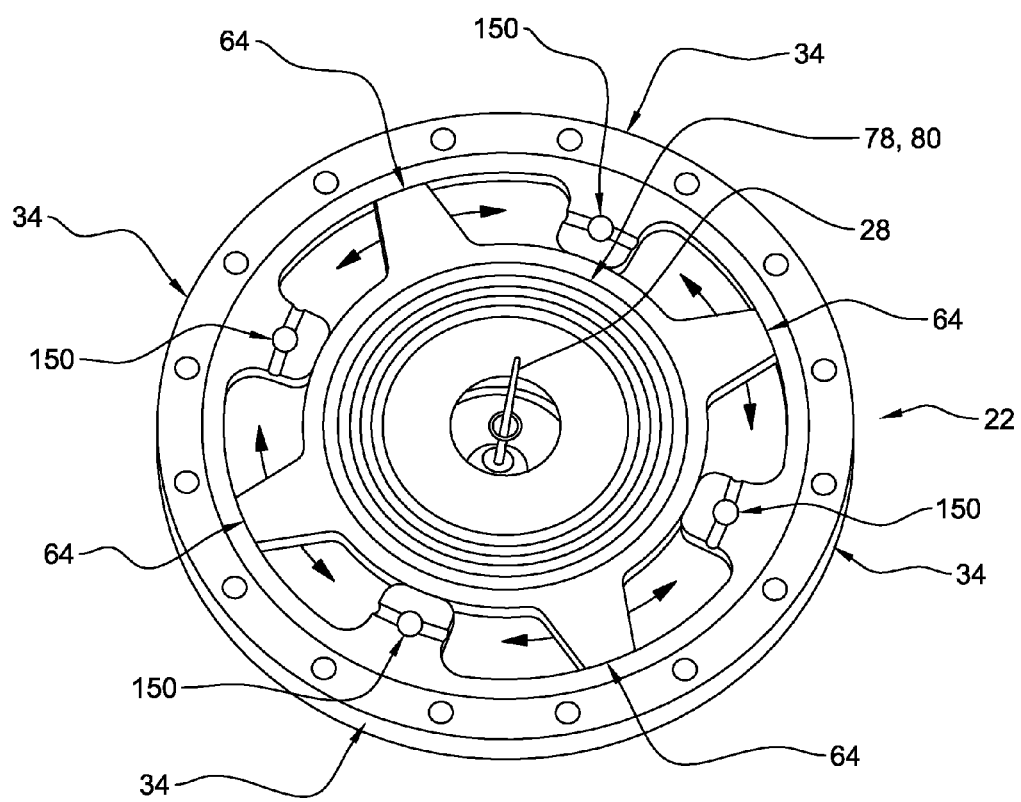
FIG. 22F shows a cross section view with two way liquid pressure relief valves in the rotary damper nonelastomeric outer canister member.
Figure 23A:
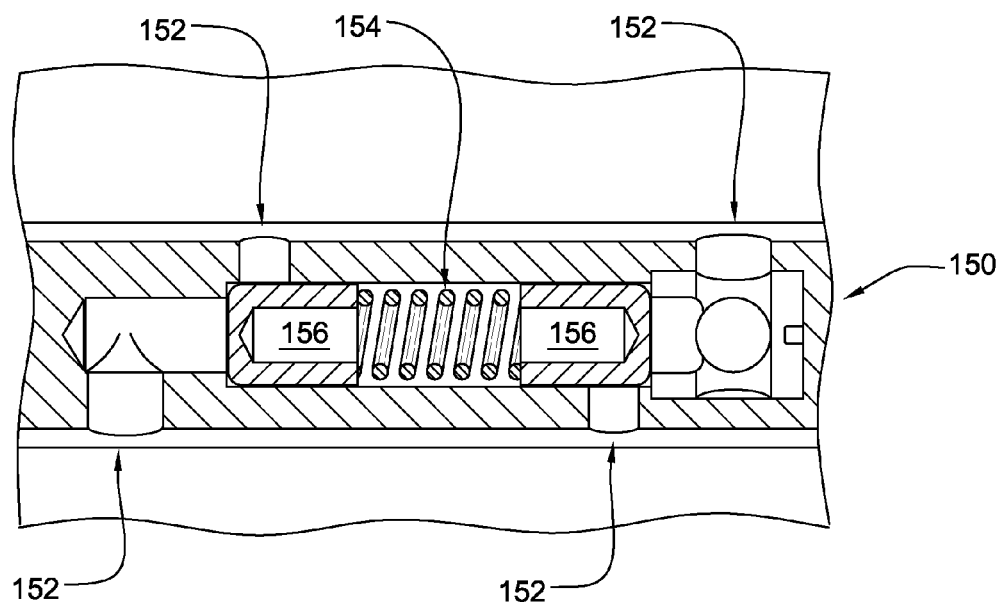
FIG. 23A shows a cross section view of a two way liquid pressure relief valve.
Figure 23B:
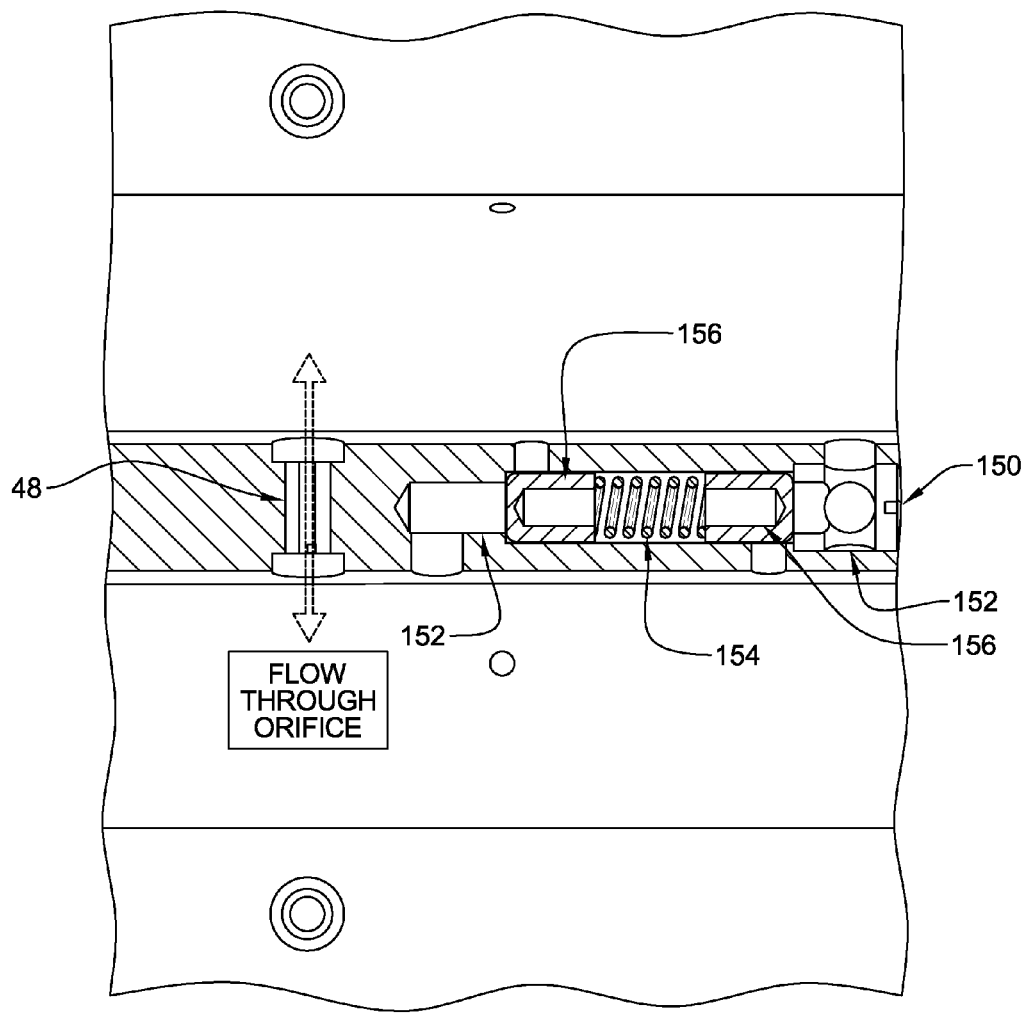
FIG. 23B shows a cross section view of an inner paddle wheel member and its two way liquid pressure relief valve with normal operation damper liquid flow through the damper conduit between two variable volume chambers.
Figure 23C:
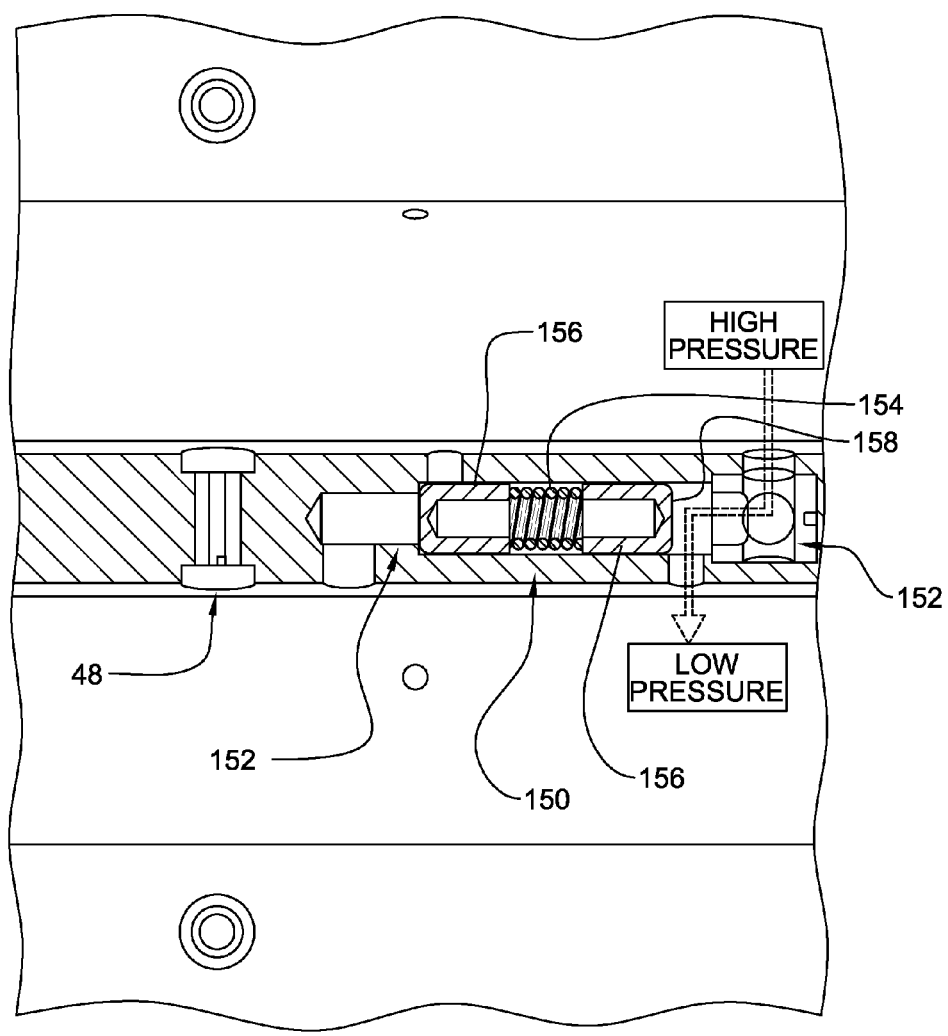
FIG. 23C shows a cross section view of the inner paddle wheel member and its two way liquid pressure relief valve with high pressure buildup in the left variable volume chamber forcing the top valve stopper member down opening the pressure relief flow path to the low pressure variable volume chamber.
Figure 23D:
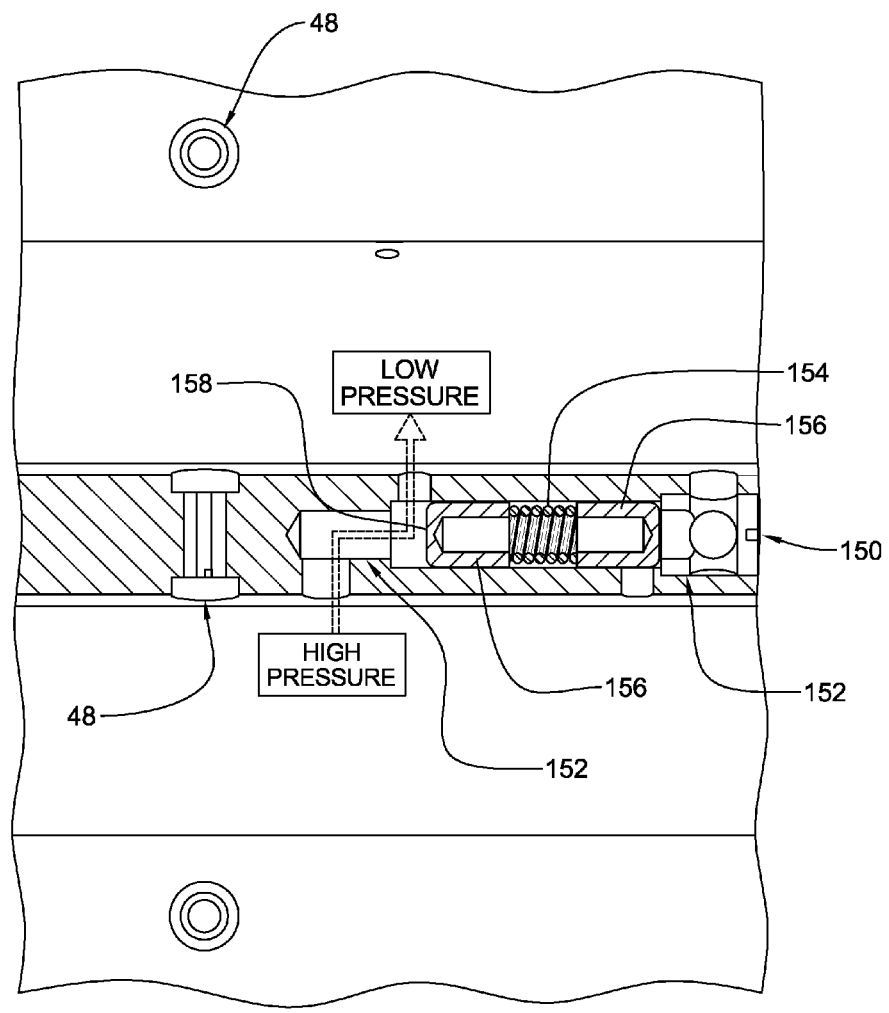
FIG. 23D shows a cross section view of the inner paddle wheel member and its two way liquid pressure relief valve with high pressure buildup in the right variable volume chamber forcing the bottom valve stopper member up opening the pressure relief flow path to the low pressure variable volume chamber.

In embodiments the rotary damper 20 includes at least a first two way clockwise counterclockwise liquid pressure relief valve 150 between the at least first variable volume chamber and the at least second variable volume chamber. Preferably the two way pressure relief valve 150 slidingly opens a pressure relief conduit 152 to a relatively high dynamic liquid pressure differential between the two variable volume damper chambers. Such as shown in FIG. 23, preferably the pressure relief valve is set to default to a closed state under a predetermined operational damping or below pressure differential between the two variable volume chambers such that operational damping liquid flow flows through the damping conduit 48 to control the unwanted motion being damped. Preferably the two way clockwise counterclockwise liquid pressure relief valve 150 includes a longitudinal pressure relief spring 154 which is compressed longitudinally by the pressure differential acting on a valve stopper member liquid interface surface 158 of valve stopper member 156. Preferably the longitudinal valve spring member 154 provides a resilient connection between an upper valve stopper member 156 and a lower valve stopper member 156, preferably with valve stopper member 156 pressure moved orthogonally to the liquid flow path between the high pressure side and the low pressure side. Preferably the valve stopper members slide from their closed position to their open position by the pressure build up compressing the valve spring. In an embodiment the two way clockwise counterclockwise liquid pressure relief valve 150 is in the outer canister housing 22, preferably in the radially extending divider 34, such as shown in FIG. 22F. In an embodiment the two way clockwise counterclockwise liquid pressure relief valve 150 is in the paddle wheel member 60, preferably in the radially extending paddle 64, such as FIGS. 22C, 23B-D.

Preferably the upper elastomeric tubular intermediate member 78 has an inner bonding elastomeric surface and outer bonding elastomeric surface, wherein the inner bonding elastomeric surface is bonded to an outer nonelastomeric surface of the nonelastomeric inner paddle wheel member and the outer bonding elastomeric surface is bonded to an inner nonelastomeric surface of the nonelastomeric outer canister, with the upper elastomeric tubular intermediate member 78 providing for containment of the damper liquid and relative rotation between the nonelastomeric inner paddle wheel member and the nonelastomeric outer canister. Preferably the rotary damper includes a first and a second variable volume fluid expansion compensation chamber 120, the variable volume fluid expansion compensation chambers 120 having a variable volume of expansion liquid in dynamically isolated liquid communication with the liquid damping variable volume chambers. Preferably the second variable volume fluid expansion compensation chamber 120 is longitudinally distal from the first variable volume fluid expansion compensation chamber 120, with both housed in the inner paddle wheel member 60. Preferably the first and a second variable volume fluid expansion compensation chamber 120 are proximate the first and second elastomeric tubular intermediate member 78,80.

In embodiments the invention includes making a rotary damper. The method includes providing a nonelastomeric outer canister, the nonelastomeric outer canister having an outer perimeter and an inner paddle wheel member receiving cavity for receiving an inner paddle wheel member, the inner paddle wheel member receiving cavity centered about a longitudinally extending center bore axis, the inner paddle wheel member receiving cavity including N radially extending dividers including at least a first radially extending divider and at least a second radially extending divider. The method includes providing a nonelastomeric inner paddle wheel member, the nonelastomeric inner paddle wheel member having a center of rotation axis for alignment with the center bore axis, the nonelastomeric inner paddle wheel member including N radially extending paddles including at least a first radially extending paddle and at least a second radially extending paddle. The method includes providing a damper liquid. The method includes providing at least an upper elastomeric tubular intermediate member and a lower elastomeric tubular intermediate member. The method includes receiving the nonelastomeric inner paddle wheel member in the nonelastomeric outer canister inner paddle wheel member receiving cavity with the elastomeric intermediate members between the nonelastomeric inner paddle wheel member and the nonelastomeric outer canister, with the first radially extending divider received between the first radially extending paddle and the second radially extending paddle, the first radially extending divider and the first radially extending paddle forming a first radially extending divider first variable volume chamber, the first radially extending divider and the second radially extending paddle forming a first radially extending divider second variable volume chamber, the first radially extending divider first variable volume chamber and the first radially extending divider second variable volume chamber in fluid communication through at least a first liquid conduit. The method includes containing the damper liquid inside the outer canister wherein a clockwise rotation of the inner paddle wheel member relative to the nonelastomeric outer canister pumps the damper liquid from the first radially extending divider second variable volume chamber through the liquid conduit towards the first radially extending divider first variable volume chamber, and a counterclockwise rotation of the inner paddle wheel member relative to the nonelastomeric outer canister pumps the damper liquid from the first radially extending divider first variable volume chamber through the liquid conduit towards the second radially extending divider second variable volume chamber. In a preferred embodiment providing the nonelastomeric outer canister includes providing the nonelastomeric outer canister with the at least first liquid conduit extending through the nonelastomeric outer canister, such as shown in FIG. 3-9, 22D. In a preferred embodiment, providing the nonelastomeric outer canister includes providing the nonelastomeric outer canister with an outside perimeter surface, with the at least first liquid conduit extending longitudinally proximate the outside perimeter surface such as shown in FIG. 3-9. In a preferred embodiment, providing the nonelastomeric inner paddle wheel member, includes providing the nonelastomeric inner paddle wheel member with the at least first liquid conduit extending through the nonelastomeric inner paddle wheel member such as shown in FIGS. 20, 22B, 23B-D. Preferably the elastomeric tubular intermediate member has an inner bonding elastomeric surface and an outer bonding elastomeric surface, with the method including bonding the inner bonding elastomeric surface to an outer nonelastomeric surface of the nonelastomeric inner paddle wheel member and bonding the outer bonding elastomeric surface to an inner nonelastomeric surface of the nonelastomeric outer canister, such as shown in FIG. 10-15. Preferably the method includes providing a first variable volume fluid expansion compensation chamber 120 and a second variable volume fluid expansion compensation chamber 120 in liquid communication with the radially extending divider variable volume chambers, the first variable volume fluid expansion compensation chamber 120 disposed in the nonelastomeric inner paddle wheel member, and the second variable volume fluid expansion compensation chamber 120 disposed in the nonelastomeric inner paddle wheel member distal from the first variable volume fluid expansion compensation chamber, preferably with the upper and lower distal separated expansion chambers preferably proximate the upper and lower elastomeric tubular intermediate members. Preferably the method includes providing at least a first two way clockwise counterclockwise liquid pressure relief valve 150 between the variable volume chambers. Preferably the two way pressure relief valve 150 opens a pressure relief conduit to a dynamic liquid pressure differential between the two variable volume damper chambers, preferably with a longitudinal pressure relief spring 154 which is compressed longitudinally by the pressure differential acting on a valve stopper member liquid interface surface 158, preferably with the longitudinal valve spring member 154 between the upper valve stopper member 156 and the lower valve stopper member 156, with the valve stopper member pressure moved orthogonal to the latitudinal liquid flow path. In an embodiment the two way clockwise counterclockwise liquid pressure relief valve is disposed in the outer canister housing 22 such as shown in FIG. 22F, preferably in the radially extending dividers 34. In an embodiment the two way clockwise counterclockwise liquid pressure relief valve is in the paddle wheel member 60 such as shown in FIGS. 22C, 23B-D, preferably in radially extending paddles 64.

In embodiments the invention includes methods of controlling machine motion. The method includes providing a machine with a first member and a second member, the first member moving relative to the second member. The method includes providing a nonelastomeric outer member, the nonelastomeric outer member having an outer member fixation member 110. Preferably the nonelastomeric outer member has an outer perimeter and an inner paddle wheel member receiving cavity 26 for receiving an inner paddle wheel member 60, the inner paddle wheel member receiving cavity centered about a longitudinally extending center bore axis 28, the inner paddle wheel member receiving cavity including N radially extending dividers 34 including at least a first radially extending divider and at least a second radially extending divider. The method includes providing a nonelastomeric inner paddle wheel member 60, the nonelastomeric inner paddle wheel member having an inner member fixation member 112 and a center of rotation axis 62 for alignment with the center bore axis 28, the nonelastomeric inner paddle wheel member including N radially extending paddles 64 including at least a first radially extending paddle and at least a second radially extending paddle. The method includes providing a damper liquid 76. The method includes providing the at least a first elastomeric intermediate bearing member 78. The method includes receiving the nonelastomeric inner paddle wheel member 60 in the nonelastomeric outer canister inner paddle wheel member receiving cavity with the elastomeric tubular intermediate member 78 between the nonelastomeric inner paddle wheel member 60 and the nonelastomeric outer canister 22, with the radially extending dividers received between the radially extending paddles and forming a plurality of variable volume chambers in damping fluid communication through a plurality of damping fluid conduits 48, and containing the damper liquid inside the outer member. The method includes fixing the outer member fixation member 110 to the first member and fixing the inner member fixation member 112 to the second member wherein a clockwise rotation of the inner paddle wheel member relative to the nonelastomeric outer canister pumps the damper liquid from at least a second variable volume chamber through at least a first liquid conduit 48 towards at least a first variable volume chamber, and a counterclockwise rotation of the inner paddle wheel member relative to the nonelastomeric outer canister pumps the damper liquid from the first variable volume chamber through the at least first liquid conduit towards the at least second variable volume chamber. In preferred embodiments providing the nonelastomeric outer canister includes providing the nonelastomeric outer canister with an outside perimeter surface, with the at least first liquid conduit 48 extending longitudinally proximate the outside perimeter surface. In preferred embodiments providing the nonelastomeric inner paddle wheel member includes providing the nonelastomeric inner paddle wheel member with the at least first liquid conduit 48 extending through the nonelastomeric inner paddle wheel member 60. In preferred embodiments the method includes providing at least a first two way liquid pressure relief valve 150 between the variable volume chambers, preferably with the two way pressure relief valve opening a pressure relief conduit 152 to a dynamic liquid pressure differential between the two variable volume damper chambers, preferably with a longitudinal pressure relief spring 154 which is compressed longitudinally by the pressure differential acting on a valve stopper member liquid interface surface 158. Preferably the longitudinal valve spring member 154 is disposed between an upper valve stopper member 156 and a lower valve stopper member 156 with the valve stopper member pressure moved orthogonal to the liquid flow path between the high pressure variable volume chamber and the low pressure variable volume chamber.

In embodiments the invention includes methods of controlling machine motion. Preferably the methods include, providing a machine with a first member and a second member, the first machine member moving relative to the second machine member. The methods include providing a nonelastomeric outer member 22, the nonelastomeric outer member having an outer member fixation member. The methods include providing a nonelastomeric inner member 60, the nonelastomeric inner member having an inner member fixation member. The methods include providing a liquid 76. The methods include receiving the nonelastomeric inner member 60 in the nonelastomeric outer member 22 and forming at least a first variable volume chamber and at least a second variable volume chamber in fluid communication through at least a first fluid conduit 48 with a fluid flow path. The methods include containing the liquid inside the outer member. The methods include fixing the outer member fixation member to the first machine member and fixing the inner member fixation member to the second machine member wherein the machine motion in a first direction pumps the liquid from the at least second variable volume chamber through the at least first liquid conduit towards the at least first variable volume chamber along the fluid flow path, and the machine motion in a second opposing direction pumps the liquid from the at least first variable volume chamber through the at least first liquid conduit towards the at least second variable volume chamber along the fluid path. The method includes providing at least a first two way liquid pressure relief valve 150 between the first and second variable volume chambers with the two way pressure relief valve 150 opening a pressure relief conduit 152 to a dynamic liquid pressure differential between the first and second variable volume chambers with a pressure relief flow path from the high pressure side to the low pressure side, the two way pressure relief valve opening the pressure relief conduit with an orthogonal valve stopper movement, the orthogonal valve stopper movement orthogonal to the pressure relief flow path. Preferably the pressure relief valve 150 includes a longitudinal pressure relief spring 154 which is compressed longitudinally by the pressure differential acting on a valve stopper member liquid interface surface 158, preferably with the longitudinal valve spring member between an upper valve stopper member and a lower valve stopper member.

Figure 2:
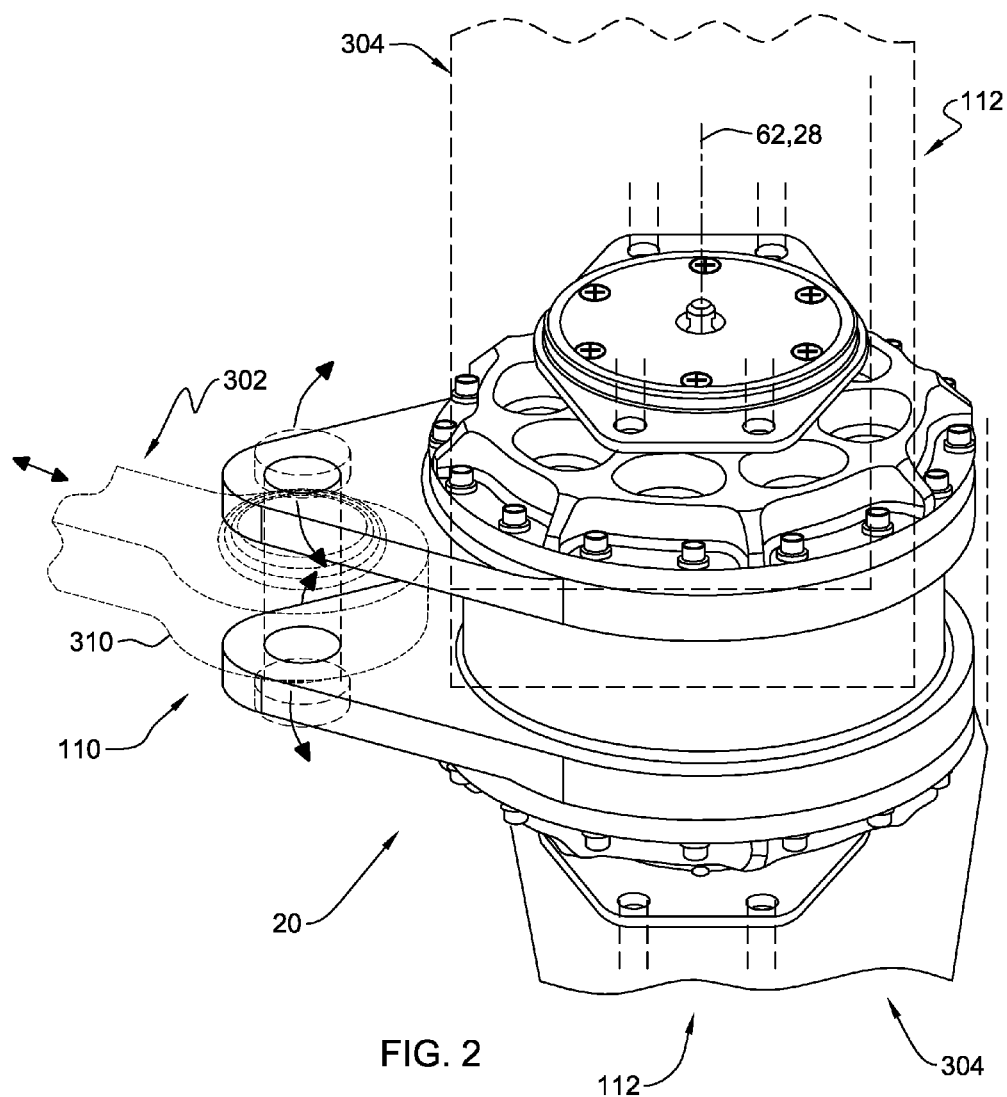
FIG. 2 shows rotary damper connections to first and second aircraft parts with relative motion.
Figure 3:
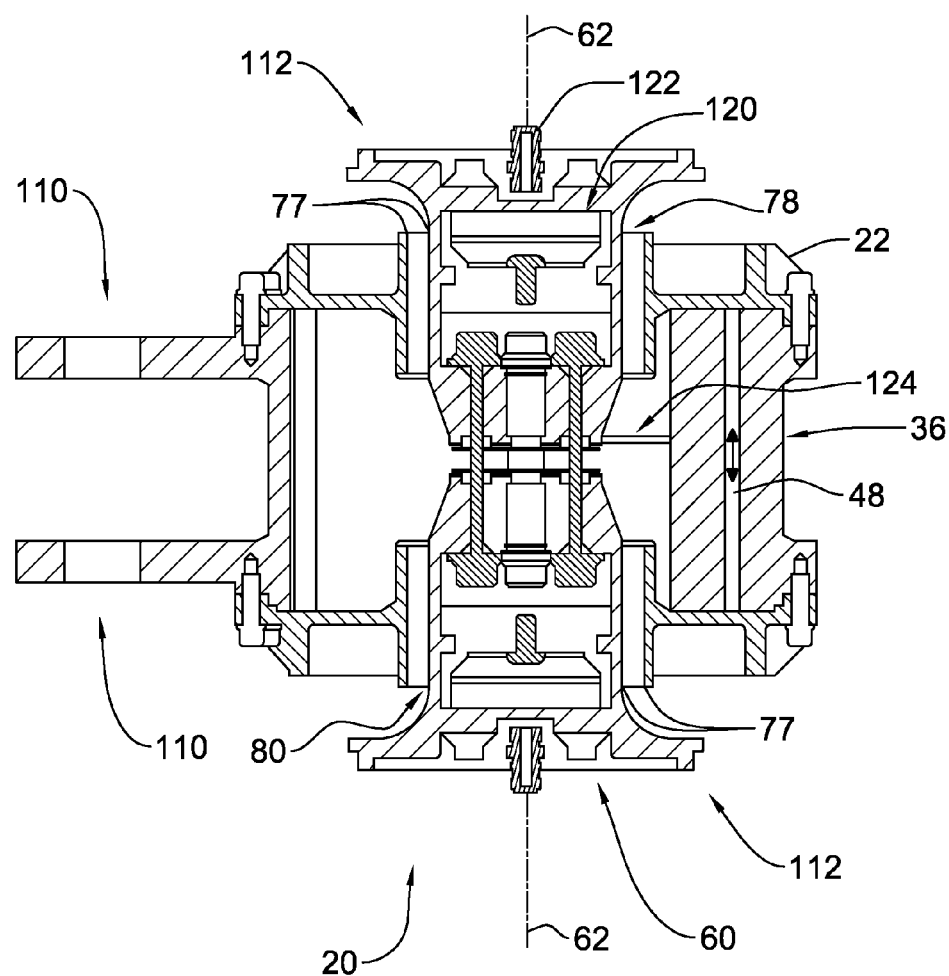
FIG. 3 shows a cross section view of a rotary damper.
Figure 4:
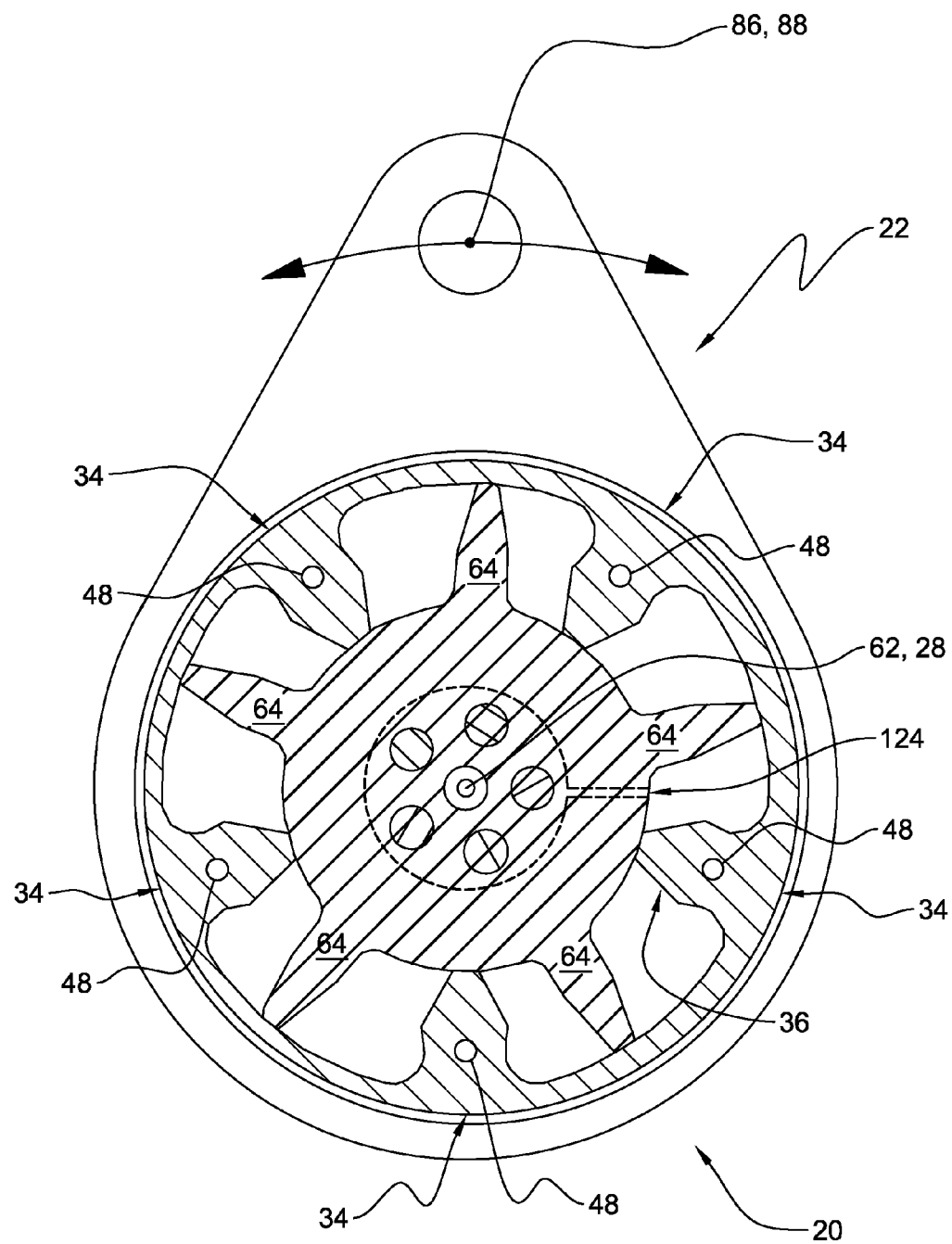
FIG. 4 shows a cross section view of a rotary damper.
Figure 5:
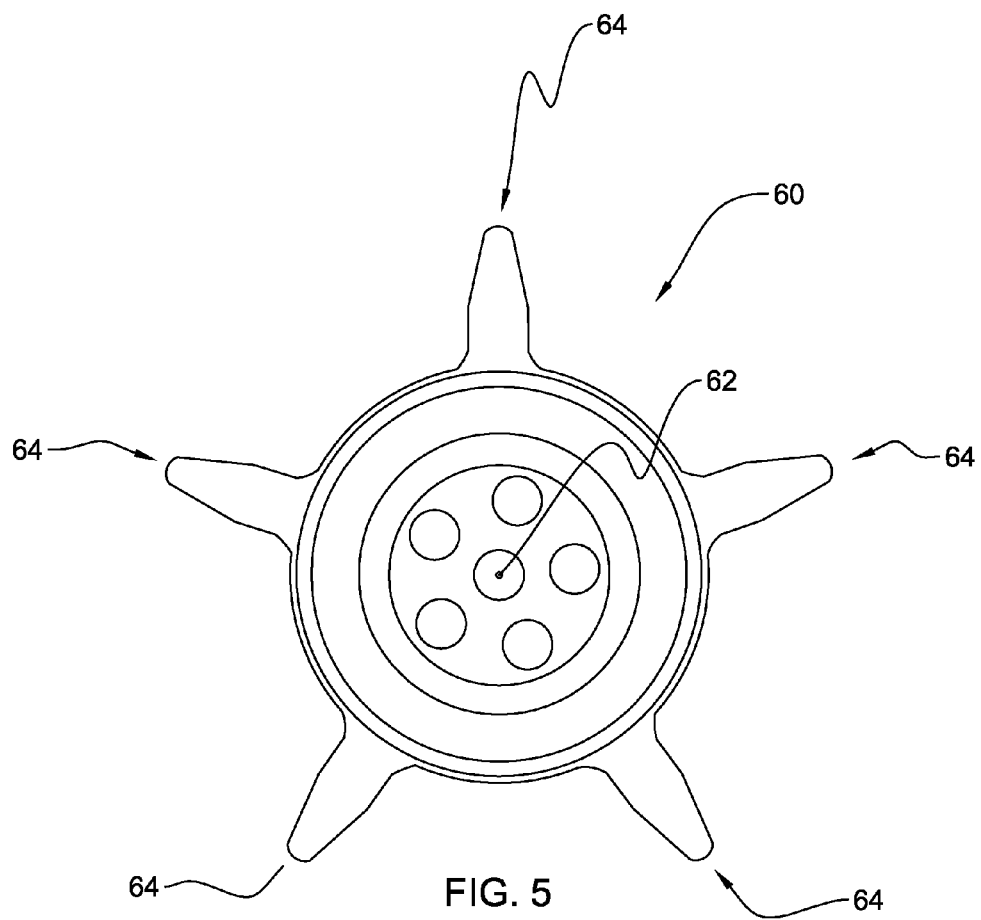
FIG. 5 shows an inner paddle wheel with five paddles.
Figure 6:
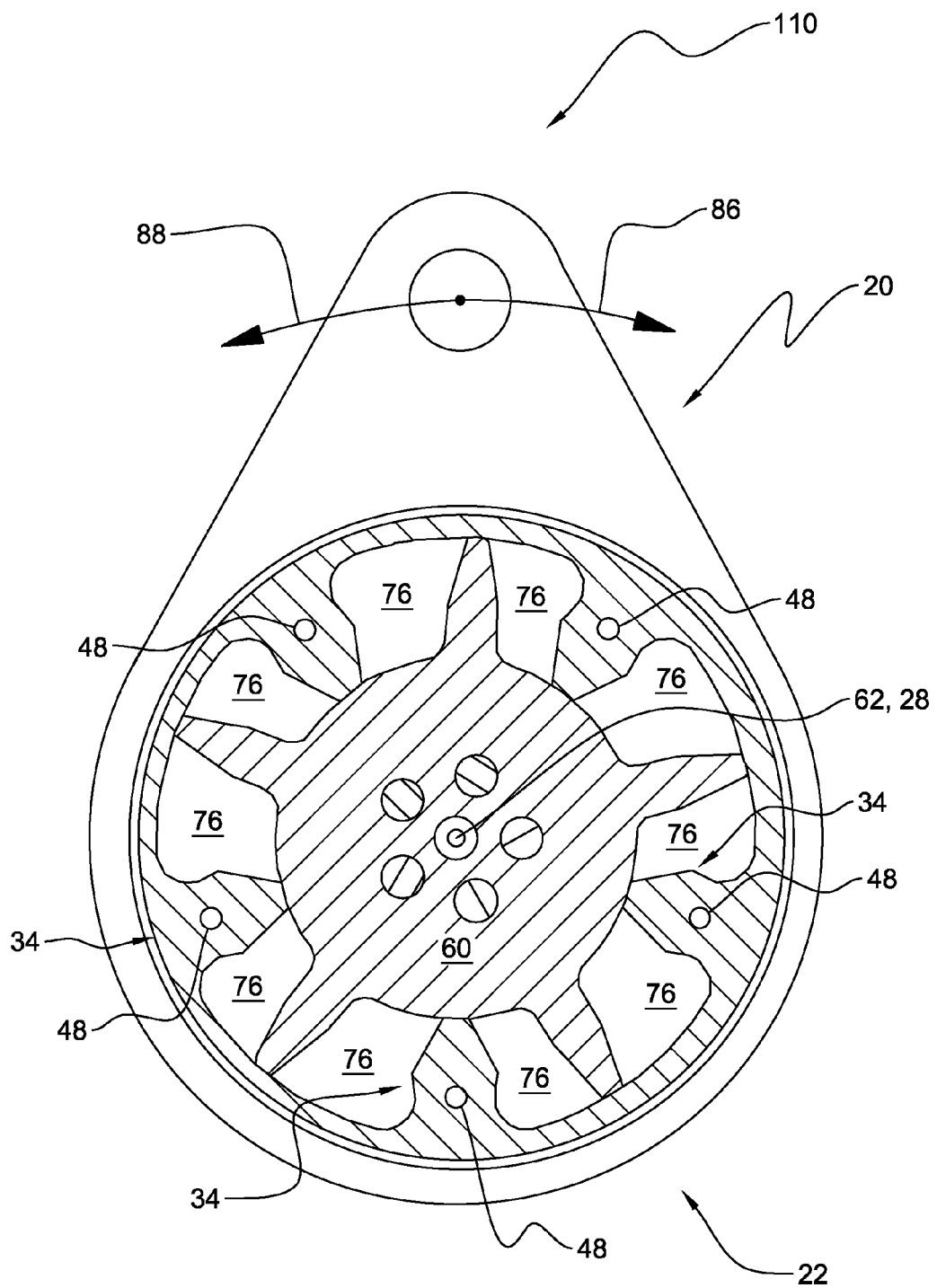
FIG. 6 shows a cross section view of a rotary damper.
Figure 7A:
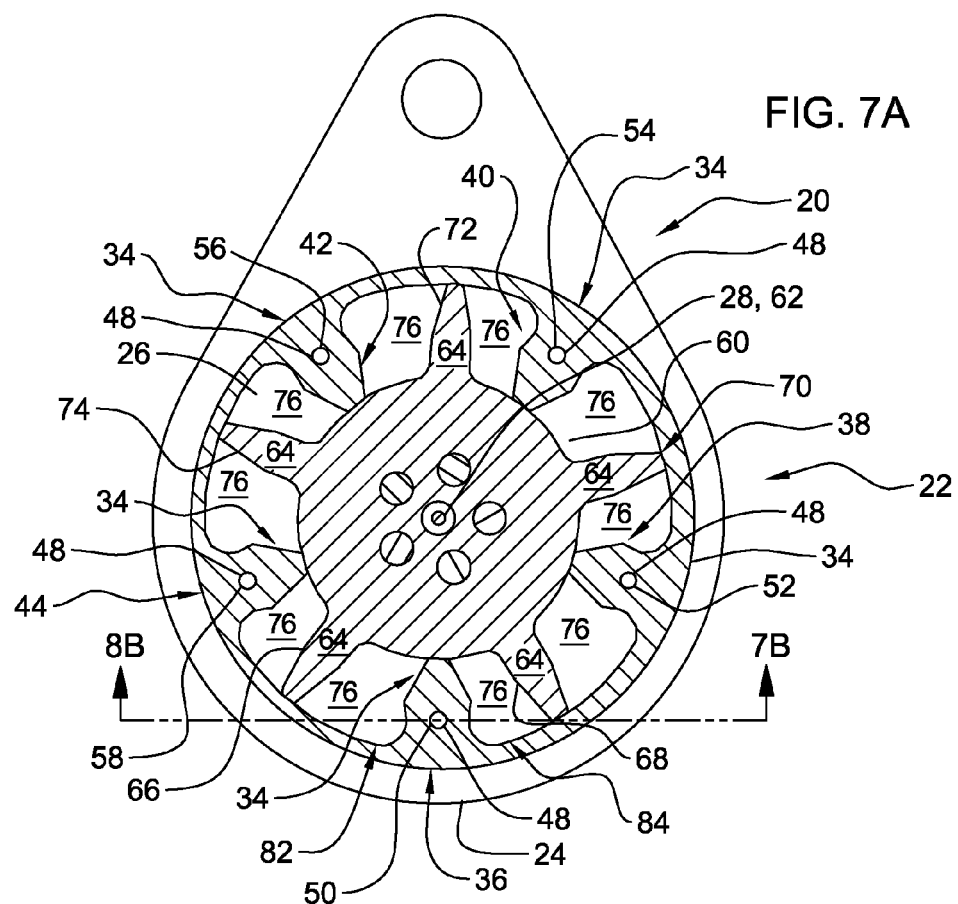
FIG. 7A-B show a cross section views of a rotary damper.
Figure 7B:
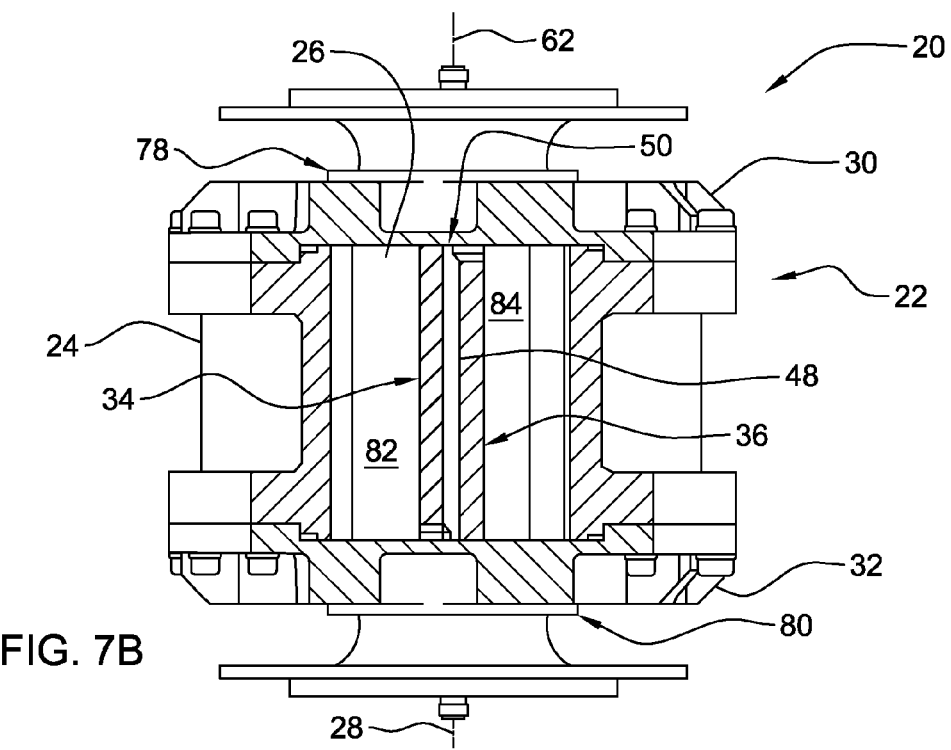
Figure 8A:
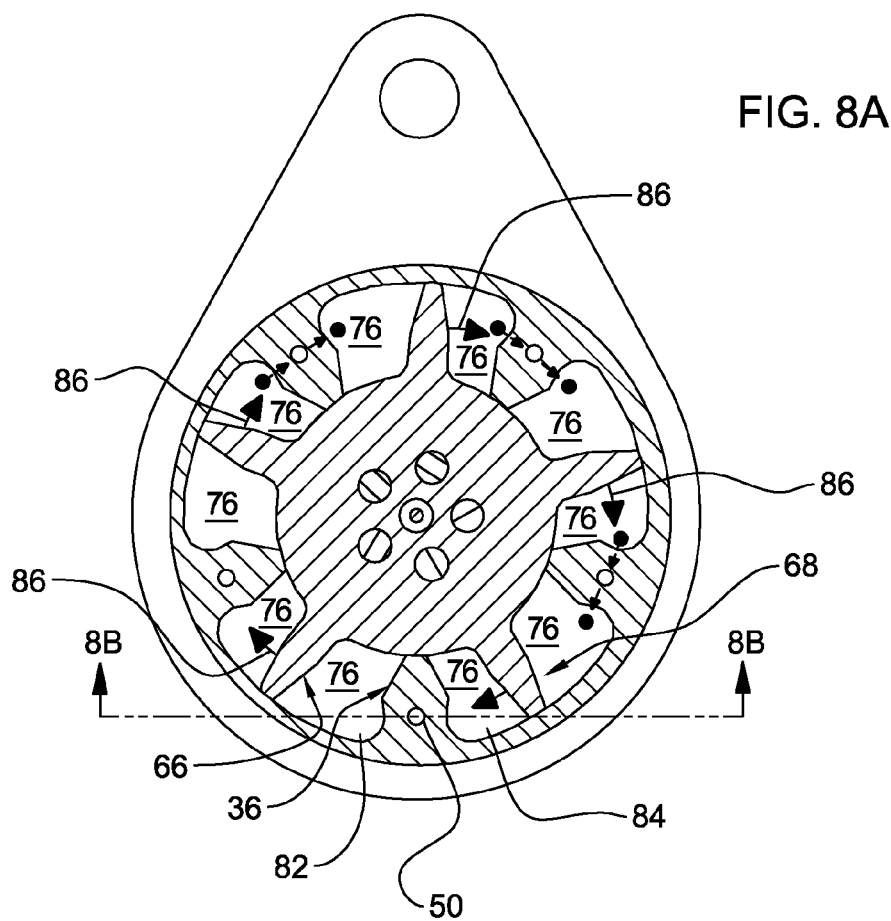
FIG. 8A-B show damper liquid flow from the inner paddle wheel rotating clockwise in the cross section views of a rotary damper.
Figure 8B:
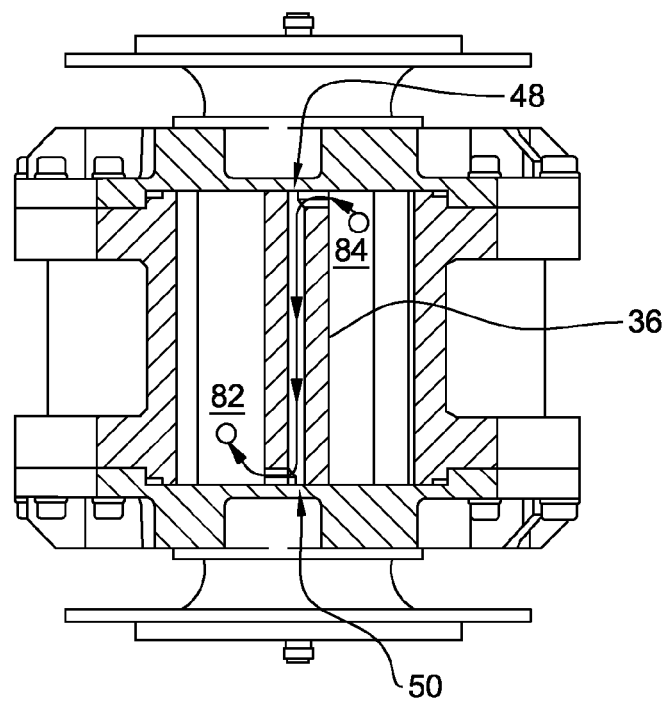
Figure 9A:
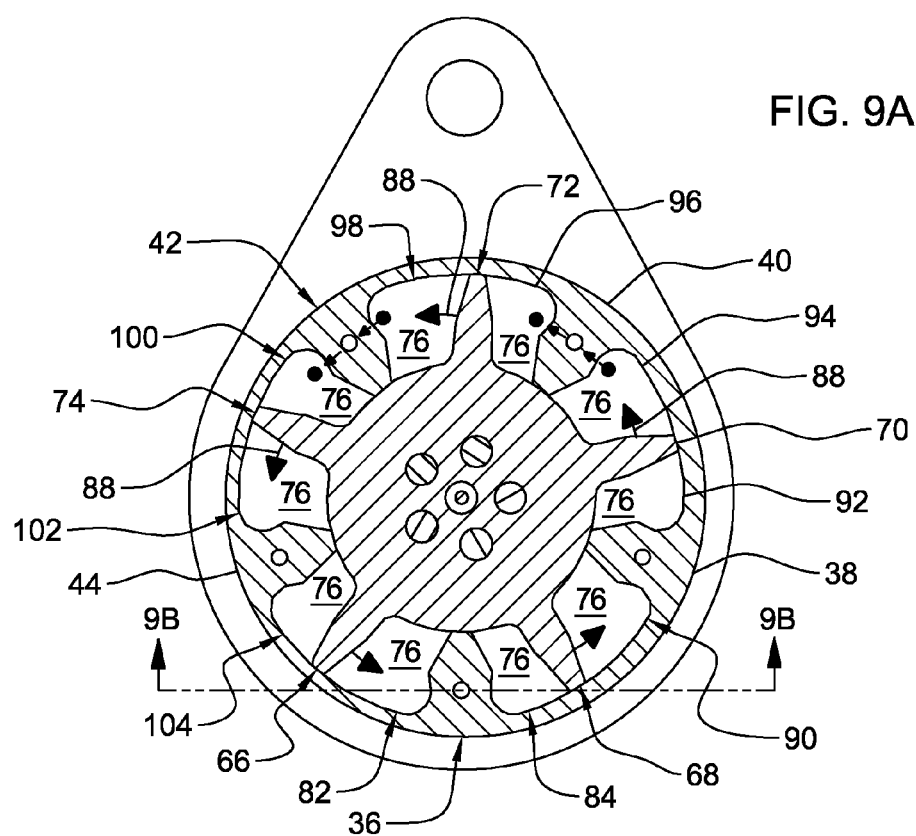
FIG. 9A-B show damper liquid flow from the inner paddle wheel rotating counterclockwise in the cross section views of a rotary damper.
Figure 9B:
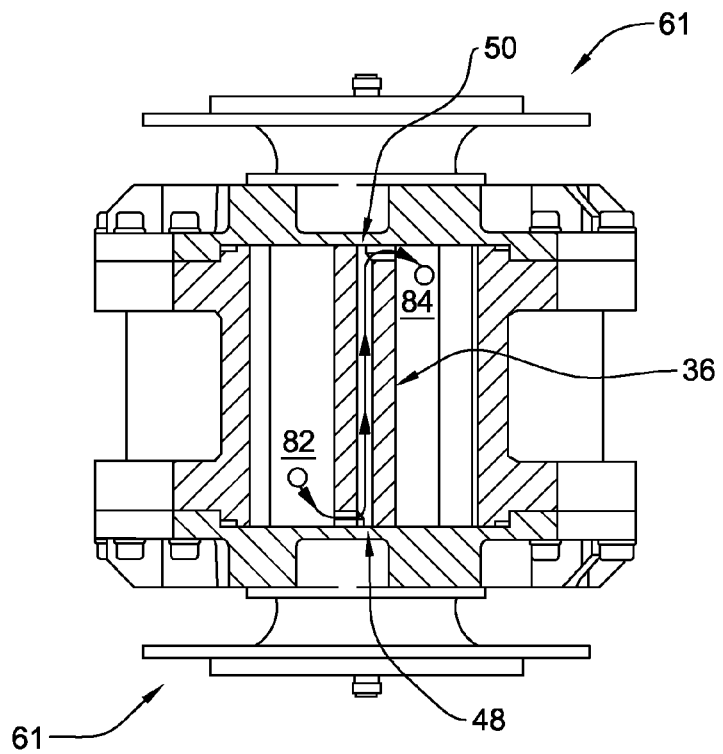
Figure 10A:
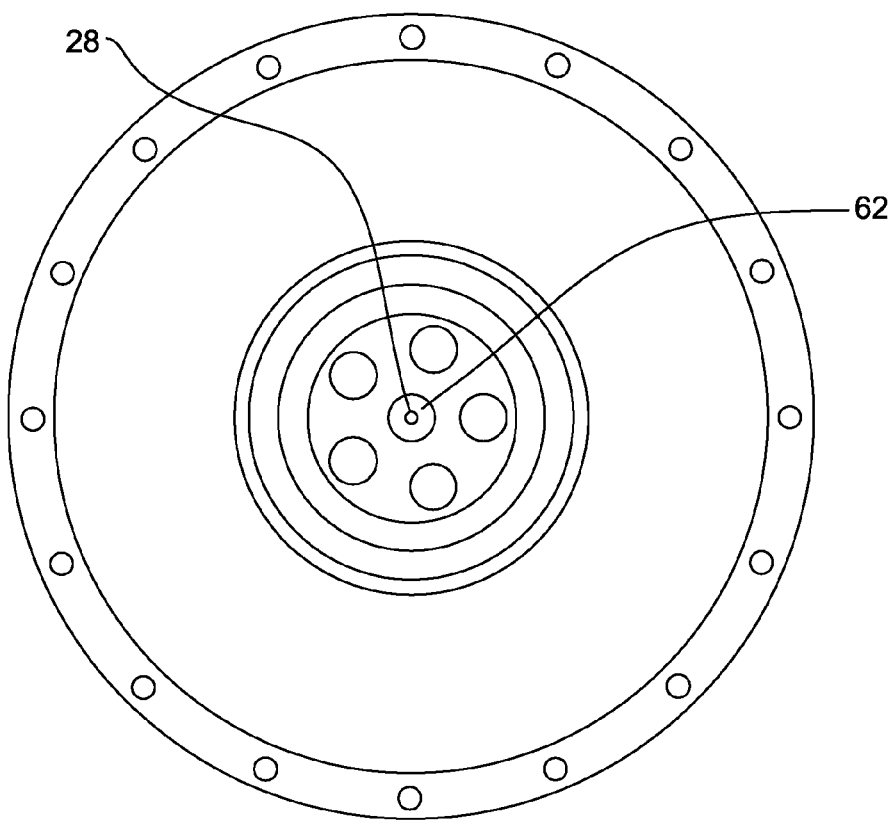
FIG. 10A-B show an elastomeric intermediate member bonded between a nonelastomeric inner paddle wheel member and a nonelastomeric outer canister member.
Figure 10B:
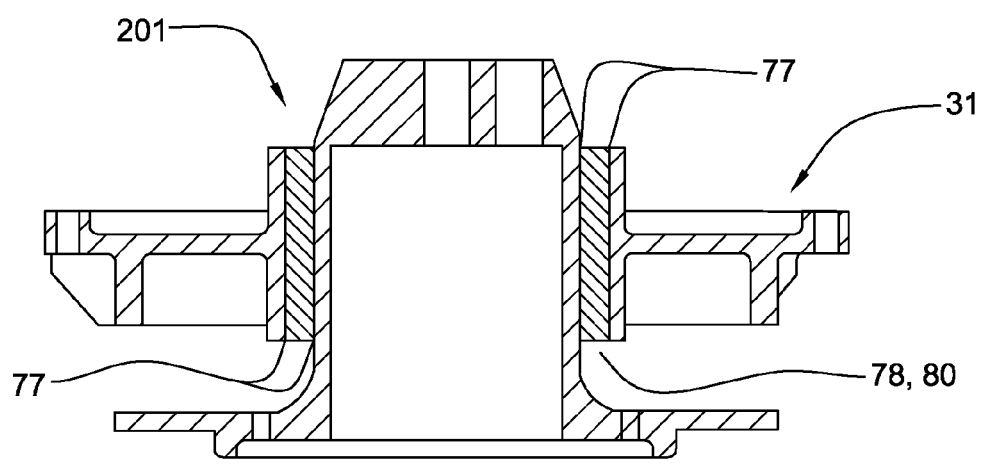
Figure 12A:
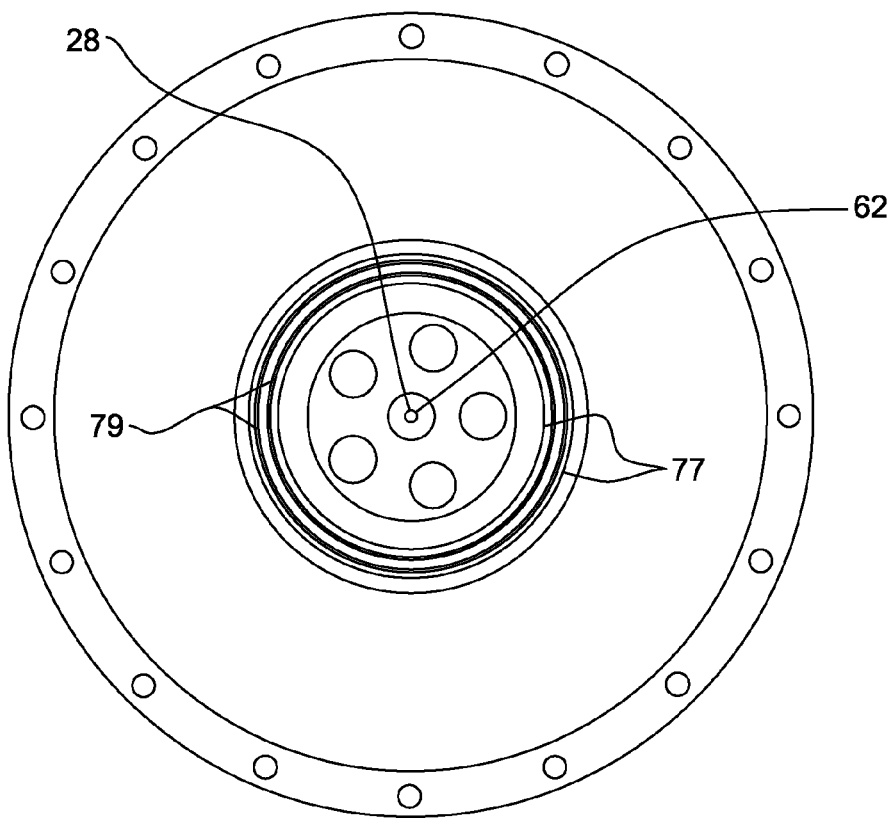
Figure 12B:
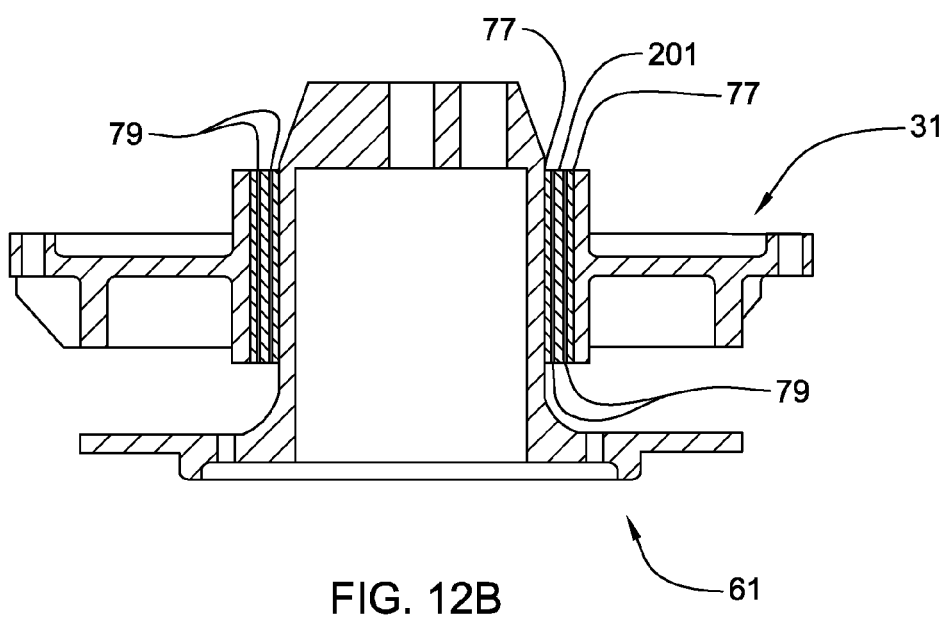
Figure 13A:
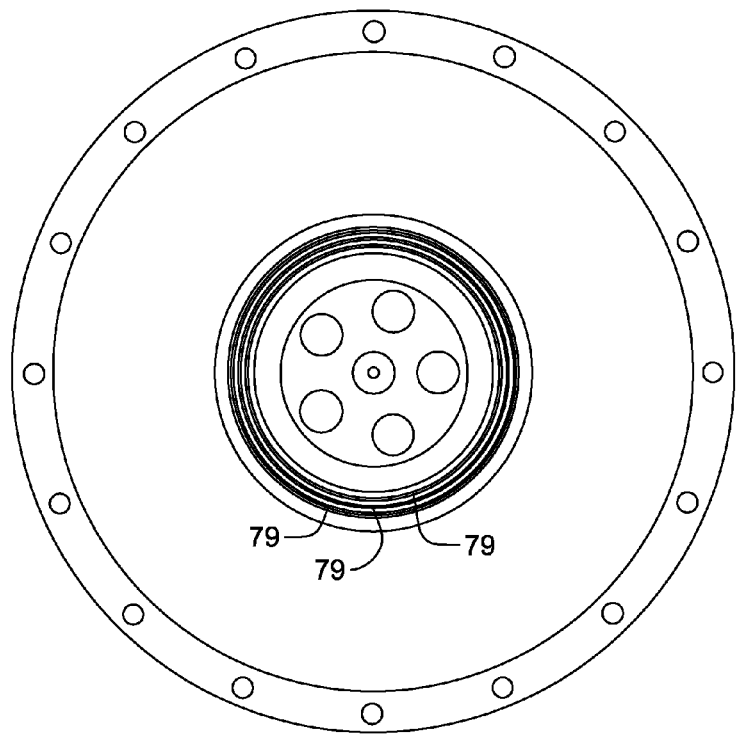
Figure 13B:
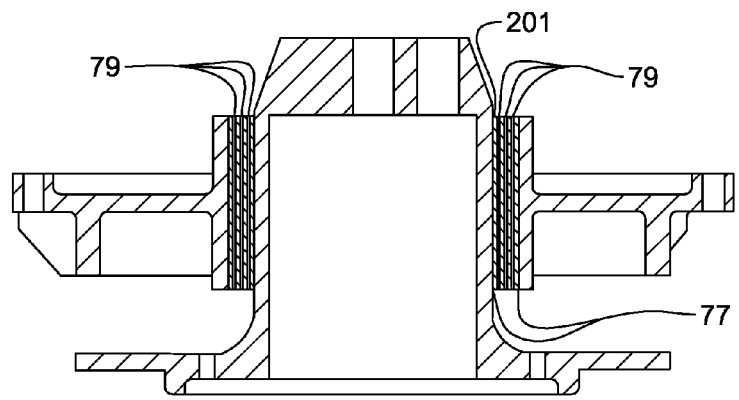
Figure 14A:
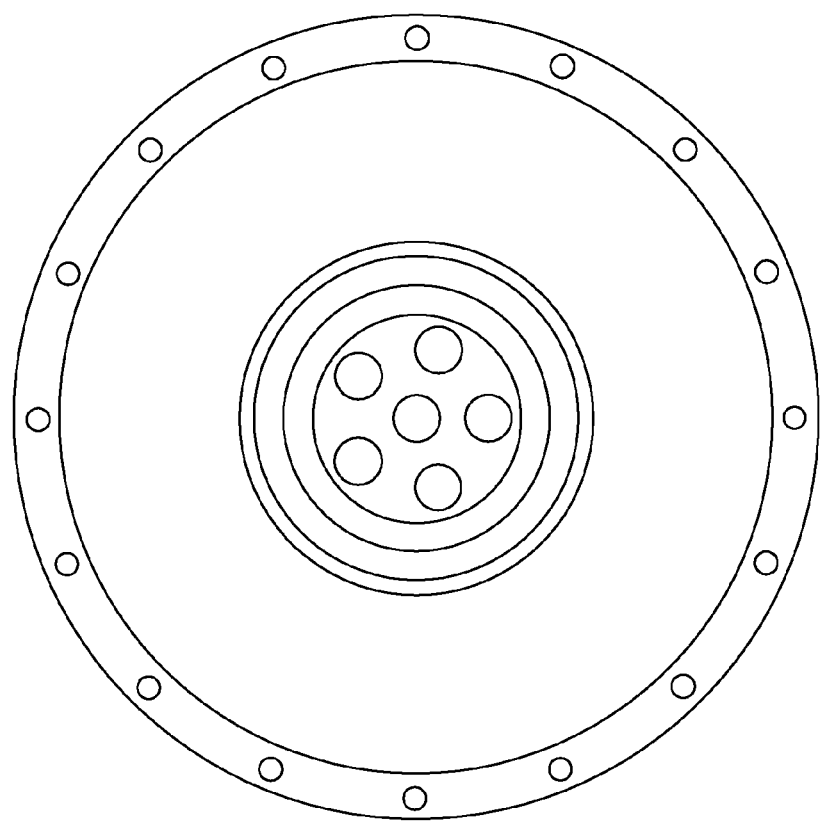
Figure 14B:
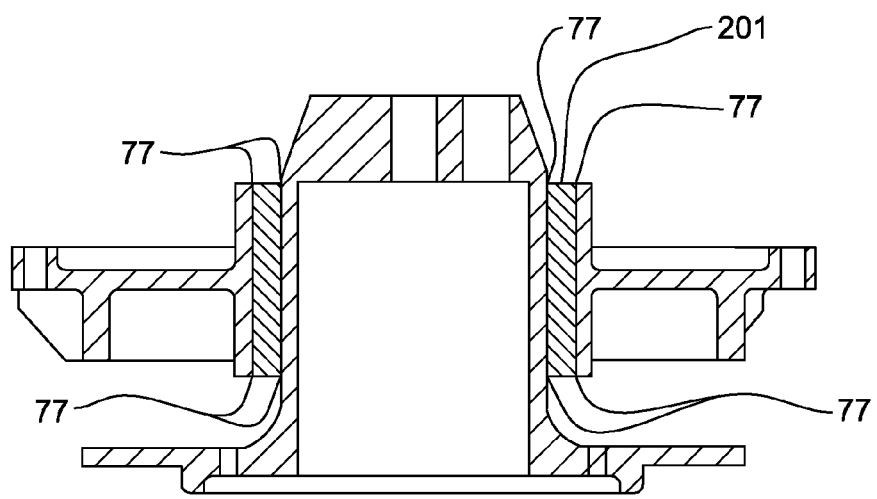
Figure 24A:
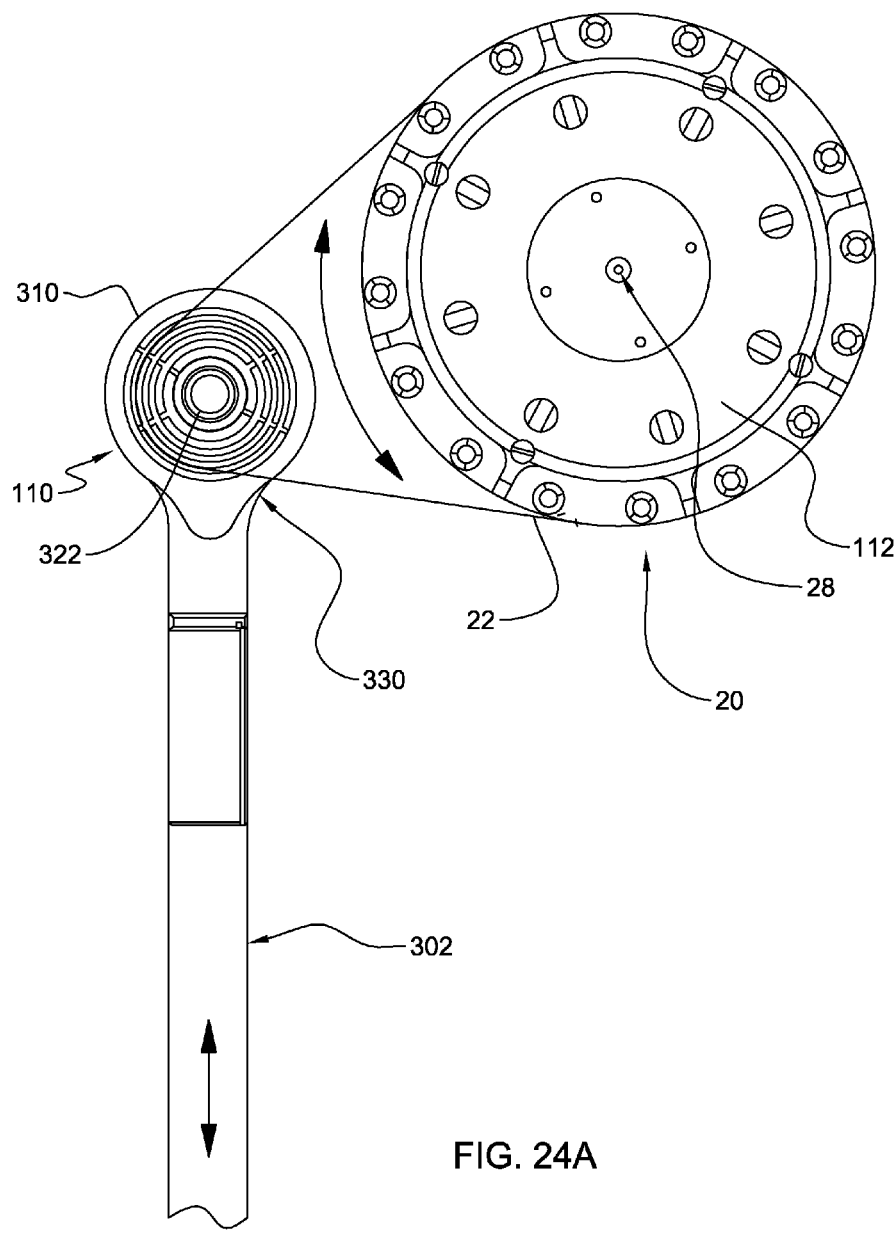
FIG. 24A shows a rotary damper connected with a rod end to a machine member axially extending link.
Figure 24B:
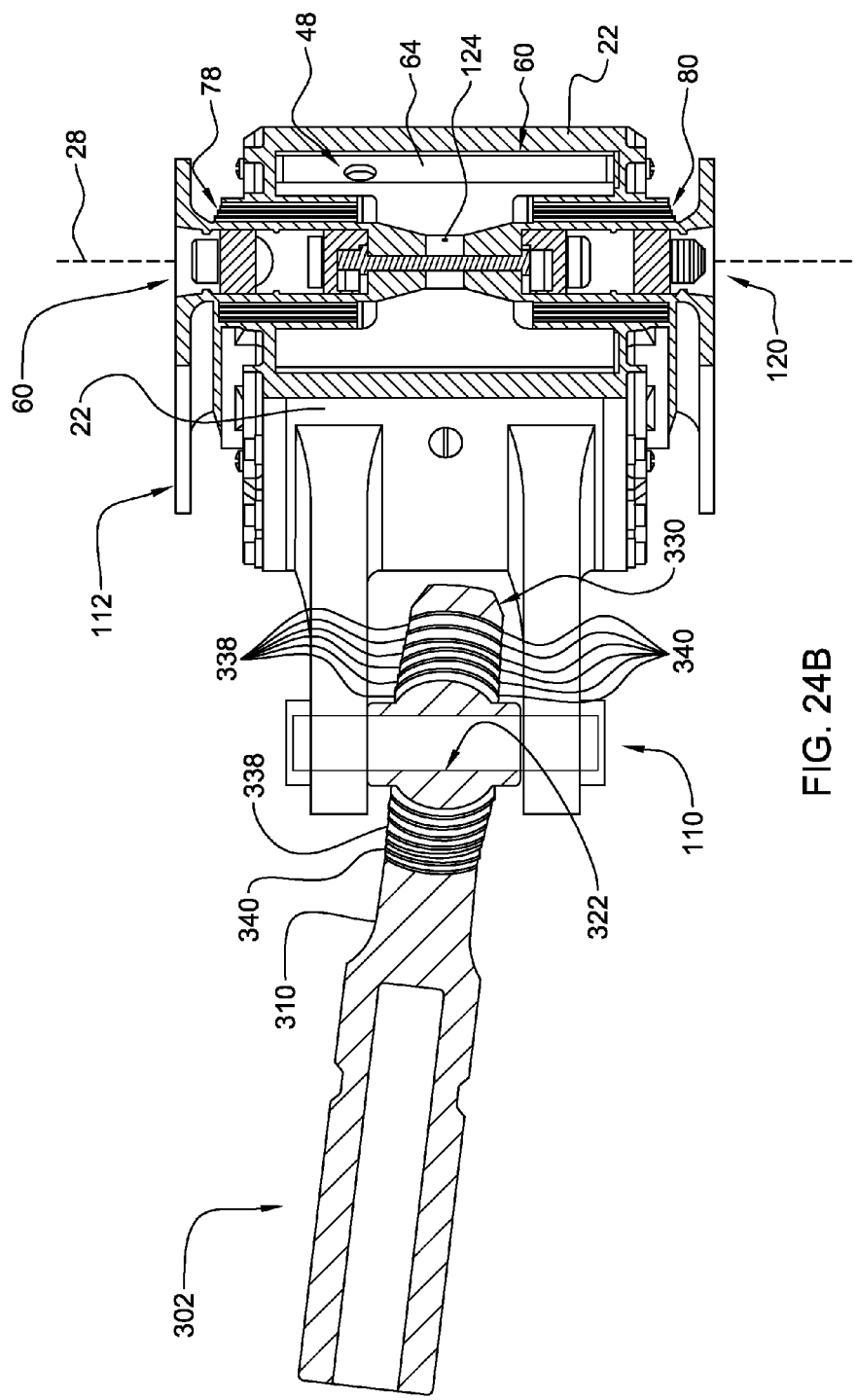
FIG. 24B shows a cross section rotary damper connected with a cross section elastomeric rod end.

In embodiments of controlling machine motion, preferably the machine first member is an axially extending link 302. Preferably the machine first member axially extending link 302 moves relative to the machine second member to which the inner member paddle wheel member 60 is grounded. Preferably the inner member fixation member assembly 112 is grounded to the machine second member to which the machine first member 302 is moving relative to. Preferably the machine first member axially extending link 302 terminates with a rod end connection 310 to the nonelastomeric outer member fixation member 110 such as shown in FIGS. 2, 24. Preferably the rod end connection is comprised of an elastomeric rod end. The elastomeric rod end preferably includes a nonelastomeric outer rod end member 330 and a nonelastomeric inner rod end member 322 elastomerically bonded within the outer rod end member 330. Preferably the inner member 322 is elastomerically bonded within the outer rod end member 330 with elastomeric shims 338 and nonelastomeric shims 340 between the inner member 322 and the outer member 330. Preferably the motion of the machine first member axially extending link 302 is transferred through the elastomeric rod end and outer member fixation member assembly to the nonelastomeric outer canister 22. The transferred motion to the outer canister 22 rotates the outer canister 22 relative to the grounded inner paddle wheel member 60 with the damper liquid flow through conduits 48 between the variable volume chambers resisting such rotation and the machine motion of machine first member 302 which is controlled.

In embodiments the invention includes rotary dampers 20. The rotary dampers 20 include a nonelastomeric outer canister 22, the nonelastomeric outer canister 22 having an outer canister housing 24 and an inner paddle wheel member receiving cavity 26 for receiving an inner paddle wheel member 60, the inner paddle wheel member receiving cavity centered about a longitudinally extending center bore axis 28, the inner paddle wheel member receiving cavity including radially extending dividers 34 including at least a first radially extending divider and at least a second radially extending divider. Preferably the radially extending dividers 34 extend in a direction from the outer canister housing inward towards the center bore axis. The rotary dampers 20 include a nonelastomeric inner paddle wheel member 60, the nonelastomeric inner paddle wheel member 60 having a center of rotation axis 62 for alignment with the center bore axis 28, the nonelastomeric inner paddle wheel member including radially extending paddles 64 including at least a first radially extending paddle and at least a second radially extending paddle. The rotary dampers 20 include a means for resisting a rotation of the inner paddle wheel member 60 about the center of rotation axis relative to the nonelastomeric outer canister 22. In embodiments the damper 20 includes a means for relieving a liquid pressure build up in the damper.

It will be apparent to those skilled in the art that various modifications and variations can be made to the present invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A rotary wing aircraft rotary lead lag damper, said rotary wing aircraft rotary lead lag damper comprised of:

a nonelastomeric outer canister, said nonelastomeric outer canister having an outer canister housing and an inner paddle wheel member receiving cavity for receiving an inner paddle wheel member, said inner paddle wheel member receiving cavity centered about a longitudinally extending center bore axis, said inner paddle wheel member receiving cavity including N radially extending dividers including at least a first radially extending divider and at least a second radially extending divider, said N radially extending dividers extending in a direction from said outer canister housing inward towards said center bore axis, said outer canister housing including at least N longitudinally extending liquid conduits including at least a first longitudinally extending liquid conduit, a nonelastomeric inner paddle wheel member, said nonelastomeric inner paddle wheel member having a center of rotation axis for alignment with said center bore axis, said nonelastomeric inner paddle wheel member including N radially extending paddles including at least a first radially extending paddle and at least a second radially extending paddle, a damper liquid, an upper elastomeric tubular intermediate member, and a lower elastomeric tubular intermediate member, said nonelastomeric inner paddle wheel member received in said nonelastomeric outer canister inner paddle wheel member receiving cavity with said upper elastomeric tubular intermediate member and said lower elastomeric tubular intermediate member between said nonelastomeric inner paddle wheel member and said nonelastomeric outer canister, with said first radially extending divider received between said first radially extending paddle and said second radially extending paddle, said first radially extending divider and said first radially extending paddle forming a first radially extending divider first variable volume chamber, said first radially extending divider and said second radially extending paddle forming a first radially extending divider second variable volume chamber, said first radially extending divider first variable volume chamber and said first radially extending divider second variable volume chamber in liquid communication through said first longitudinally extending liquid conduit wherein a clockwise rotation of the inner paddle wheel member about said center of rotation axis relative to said nonelastomeric outer canister pumps said damper liquid from said first radially extending divider second variable volume chamber through said first longitudinally extending liquid conduit towards said first radially extending divider first variable volume chamber, and a counterclockwise rotation of the inner paddle wheel member about said center of rotation axis relative to said nonelastomeric outer canister pumps said damper liquid from said first radially extending divider first variable volume chamber through said first longitudinally extending liquid conduit towards said second radially extending divider second variable volume chamber.

2. A rotary wing aircraft rotary lead lag damper as claimed in claim 1 including
a second radially extending divider first variable volume chamber,
a second radially extending divider second variable volume chamber,
said second radially extending divider first variable volume chamber and said second radially extending divider second variable volume chamber adjacent said second radially extending divider.

3. A rotary wing aircraft rotary lead lag damper as claimed in claim 1 including
a third radially extending divider first variable volume chamber,
a third radially extending divider second variable volume chamber,
said third radially extending divider first variable volume chamber and said third radially extending divider second variable volume chamber adjacent said third radially extending divider.

4. A rotary wing aircraft rotary lead lag damper as claimed in claim 1 including
a fourth radially extending divider first variable volume chamber,
a fourth radially extending divider second variable volume chamber,
said fourth radially extending divider first variable volume chamber and said fourth radially extending divider second variable volume chamber adjacent said fourth radially extending divider.

5. A rotary wing aircraft rotary lead lag damper as claimed in claim 1 including
a fifth radially extending divider first variable volume chamber,
a fifth radially extending divider second variable volume chamber,
said fifth radially extending divider first variable volume chamber and said fifth radially extending divider second variable volume chamber adjacent said fifth radially extending divider.

6. A rotary wing aircraft rotary lead lag damper as claimed in claim 1, said nonelastomeric outer canister outer canister housing having an outside perimeter surface, with said longitudinally extending liquid conduits proximate said outside perimeter surface.

7. A rotary wing aircraft rotary lead lag damper as claimed in claim 1, said longitudinally extending liquid conduits include an upper port and a lower port wherein the flow of liquid from a first variable volume chamber to a second variable volume chamber is a nonline of sight flow path.

8. A rotary wing aircraft rotary lead lag damper as claimed in claim 1, said upper elastomeric tubular intermediate member having an inner bonding elastomeric surface and outer bonding elastomeric surface, wherein said inner bonding elastomeric surface is bonded to an outer nonelastomeric surface of said nonelastomeric inner paddle wheel member and said outer bonding elastomeric surface is bonded to an inner nonelastomeric surface of said nonelastomeric outer canister.

9. A rotary wing aircraft rotary lead lag damper as claimed in claim 1, said rotary wing aircraft rotary lead lag damper including a variable volume fluid expansion compensation chamber, said variable volume fluid expansion compensation chamber having a variable volume expansion chamber in liquid communication with said radially extending divider variable volume chambers.

10. A method of making a rotary wing aircraft lead lag damper, said method including the steps of:
providing a nonelastomeric outer canister, said nonelastomeric outer canister having an outer perimeter and an inner paddle wheel member receiving cavity for receiving an inner paddle wheel member, said inner paddle wheel member receiving cavity centered about a longitudinally extending center bore axis, said inner paddle wheel member receiving cavity including N radially extending dividers including at least a first radially extending divider and at least a second radially extending divider, said outer canister including at least N longitudinally extending liquid conduits including at least a first longitudinally extending liquid conduit,
providing a nonelastomeric inner paddle wheel member, said nonelastomeric inner paddle wheel member having a center of rotation axis for alignment with said center bore axis, said nonelastomeric inner paddle wheel member including N radially extending paddles including at least a first radially extending paddle and at least a second radially extending paddle,
providing a damper liquid,
providing at least a first elastomeric tubular intermediate member and a lower elastomeric tubular intermediate member,
receiving said nonelastomeric inner paddle wheel member in said nonelastomeric outer canister inner paddle wheel member receiving cavity with said elastomeric tubular intermediate member between said nonelastomeric inner paddle wheel member and said nonelastomeric outer canister, with said first radially extending divider received between said first radially extending paddle and said second radially extending paddle, said first radially extending divider and said first radially extending paddle forming a first radially extending divider first variable volume chamber, said first radially extending divider and said second radially extending paddle forming a first radially extending divider second variable volume chamber, said first radially extending divider first variable volume chamber and said first radially extending divider second variable volume chamber in fluid communication through said first longitudinally extending liquid conduit containing said damper liquid inside said outer canister wherein a clockwise rotation of the inner paddle wheel member relative to said nonelastomeric outer canister pumps said damper liquid from said first radially extending divider second variable volume chamber through said first longitudinally extending liquid conduit towards said first radially extending divider first variable volume chamber, and a counterclockwise rotation of the inner paddle wheel member relative to said nonelastomeric outer canister pumps said damper liquid from said first radially extending divider first variable volume chamber through said first longitudinally extending liquid conduit towards said second radially extending divider second variable volume chamber.

11. A method as claimed in claim 10, said method includes forming
a second radially extending divider first variable volume chamber,
a second radially extending divider second variable volume chamber,
said second radially extending divider first variable volume chamber and said second radially extending divider second variable volume chamber adjacent said second radially extending divider.

12. A method as claimed in claim 11, said method includes forming
a third radially extending divider first variable volume chamber,
a third radially extending divider second variable volume chamber,
said third radially extending divider first variable volume chamber and said third radially extending divider second variable volume chamber adjacent said third radially extending divider.

13. A method as claimed in claim 12, said method includes forming
a fourth radially extending divider first variable volume chamber,
a fourth radially extending divider second variable volume chamber,
said fourth radially extending divider first variable volume chamber and said fourth radially extending divider second variable volume chamber adjacent said fourth radially extending divider.

14. A method as claimed in claim 13, said method includes forming
a fifth radially extending divider first variable volume chamber,
a fifth radially extending divider second variable volume chamber,
said fifth radially extending divider first variable volume chamber and said fifth radially extending divider second variable volume chamber adjacent said fifth radially extending divider.

15. A method as claimed in claim 10, wherein providing said nonelastomeric outer canister having said outer perimeter, includes providing said nonelastomeric outer canister with an outside perimeter surface, with said longitudinally extending liquid conduits proximate said outside perimeter surface.

16. A method as claimed in claim 10, wherein said longitudinally extending liquid conduits are provided with an upper port and a lower port wherein the flow of liquid from a first variable volume chamber to a second variable volume chamber is a nonline of sight flow path.

17. A method as claimed in claim 10, wherein said elastomeric tubular intermediate member having an inner bonding elastomeric surface and an outer bonding elastomeric surface, said method includes bonding said inner bonding elastomeric surface to an outer nonelastomeric surface of said nonelastomeric inner paddle wheel member and bonding said outer bonding elastomeric surface to an inner nonelastomeric surface of said nonelastomeric outer canister.

18. A method as claimed in claim 10, said method includes providing a variable volume fluid expansion compensation chamber in liquid communication with said radially extending divider variable volume chambers.

19. A rotary damper comprised of:
a nonelastomeric outer canister, said nonelastomeric outer canister having an outer canister housing and an inner paddle wheel member receiving cavity for receiving an inner paddle wheel member, said inner paddle wheel member receiving cavity centered about a longitudinally extending center bore axis, said inner paddle wheel member receiving cavity including N radially extending dividers including at least a first radially extending divider and at least a second radially extending divider, said N radially extending dividers extending in a direction from said outer canister housing inward towards said center bore axis, said outer canister housing including at least N longitudinally extending liquid conduits including at least a first longitudinally extending liquid conduit,
a nonelastomeric inner paddle wheel member, said nonelastomeric inner paddle wheel member having a center of rotation axis for alignment with said center bore axis,
said nonelastomeric inner paddle wheel member including N radially extending paddles including at least a first radially extending paddle and at least a second radially extending paddle,
a damper liquid,
at least a first elastomeric tubular intermediate member, said nonelastomeric inner paddle wheel member received in said nonelastomeric outer canister inner paddle wheel member receiving cavity with said at least first elastomeric tubular intermediate member between said nonelastomeric inner paddle wheel member and said nonelastomeric outer canister, with said first radially extending divider received between said first radially extending paddle and said second radially extending paddle, said first radially extending divider and said first radially extending paddle forming a first radially extending divider first variable volume chamber,
said first radially extending divider and said second radially extending paddle forming a first radially extending divider second variable volume chamber, said first radially extending divider first variable volume chamber and said first radially extending divider second variable volume chamber in liquid communication through said first longitudinally extending liquid conduit wherein a clockwise rotation of the inner paddle wheel member about said center of rotation axis relative to said nonelastomeric outer canister pumps said damper liquid from said first radially extending divider second variable volume chamber through said first longitudinally extending liquid conduit towards said first radially extending divider first variable volume chamber, and a counterclockwise rotation of the inner paddle wheel member about said center of rotation axis relative to said nonelastomeric outer canister pumps said damper liquid from said first radially extending divider first variable volume chamber through said first longitudinally extending liquid conduit towards said second radially extending divider second variable volume chamber.

20. A method of making a rotary damper, said method including the steps of:
- providing a nonelastomeric outer canister, said nonelastomeric outer canister having an inner paddle wheel member receiving cavity for receiving an inner paddle wheel member, said inner paddle wheel member receiving cavity centered about a longitudinally extending center bore axis, said inner paddle wheel member receiving cavity including N radially extending dividers including at least a first radially extending divider and at least a second radially extending divider, said outer canister including at least N longitudinally extending liquid conduits including at least a first longitudinally extending liquid conduit,
- providing a nonelastomeric inner paddle wheel member, said nonelastomeric inner paddle wheel member having a center of rotation axis, said nonelastomeric inner paddle wheel member including N radially extending paddles including at least a first radially extending paddle and at least a second radially extending paddle,
- providing a damper liquid,
- providing at least a first elastomeric tubular intermediate member,
- receiving said nonelastomeric inner paddle wheel member in said nonelastomeric outer canister inner paddle wheel member receiving cavity with said elastomeric tubular intermediate member between said nonelastomeric inner paddle wheel member and said nonelastomeric outer canister, with said first radially extending divider received between said first radially extending paddle and said second radially extending paddle, said first radially extending divider and said first radially extending paddle forming a first radially extending divider first variable volume chamber, said first radially extending divider and said second radially extending paddle forming a first radially extending divider second variable volume chamber, said first radially extending divider first variable volume chamber and said first radially extending divider second variable volume chamber in fluid communication through said first longitudinally extending liquid conduit containing said damper liquid inside said outer canister wherein a clockwise rotation of the inner paddle wheel member relative to said nonelastomeric outer canister pumps said damper liquid from said first radially extending divider second variable volume chamber through said first longitudinally extending liquid conduit towards said first radially extending divider first variable volume chamber, and
- a counterclockwise rotation of the inner paddle wheel member relative to said nonelastomeric outer canister pumps said damper liquid from said first radially extending divider first variable volume chamber through said first longitudinally extending liquid conduit towards said second radially extending divider second variable volume chamber.

21. A rotary damper, said rotary damper comprised of:
- a nonelastomeric outer canister, said nonelastomeric outer canister having an outer canister housing and an inner paddle wheel member receiving cavity for receiving an inner paddle wheel member, said inner paddle wheel member receiving cavity centered about a longitudinally extending center bore axis, said inner paddle wheel member receiving cavity including N radially extending dividers including at least a first radially extending divider and at least a second radially extending divider, said N radially extending dividers extending in a direction from said outer canister housing inward towards said center bore axis,
- a nonelastomeric inner paddle wheel member, said nonelastomeric inner paddle wheel member having a center of rotation axis for alignment with said center bore axis,
- said nonelastomeric inner paddle wheel member including N radially extending paddles including at least a first radially extending paddle and at least a second radially extending paddle,
- a damper liquid,
- an upper elastomeric tubular intermediate member, and a lower elastomeric tubular intermediate member, said nonelastomeric inner paddle wheel member received in said nonelastomeric outer canister inner paddle wheel member receiving cavity with said upper elastomeric tubular intermediate member and said lower elastomeric tubular intermediate member between said nonelastomeric inner paddle wheel member and said nonelastomeric outer canister, with said radially extending dividers received between said radially extending paddles and forming a plurality of variable volume chambers in liquid communication through a plurality of liquid conduits, wherein said upper elastomeric tubular intermediate member having an inner bonding elastomeric surface and outer bonding elastomeric surface, wherein said inner bonding elastomeric surface is bonded to an outer nonelastomeric surface of said nonelastomeric inner paddle wheel member and said outer bonding elastomeric surface is bonded to an inner nonelastomeric surface of said nonelastomeric outer canister,
- wherein a clockwise rotation of the inner paddle wheel member about said center of rotation axis relative to said nonelastomeric outer canister pumps said damper liquid from at least a second variable volume chamber through at least a first liquid conduit towards at least a first variable volume chamber, and
- a counterclockwise rotation of the inner paddle wheel member about said center of rotation axis relative to said nonelastomeric outer canister pumps said damper liquid from said at least first variable volume chamber through said at least first liquid conduit towards said at least second variable volume chamber.

22. A rotary damper as claimed in claim 21 wherein said at least a first liquid conduit is a longitudinally extending liquid damping conduit.

23. A rotary damper as claimed in claim 21 wherein said at least a first liquid conduit is a latitudinal liquid damping conduit.

24. A rotary damper as claimed in claim 21 including a first clockwise counterclockwise liquid pressure relief valve between said at least first variable volume chamber and said at least second variable volume chamber.

25. A rotary damper as claimed in claim 24 wherein said first clockwise counterclockwise liquid pressure relief valve is in said outer canister housing.

26. A rotary damper as claimed in claim 24 wherein said first clockwise counterclockwise liquid pressure relief valve is in said paddle wheel member.

27. A rotary damper as claimed in claim 21, said damper including a first variable volume fluid expansion compensation chamber, said first variable volume fluid expansion compensation chamber having a first compensation variable volume expansion chamber in liquid communication with said variable volume chambers and a distal second variable volume fluid expansion compensation chamber, said second variable volume fluid expansion compensation chamber having a second compensation variable volume expansion chamber in liquid communication with said variable volume chambers.

28. A method of making a rotary damper, said method including the steps of:
providing a nonelastomeric outer canister, said nonelastomeric outer canister having an outer perimeter and an inner paddle wheel member receiving cavity for receiving an inner paddle wheel member, said inner paddle wheel member receiving cavity centered about a longitudinally extending center bore axis, said inner paddle wheel member receiving cavity including N radially extending dividers including at least a first radially extending divider and at least a second radially extending divider,
providing a nonelastomeric inner paddle wheel member, said nonelastomeric inner paddle wheel member having a center of rotation axis for alignment with said center bore axis, said nonelastomeric inner paddle wheel member including N radially extending paddles including at least a first radially extending paddle and at least a second radially extending paddle, wherein providing said nonelastomeric outer canister having said outer perimeter, includes providing said nonelastomeric outer canister with at least a first liquid conduit extending through said nonelastomeric outer canister,
providing a damper liquid,
providing at least an upper elastomeric intermediate member and a lower elastomeric intermediate member,
receiving said nonelastomeric inner paddle wheel member in said nonelastomeric outer canister inner paddle wheel member receiving cavity with said elastomeric intermediate members between said nonelastomeric inner paddle wheel member and said nonelastomeric outer canister, with said first radially extending divider received between said first radially extending paddle and said second radially extending paddle, said first radially extending divider and said first radially extending paddle forming a first radially extending divider first variable volume chamber, said first radially extending divider and said second radially extending paddle forming a first radially extending divider second variable volume chamber, said first radially extending divider first variable volume chamber and said first radially extending divider second variable volume chamber in fluid communication through said at least a first liquid conduit,
containing said damper liquid inside said outer canister wherein a clockwise rotation of the inner paddle wheel member relative to said nonelastomeric outer canister pumps said damper liquid from said first radially extending divider second variable volume chamber through said liquid conduit towards said first radially extending divider first variable volume chamber, and
a counterclockwise rotation of the inner paddle wheel member relative to said nonelastomeric outer canister pumps said damper liquid from said first radially extending divider first variable volume chamber through said liquid conduit towards said second radially extending divider second variable volume chamber.

29. A method as claimed in claim 28, wherein providing said nonelastomeric outer canister having said outer perimeter, includes providing said nonelastomeric outer canister with an outside perimeter surface, with said at least first liquid conduit extending longitudinally proximate said outside perimeter surface.

30. A method as claimed in claim 28, wherein providing said nonelastomeric inner paddle wheel member, includes providing said nonelastomeric inner paddle wheel member with said at least first liquid conduit extending through said nonelastomeric inner paddle wheel member.

31. A method as claimed in claim 28, wherein said elastomeric tubular intermediate member having an inner bonding elastomeric surface and an outer bonding elastomeric surface, said method includes bonding said inner bonding elastomeric surface to an outer nonelastomeric surface of said nonelastomeric inner paddle wheel member and bonding said outer bonding elastomeric surface to an inner nonelastomeric surface of said nonelastomeric outer canister.

32. A method as claimed in claim 28, said method includes providing a first variable volume fluid expansion compensation chamber and a second variable volume fluid expansion compensation chamber in liquid communication with said radially extending divider variable volume chambers, said first variable volume fluid expansion compensation chamber disposed in said nonelastomeric inner paddle wheel member, and said second variable volume fluid expansion compensation chamber disposed in said nonelastomeric inner paddle wheel member distal from said first variable volume fluid expansion compensation chamber.

* * * * *